United States Patent [19]
Nakajima et al.

[11] Patent Number: 6,067,367
[45] Date of Patent: May 23, 2000

[54] MOVING DIRECTION MEASURING DEVICE AND TRACKING APPARATUS

[75] Inventors: Hiroshi Nakajima; Koji Kobayashi, both of Tokyo, Japan

[73] Assignee: Yamatake-Honeywell Co., Ltd., Japan

[21] Appl. No.: 08/959,380

[22] Filed: Oct. 28, 1997

[30] Foreign Application Priority Data

Oct. 31, 1996 [JP] Japan ................................ 8-290509
Oct. 31, 1996 [JP] Japan ................................ 8-290543
Oct. 31, 1996 [JP] Japan ................................ 8-290582

[51] Int. Cl.$^7$ ............... G06K 9/00; G06K 9/36; H04N 7/18; H04N 13/00
[52] U.S. Cl. ................. 382/103; 382/107; 382/236; 382/278; 382/280; 348/155; 348/352; 348/699
[58] Field of Search .................. 382/103, 107, 382/278, 280, 236; 348/154, 155, 416, 352, 699; 356/3; 359/559, 560, 561; 364/728.03, 822

[56] References Cited

U.S. PATENT DOCUMENTS

| | | | |
|---|---|---|---|
| 4,890,160 | 12/1989 | Thomas | 348/699 |
| 5,329,368 | 7/1994 | Plotke | 348/701 |
| 5,408,269 | 4/1995 | Tsukagoshi | 348/416 |
| 5,588,067 | 12/1996 | Peterson et al. | 382/103 |
| 5,612,744 | 3/1997 | Lee et al. | 348/416 |
| 5,731,849 | 3/1998 | Kondo et al. | 348/699 |
| 5,844,630 | 12/1998 | Yamauchi | 348/699 |
| 5,886,744 | 3/1999 | Hannah | 348/416 |

FOREIGN PATENT DOCUMENTS

| | | | |
|---|---|---|---|
| 0 368 745 | 11/1989 | European Pat. Off. | G06F 15/70 |
| 0 368 747 | 11/1989 | European Pat. Off. | G06F 15/70 |
| 7-108526 | 4/1995 | Japan | B28D 5/02 |
| 7-254062 | 10/1995 | Japan | G06T 7/00 |
| 2 187 059 | 8/1987 | United Kingdom | H04N 7/12 |

OTHER PUBLICATIONS

Electronic Engineers' Handbook, Fink et al; pp. 2–7, 1989.
"Introduction to Computer Image Processing", Japan Industrial Technology center pp. 44–45, Jun. 1990.
"Fingerprint Indentification Algorithm Using 2–D DFT", Savemation Review pp. 2–7, Feb., 1995.
"Fingerprint Identification System Using Liquid Crystal Spatial Light Modulators for Phase Modulation", The Instisute of Electronics Conference D–287, Sep., 1993.

*Primary Examiner*—Amelia Au
*Assistant Examiner*—Mehrdad Dastouri
*Attorney, Agent, or Firm*—Blakely Sokoloff Taylor & Zafman

[57] ABSTRACT

A moving direction measuring device includes a collation Fourier pattern data generating section, a registration Fourier pattern data generating section, a pattern processing section, and a moving direction measuring section. The collation Fourier pattern data generating section generates collation Fourier two-dimensional pattern data by performing two-dimensional discrete Fourier transform for two-dimensional pattern data input at time $T_n$. The registration Fourier pattern data generating section generates registration Fourier two-dimensional pattern data by performing two-dimensional discrete Fourier transform for two-dimensional pattern data input at time $T_{n+1}$. The pattern processing section synthesizes these Fourier two-dimensional pattern data, and performs either two-dimensional discrete Fourier transform or two-dimensional discrete inverse Fourier transform for the resultant data. The moving direction measuring section obtains a correlation peak in a correlation component area appearing in the synthesized Fourier two-dimensional pattern data having undergone Fourier transform performed by the pattern processing section, and obtains a direction from a reference position in the correlation component area to a position of the correlation peak as a moving direction of the device.

24 Claims, 24 Drawing Sheets

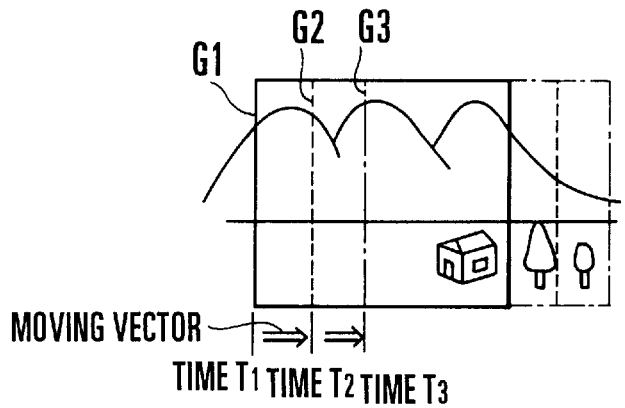
FIG. 1A
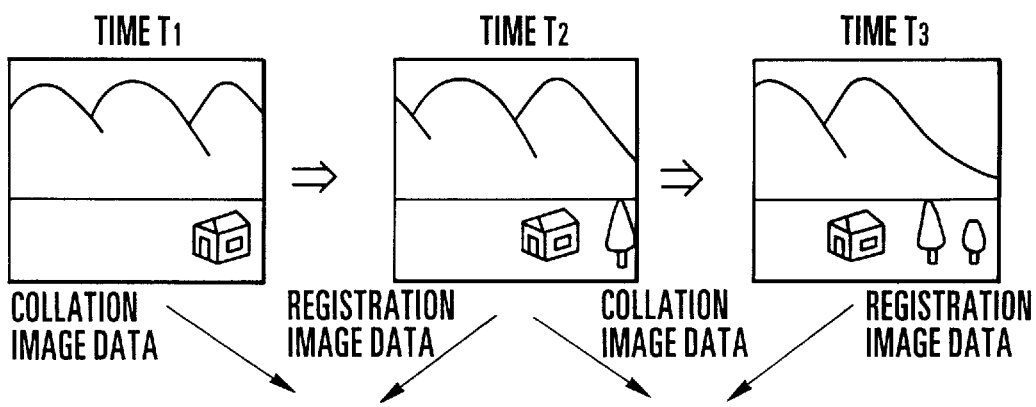
FIG. 1B   FIG. 1C   FIG. 1D
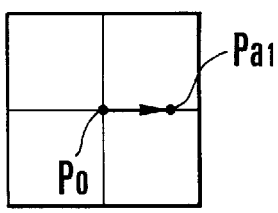 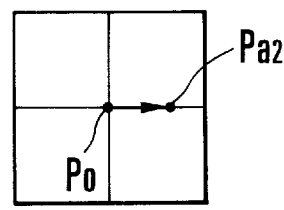
FIG. 1E   FIG. 1F
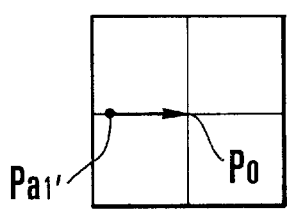 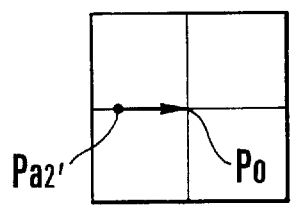
FIG. 1G   FIG. 1H

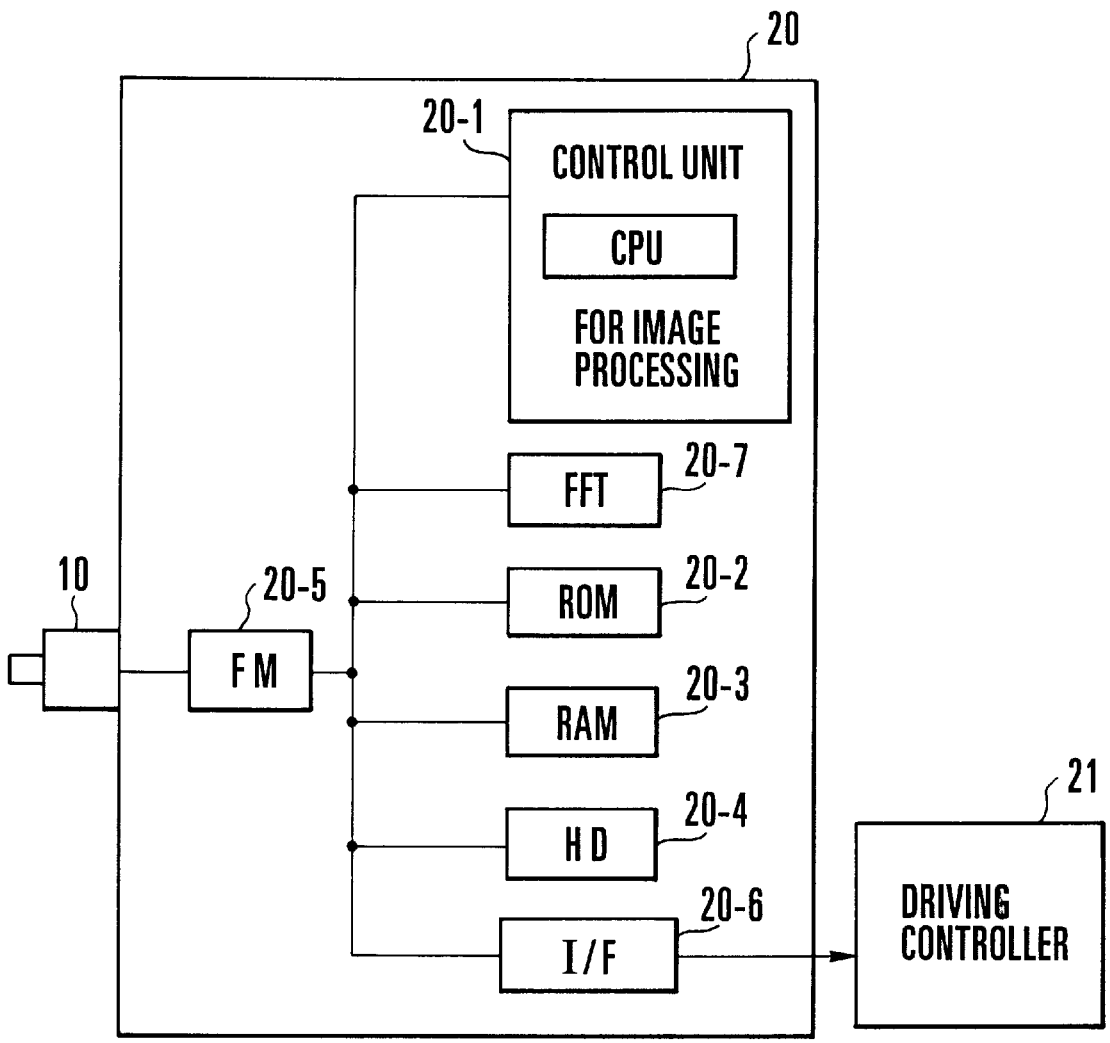
F I G. 2

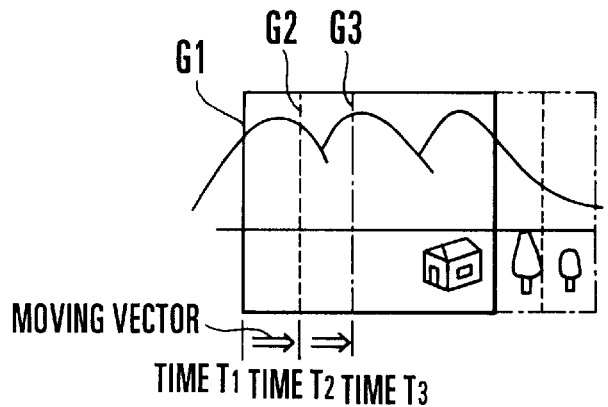
FIG. 5A
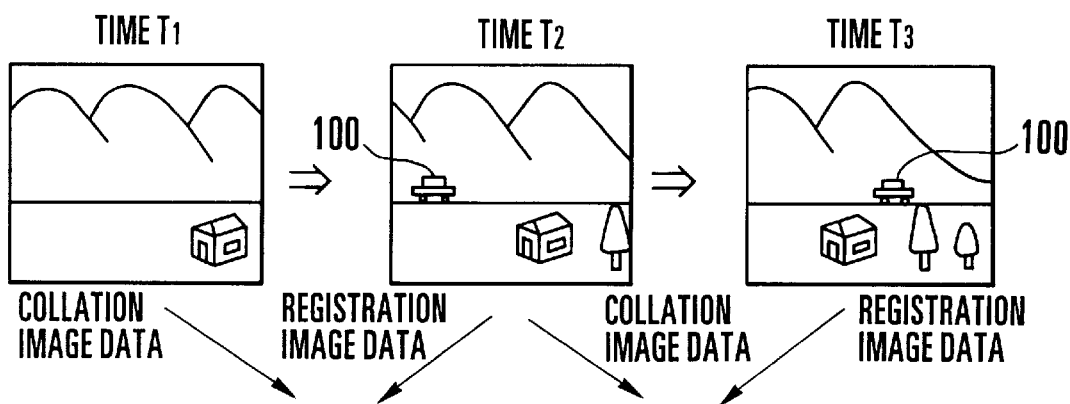
FIG. 5B  FIG. 5C  FIG. 5D
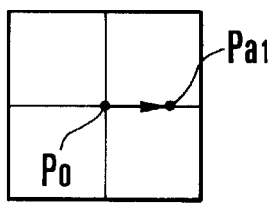 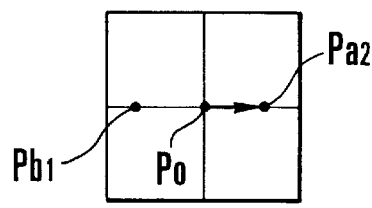
FIG. 5E  FIG. 5F
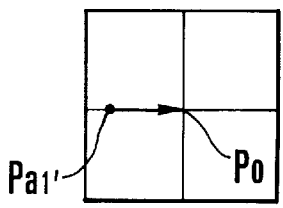 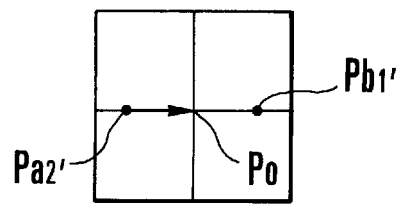
FIG. 5G  FIG. 5H

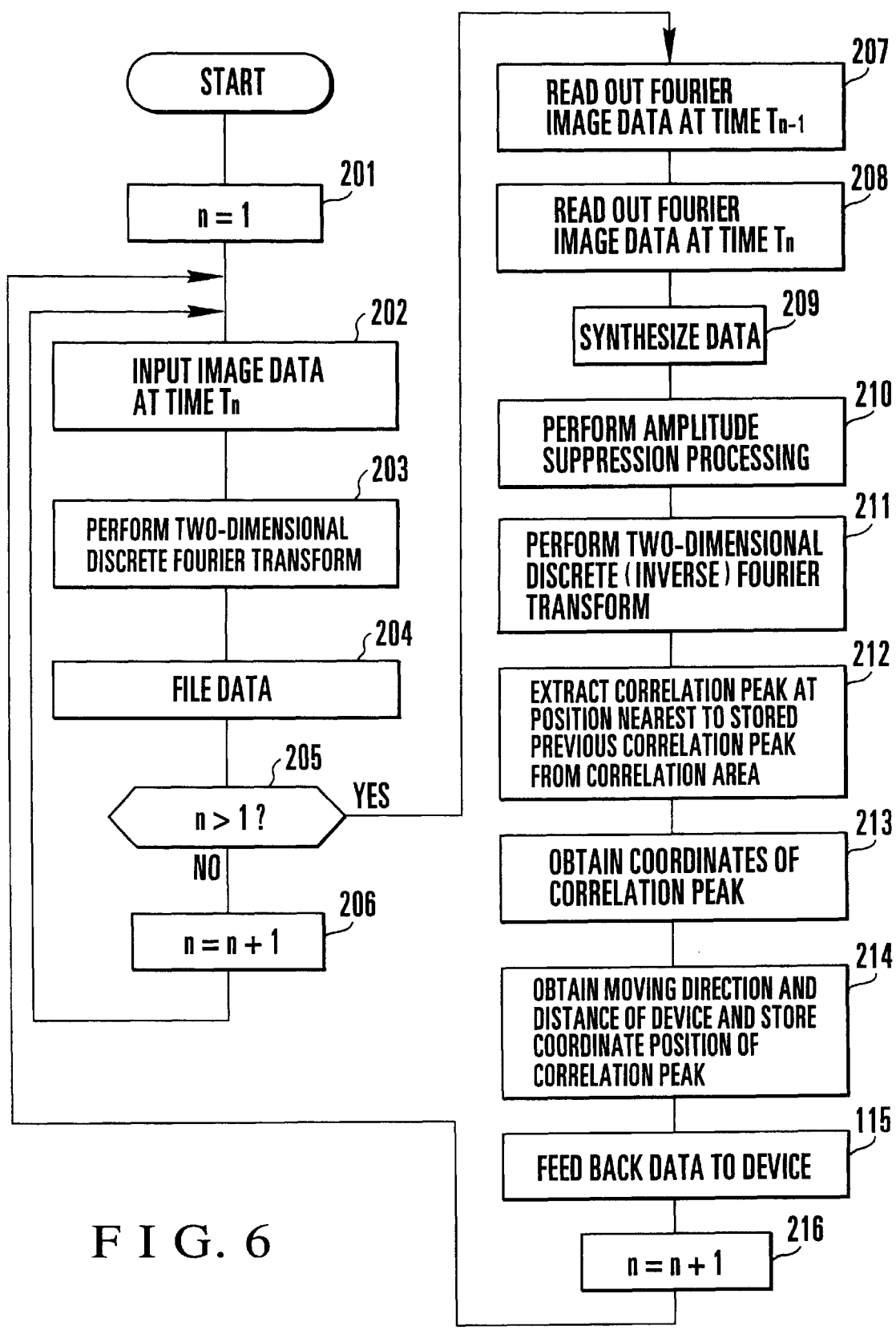
F I G. 6

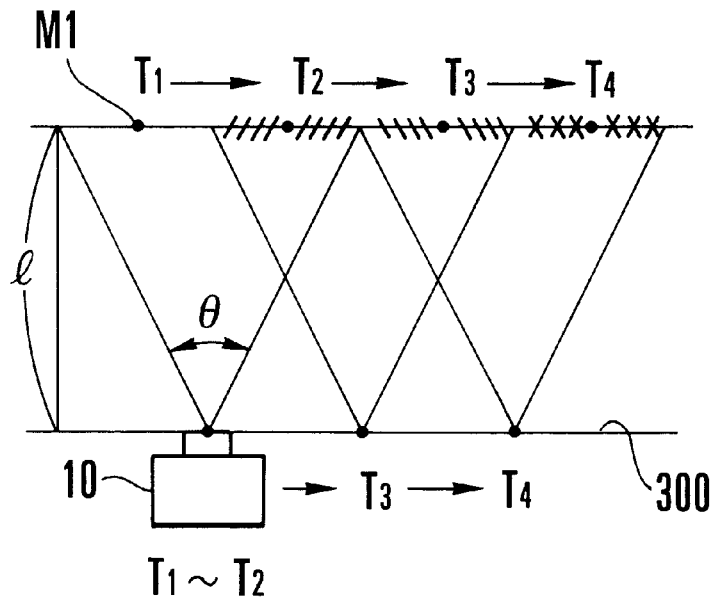
F I G. 11
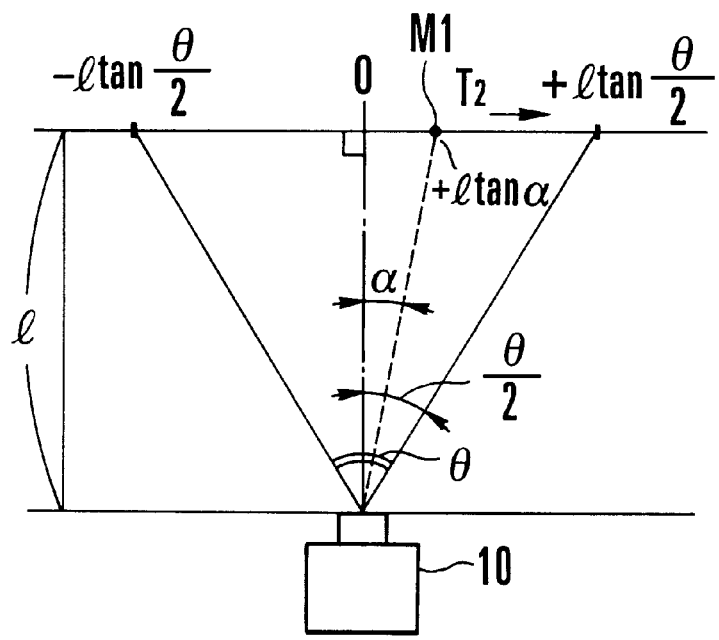
F I G. 12

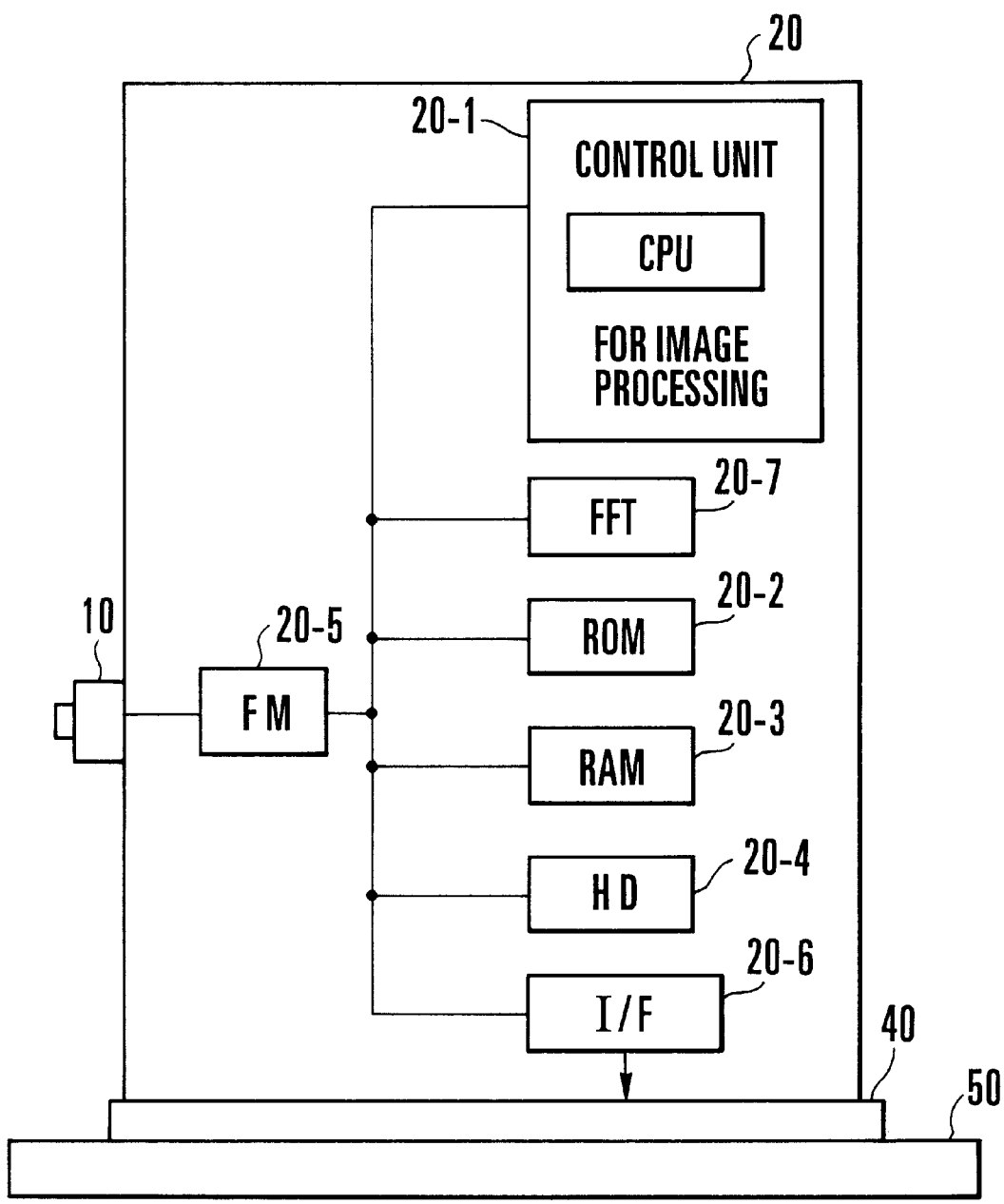
F I G. 17

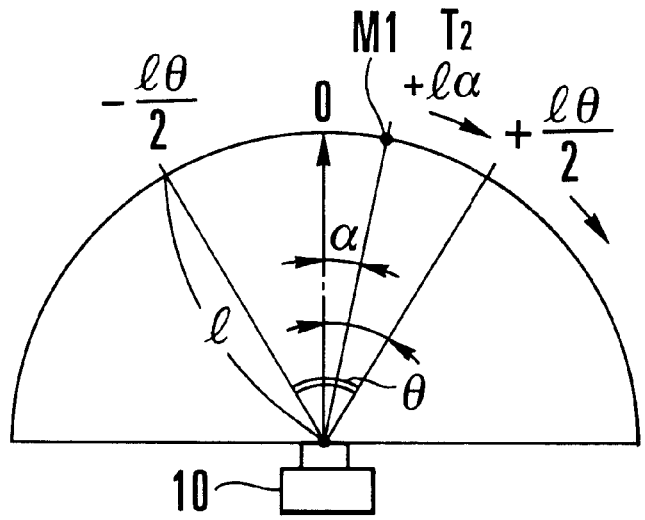
F I G. 20
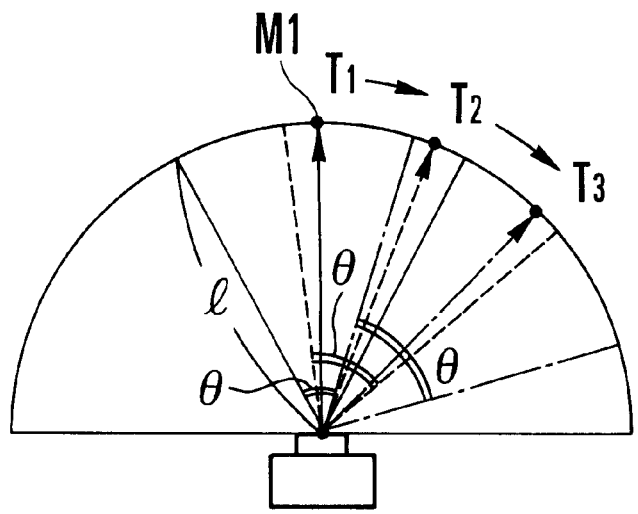
F I G. 21

⇩ ENLARGEMENT/
REDUCTION
PROCESSING
(ENLARGEMENT)

⇩ ENLARGEMENT/REDUCTION
PROCESSING (REDUCTION)

REGISTRATION

COLLATION      REGISTRATION      COLLATION

⇩ CORRECTION

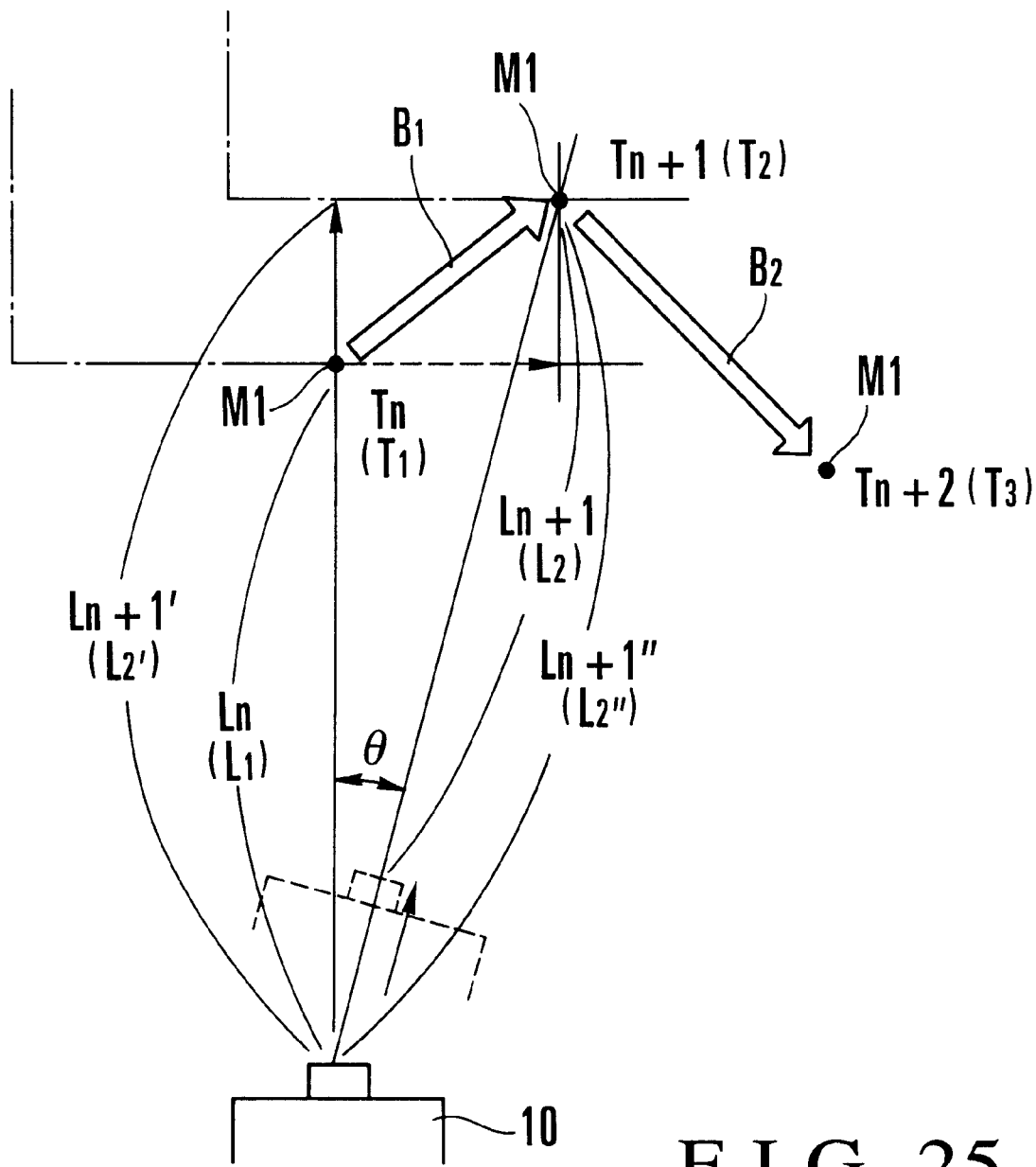
F I G. 25

MOVING DIRECTION MEASURING DEVICE AND TRACKING APPARATUS

BACKGROUND OF THE INVENTION

The present invention relates to a moving direction measuring device suitably used for tracking control performed by detecting the moving direction of a vehicle or a flying object, image blur correction for a VTR camera, and the like, and a tracking apparatus suitably used for a robot vision system or a monitor camera.

A conventional tracking apparatus includes a moving direction measuring device having a geomagnetism sensor and serving to detect the moving direction of a vehicle. This tracking apparatus is designed to perform unmanned driving in a designated direction. A tracking apparatus for tracking a moving target is also available.

The conventional tracking apparatus including the moving direction measuring device, however, cannot accurately detect the moving direction of a vehicle owing to the influence of a disturbing magnetic field, posing a problem in terms of reliability. Recently, a GPS (Global Position System) using a stationary satellite has become widespread. This system is, however, a large-scale system.

The conventional tracking apparatus for tracking a moving target is designed to pick up an image of a moving target (e.g., an intruder) with an image pickup device, and obtain the difference between the image (FIG. 30A) input at time $T_n$ and the image (FIG. 30B) input at time $T_{n+1}$. The apparatus then extracts each portion remaining as the difference (each portion having undergone a change) as a halftone value of "255" (the portion having undergone no change is a halftone value of "0") from the obtained difference image (FIG. 30D), thereby obtaining a difference extraction image at time $T_{n+1}$. The apparatus also obtains the difference between the image (FIG. 30B) input at time $T_{n+1}$ and the image (FIG. 30C) input at time $T_{n+2}$, and obtains a difference extraction image (FIG. 30E) at time $T_{n+2}$ by the same processing as described above.

The apparatus obtains the difference between the difference extraction image at time $T_{n+1}$ and the difference extraction image at time $T_{n+2}$, and determines the moving direction and distance of the target on the basis of the obtained difference image (FIG. 30F). Referring to FIG. 30F, a portion P1 from which the image portion has disappeared corresponds to the position of the target at time $T_{n+1}$, and a remaining portion P2 corresponds to the position of the target at time $T_{n+2}$. The moving direction and distance of the target in the interval between time $T_{n+1}$ and time $T_{n+2}$ are obtained from the difference between the positions of the portions P1 and P2. The visual field of the image pickup device is moved on the basis of the obtained moving direction and distance of the target, thereby tracking the target.

This conventional tracking apparatus for tracking a moving target is, however, susceptible to noise. In addition, if a target to be tracked is large (so large as to fill the frame), no superimposed portion is obtained. The moving direction and amount of the target cannot therefore be obtained.

A method of performing tracking by pattern matching is also available. In this method, however, feature amount extraction must be performed, resulting in complicated processing.

SUMMARY OF THE INVENTION

The present invention has been made to solve the above problems, and has as its object to provide a moving direction measuring device which can accurately detect its moving direction without requiring any large-scale system.

It is another object of the present invention to provide a tracking apparatus which is resistant to noise, and can obtain the moving direction and amount of a target without requiring feature amount extraction even if the target is large.

In order to achieve the above objects, according to the first aspect of the present invention (according to claim 1), two-dimensional pattern data input at time $T_n$ is set as collation pattern data, collation Fourier two-dimensional pattern data is generated by performing two-dimensional discrete Fourier transform for the collation pattern data, two-dimensional pattern data input at time $T_{n+1}$ is set as registration pattern data, registration Fourier two-dimensional pattern data is generated by performing two-dimensional discrete Fourier transform for the registration pattern data, the collation Fourier two-dimensional pattern data and the registration Fourier two-dimensional pattern data are synthesized, either two-dimensional discrete Fourier transform or two-dimensional discrete inverse Fourier transform is performed for the resultant synthesized Fourier two-dimensional pattern data, a correlation peak in a correlation component area appearing in the synthesized Fourier two-dimensional pattern data having undergone Fourier transform is obtained, and a direction from a reference position in the correlation component area to a position of the correlation peak is obtained as a moving direction of the device of the present invention.

According to this aspect, the two-dimensional pattern data input at time $T_n$ is set as collation pattern data. Collation Fourier two-dimensional pattern data is generated by performing two-dimensional discrete Fourier transform for the collation pattern data. The two-dimensional pattern data input at time $T_{n+1}$ is set as registration pattern data. Registration Fourier two-dimensional pattern data is generated by performing two-dimensional discrete Fourier transform for the registration pattern data. The collation Fourier two-dimensional pattern data and the registration Fourier two-dimensional pattern data are synthesized. Either two-dimensional discrete Fourier transform or two-dimensional discrete inverse Fourier transform is performed for the resultant synthesized Fourier two-dimensional pattern data. A correlation peak in a correlation component area appearing in the synthesized Fourier two-dimensional pattern data having undergone Fourier transform is obtained. The direction from a reference position in the correlation component area to the position of the correlation peak is obtained as the moving direction of the device of the present invention.

According to the second aspect of the present invention (according to claim 2), in the first aspect, after amplitude suppression processing is performed for the synthesized Fourier two-dimensional pattern data, either two-dimensional discrete Fourier transform or two-dimensional discrete inverse Fourier transform is performed for the data.

According to this aspect, after amplitude suppression processing such as log processing or root processing is performed for the synthesized Fourier two-dimensional pattern data, either two-dimensional discrete Fourier transform or two-dimensional discrete inverse Fourier transform is performed for the data.

According to the third aspect of the present invention (according to claim 3), in the first aspect, the collation Fourier two-dimensional pattern data is generated by performing amplitude suppression processing for the collation pattern data after performing two-dimensional discrete Fourier transform for the data, and the registration Fourier two-dimensional pattern data is generated by performing amplitude suppression processing for the registration pattern data after performing two-dimensional discrete Fourier transform for the data.

According to this aspect, the collation Fourier two-dimensional pattern data is generated by performing amplitude suppression processing such as log processing or root processing for the collation pattern data after performing two-dimensional discrete Fourier transform for the data. The registration Fourier two-dimensional pattern data is generated by performing amplitude suppression processing such as log processing or root processing for the registration pattern data after performing two-dimensional discrete Fourier transform for the data.

According to the fourth aspect of the present invention (according to claim 4), two-dimensional pattern data input at time $T_n$ is set as registration pattern data, registration Fourier two-dimensional pattern data is generated by performing two-dimensional discrete Fourier transform for the registration pattern data, two-dimensional pattern data input at time $T_{n+1}$ is set as collation pattern data, collation Fourier two-dimensional pattern data is generated by performing two-dimensional discrete Fourier transform for the collation pattern data, the registration Fourier two-dimensional pattern data and the collation Fourier two-dimensional pattern data are synthesized, either two-dimensional discrete Fourier transform or two-dimensional discrete inverse Fourier transform is performed for the resultant synthesized Fourier two-dimensional pattern data, a correlation peak in a correlation component area appearing in the synthesized Fourier two-dimensional pattern data having undergone Fourier transform is obtained, and a direction from a position of the correlation peak as a starting point to a reference position in the correlation component area is obtained as a moving direction of the device.

According to this aspect, the two-dimensional pattern data input at time $T_n$ is set as registration pattern data. Registration Fourier two-dimensional pattern data is generated by performing two-dimensional discrete Fourier transform for the registration pattern data. The two-dimensional pattern data input at time $T_{n+1}$ is set as collation pattern data. Collation Fourier two-dimensional pattern data is generated by performing two-dimensional discrete Fourier transform for the collation pattern data. The registration Fourier two-dimensional pattern data and the collation Fourier two-dimensional pattern data are synthesized. Either two-dimensional discrete Fourier transform or two-dimensional discrete inverse Fourier transform is performed for the resultant synthesized Fourier two-dimensional pattern data. A correlation peak in a correlation component area appearing in the synthesized Fourier two-dimensional pattern data having undergone Fourier transform is obtained. The direction from the position of the correlation peak as a starting point to a reference position in the correlation component area is obtained as the moving direction of the device.

According to the fifth aspect of the present invention (according to claim 5), in the fourth aspect, after amplitude suppression processing is performed for the synthesized Fourier two-dimensional pattern data, either two-dimensional discrete Fourier transform or two-dimensional discrete inverse Fourier transform is performed for the data.

According to this aspect, after amplitude suppression processing such as log processing or root processing is performed for the synthesized Fourier two-dimensional pattern data, either two-dimensional discrete Fourier transform or two-dimensional discrete inverse Fourier transform is performed for the data.

According to the sixth aspect of the present invention (according to claim 6), in the fourth aspect, the collation Fourier two-dimensional pattern data is generated by performing amplitude suppression processing for the collation pattern data after performing two-dimensional discrete Fourier transform for the data, and the registration Fourier two-dimensional pattern data is generated by performing amplitude suppression processing for the registration pattern data after performing two-dimensional discrete Fourier transform for the data.

According to this aspect, the collation Fourier two-dimensional pattern data is generated by performing amplitude suppression processing such as log processing or root processing for the collation pattern data after performing two-dimensional discrete Fourier transform for the data. The registration Fourier two-dimensional pattern data is generated by performing amplitude suppression processing such as log processing or root processing for the registration pattern data after performing two-dimensional discrete Fourier transform for the data.

According to the seventh aspect of the present invention (according to claim 7), in the first to third aspects, a correlation peak in a correlation component area appearing in synthesized Fourier two-dimensional pattern data is obtained, and when not less than two correlation peaks are obtained, a position of one of the correlation peaks which is nearest to a position of a previous correlation peak used to obtain the moving direction of the device is set as a position of a current correlation peak, and a direction from a reference position in the correlation component area to the position of the correlation peak is obtained as the current moving direction of the device. According to this aspect, when not less than two correlation peaks are obtained in the correlation component area, the position of one of the correlation peaks which is nearest to the position of the previous correlation peak used to obtain the moving direction of the device is set as the position of the current correlation peak. The direction from the reference position in the correlation component area to the position of the correlation peak is then obtained as the current moving direction of the device.

According to the eighth aspect of the present invention (according to claim 8), in the fourth to sixth aspects, a correlation peak in a correlation component area appearing in synthesized Fourier two-dimensional pattern data is obtained, and when not less than two correlation peaks are obtained, a position of one of the correlation peaks which is nearest to a position of a previous correlation peak used to obtain the moving direction of the device is set as a position of a current correlation peak, and a direction from the position of the correlation peak as a starting point to a reference position in the correlation component area is obtained as the current moving direction of the device. According to this aspect, when not less than two correlation peaks are obtained in the correlation component area, the position of one of the correlation peaks which is nearest to the position of the previous correlation peak used to obtain the moving direction of the device is set as the position of the current correlation peak. The direction from the position of the correlation peak as a starting point to the reference position in the correlation component area is obtained as the current moving direction of the device.

According to the ninth aspect of the present invention (according to claim 9), two-dimensional pattern data input at time $T_n$ is set as registration pattern data, registration Fourier two-dimensional pattern data is generated by performing two-dimensional discrete Fourier transform for the registration pattern data, two-dimensional pattern data input at time $T_{n+1}$ is set as collation pattern data, collation Fourier two-dimensional pattern data is generated by performing two-dimensional discrete Fourier transform for the collation pattern data, the registration Fourier two-dimensional pattern data and the collation Fourier two-dimensional pattern data are synthesized, either two-dimensional discrete Fourier transform or two-dimensional discrete inverse Fourier transform is performed for the resultant synthesized Fourier two-dimensional pattern data, a correlation peak in a range excluding a portion near a reference position in a correlation component area appearing in the synthesized Fourier two-dimensional pattern data having undergone Fourier transform is obtained, a direction from the reference position in the correlation component area to a position of the correlation peak is obtained as a moving direction of a target, a distance from the reference position in the correlation component area to the position of the correlation peak is obtained as a moving amount of the target, whether the target falls outside a data area of two-dimensional pattern data which is likely to be input at time $T_{n+2}$ is predicted on the basis of the obtained moving direction and amount, the visual field of the two-dimensional pattern data input means is moved such that the target falls within the data area of the two-dimensional pattern data input at time $T_{n+2}$ when it is predicted that the target will fall outside the data area of the two-dimensional pattern data which is likely to be input at time $T_{n+2}$, and positions of correlation peaks in a correlation component area appearing in synthesized Fourier two-dimensional pattern data obtained by synthesizing two-dimensional pattern data at time $T_{n+1}$ and time $T_{n+2}$ are corrected on the basis of the moving direction and amount of the visual field of two-dimensional pattern data input means, if the visual field of the two-dimensional pattern data input means is moved and when the moving direction and amount of the target are to be obtained by using the two-dimensional pattern data at time $T_{n+1}$ and time $T_{n+2}$.

According to this aspect, the two-dimensional pattern data input at time $T_n$ is set as registration pattern data. Registration Fourier two-dimensional pattern data is generated by performing two-dimensional discrete Fourier transform for the registration pattern data. The two-dimensional pattern data input at time $T_{n+1}$ is set as collation pattern data. Collation Fourier two-dimensional pattern data is generated by performing two-dimensional discrete Fourier transform for the collation pattern data. The registration Fourier two-dimensional pattern data and the collation Fourier two-dimensional pattern data are synthesized. Either two-dimensional discrete Fourier transform or two-dimensional discrete inverse Fourier transform for the resultant synthesized Fourier two-dimensional pattern data. A correlation peak in a range excluding a portion near a reference position in a correlation component area appearing in the synthesized Fourier two-dimensional pattern data having undergone Fourier transform is obtained. The direction from the reference position in the correlation component area to a position of the correlation peak is obtained as the moving direction of a target. The distance from the reference position in the correlation component area to the position of the correlation peak is obtained as the moving amount of the target. It is predicted, on the basis of the obtained moving direction and amount, whether the target falls outside a data area of two-dimensional pattern data which is likely to be input at time $T_{n+2}$. When it is predicted that the target will fall outside the data area of the two-dimensional pattern data which is likely to be input at time $T_{n+2}$, the visual field of the two-dimensional pattern data input means is moved such that the target falls within the data area of the two-dimensional pattern data input at time $T_{n+2}$. If the visual field of the two-dimensional pattern data input means is moved, and when the moving direction and amount of the target are to be obtained by using the two-dimensional pattern data at time $T_{n+1}$ and time $T_{n+2}$ the positions of the correlation peaks in the correlation component area appearing in synthesized Fourier two-dimensional pattern data obtained by synthesizing two-dimensional pattern data at time $T_{n+1}$ and time $T_{n+2}$ are corrected on the basis of the moving direction and amount of the visual field of the two-dimensional pattern data input means.

According to the 10th aspect of the present invention (according to claim 10), as in the ninth aspect, the moving direction and amount of a target are obtained, and the visual field of the two-dimensional pattern data input means is moved, on the basis of the obtained moving direction and amount, such that the target is located in the data area of two-dimensional pattern data input at next time $T_{n+2}$. When the moving direction and amount of the target are to be obtained by using the two-dimensional pattern data at time $T_{n+1}$ and time $T_{n+2}$, the positions of correlation peaks in a correlation component area appearing in the synthesized Fourier two-dimensional pattern data obtained by synthesizing the pattern data are corrected on the basis of the moving direction and amount of the visual field of the two-dimensional pattern data input means.

According to the 11th aspect of the present invention (according to claim 11), two-dimensional pattern data input at time $T_n$ is set as collation pattern data, collation Fourier two-dimensional pattern data is generated by performing two-dimensional discrete Fourier transform for the collation pattern data, two-dimensional pattern data input at time $T_{n+1}$ is set as registration pattern data, registration Fourier two-dimensional pattern data is generated by performing two-dimensional discrete Fourier transform for the registration pattern data, the collation Fourier two-dimensional pattern data and the registration Fourier two-dimensional pattern data are synthesized, either two-dimensional discrete Fourier transform or two-dimensional discrete inverse Fourier transform is performed for the resultant synthesized Fourier two-dimensional pattern data, a correlation peak in a range excluding a portion near a reference position in a correlation component area appearing in the synthesized Fourier two-dimensional pattern data having undergone Fourier transform is obtained, a direction from a position of the correlation peak as a starting point to a reference position in the correlation component area is obtained as a moving direction of a target, a distance from the position of the correlation peak to the reference position in the correlation component area is obtained as a moving amount of the target, the visual field of the two-dimensional pattern data input means is moved such that the target falls within the data area of the two-dimensional pattern data input at time $T_{n+2}$ when it is predicted that the target will fall outside the data area of the two-dimensional pattern data which is likely to be input at time $T_{n+2}$, and positions of correlation peaks in a correlation component area appearing in synthesized Fourier two-dimensional pattern data obtained by synthesizing two-dimensional pattern data at time $T_{n+1}$ and time $T_{n+2}$ are corrected on the basis of the moving direction and amount of the visual field of two-dimensional pattern data input means, if the visual field of the two-dimensional pattern data input means is moved and when the moving direction and amount of the target are to be obtained by using the two-dimensional pattern data at time $T_{n+1}$ and time $T_{n+2}$.

According to the 12th aspect of the present invention (according to claim 12), as in the 11th aspect, the moving direction and amount of a target are obtained, and the visual field of the two-dimensional pattern data input means is moved, on the basis of the obtained moving direction and amount, such that the target is located in the data area of two-dimensional pattern data input at next time $T_{n+2}$. When the moving direction and amount of the target are to be obtained by using the two-dimensional pattern data at time $T_{n+1}$ and time $T_{n+2}$, the positions of correlation peaks in a correlation component area appearing in the synthesized Fourier two-dimensional pattern data obtained by synthesizing the pattern data are corrected on the basis of the moving direction and amount of the visual field of the two-dimensional pattern data input means.

According to the 13th aspect of the present invention (according to claim 13), in the ninth to 12th aspects, after amplitude suppression processing such as log processing or root processing is performed for the synthesized Fourier two-dimensional pattern data, either two-dimensional discrete Fourier transform or two-dimensional discrete inverse Fourier transform is performed for the data.

According to the 14th aspect of the present invention (according to claim 14), in the ninth and 10th aspects, the collation Fourier two-dimensional pattern data is generated by performing amplitude suppression processing such as log processing or root processing for the collation pattern data after performing two-dimensional discrete Fourier transform for the data. The registration Fourier two-dimensional pattern data is generated by performing amplitude suppression processing such as log processing or root processing for the registration pattern data after performing two-dimensional discrete Fourier transform for the data.

According to the 15th aspect of the present invention (according to claim 15), in the 11th and 12th aspects, the collation Fourier two-dimensional pattern data is generated by performing amplitude suppression processing such as log processing or root processing for the collation pattern data after performing two-dimensional discrete Fourier transform for the data. The registration Fourier two-dimensional pattern data is generated by performing amplitude suppression processing such as log processing or root processing for the registration pattern data after performing two-dimensional discrete Fourier transform for the data.

According to the 16th aspect of the present invention (according to claim 16), two-dimensional pattern data input means for inputting data in a predetermined visual field as two-dimensional pattern data and distance measuring means for measuring a distance to a target located in a visual field of the two-dimensional pattern data input means in a direction of depth are arranged, a difference between a distance $L_n$ to the target in the direction of depth at time $T_n$, which is measured by the distance measuring means, and a distance $L_{n+1}'$ to the target in the direction of depth at time $T_{n+1}$ is obtained as a moving distance of the target in the direction of depth, two-dimensional pattern data input at time $T_n$ is set as registration pattern data, registration Fourier two-dimensional pattern data is generated by performing two-dimensional discrete Fourier transform for the registration pattern data, enlargement/reduction processing is performed for two-dimensional pattern data input at time $T_{n+1}$ in accordance with a ratio between the distance $L_n$ to the target in the direction of depth at time $T_n$, which is measured by the distance measuring means, and the distance $L_{n+1}'$ to the target in the direction of depth at time $T_{n+1}$, two-dimensional pattern data input at time $T_{n+1}$ is set as collation pattern data, collation Fourier two-dimensional pattern data is generated by performing two-dimensional discrete Fourier transform for the collation pattern data, the registration Fourier two-dimensional pattern data and the collation Fourier two-dimensional pattern data are synthesized, either two-dimensional discrete Fourier transform or two-dimensional discrete inverse Fourier transform is performed for the resultant synthesized Fourier two-dimensional pattern data, a correlation peak in a range excluding a portion near a reference position in a correlation component area appearing in synthesized Fourier two-dimensional pattern data having undergone Fourier transform is obtained, a distance from the reference position in the correlation component area to a position of the correlation peak is obtained as a moving distance of the object on a plane perpendicular to the direction of depth, a moving vector of the target is obtained from the moving distance of the target in the direction of depth and the moving distance of the target in the plane perpendicular to the direction of depth, and a position of the two-dimensional pattern data input means is moved on the basis of the moving vector of the target.

According to this aspect, the difference between the distance $L_n$ to the target in the direction of depth at time $T_n$ and the distance $L_{n+1}'$ to the target in the direction of depth at time $T_{n+1}$ is obtained as the moving distance of the target in the direction of depth. The two-dimensional pattern data input at time $T_n$ is set as registration pattern data. The registration Fourier two-dimensional pattern data is generated by performing two-dimensional discrete Fourier transform for the registration pattern data. Enlargement/reduction processing is performed for the two-dimensional pattern data input at time $T_{n+1}$ in accordance with the ratio between the distance $L_n$ to the target in the direction of depth at time $T_n$, which is measured by the distance measuring means, and the distance $L_{n+1}'$ to the target in the direction of depth at time $T_{n+1}$. The two-dimensional pattern data input at time $T_{n+1}$ is set as collation pattern data. The collation Fourier two-dimensional pattern data is generated by performing two-dimensional discrete Fourier transform for the collation pattern data. The registration Fourier two-dimensional pattern data and the collation Fourier two-dimensional pattern data are synthesized. Either two-dimensional discrete Fourier transform or two-dimensional discrete inverse Fourier transform is performed for the resultant synthesized Fourier two-dimensional pattern data. The correlation peak in the range excluding the portion near the reference position in the correlation component area appearing in the synthesized Fourier two-dimensional pattern data having undergone Fourier transform is obtained. The distance from the reference position in the correlation component area to the position of the correlation peak is obtained as the moving distance of the object on the plane perpendicular to the direction of depth. The moving vector of the target is obtained from the moving distance of the target in the direction of depth and the moving distance of the target in the plane perpendicular to the direction of depth. The position of the two-dimensional pattern data input means is moved on the basis of the moving vector of the target.

According to the 17th aspect of the present invention (according to claim 17), two-dimensional pattern data input means for inputting data in a predetermined visual field as two-dimensional pattern data and distance measuring means for measuring a distance to a target located in a visual field of the two-dimensional pattern data input means in a direction of depth are arranged, a difference between a distance $L_n$ to the target in the direction of depth at time $T_n$, which is measured by the distance measuring means, and a distance $L_{n+1}'$ to the target in the direction of depth at time $T_{n+1}$ is obtained as a moving distance of the target in the direction of depth, two-dimensional pattern data input at time $T_n$ is set as collation pattern data, collation Fourier two-dimensional pattern data is generated by performing two-dimensional discrete Fourier transform for the collation pattern data, enlargement/reduction processing is performed for two-dimensional pattern data input at time $T_{n+1}$ in accordance with a ratio between the distance $L_n$ to the target in the direction of depth at time $T_n$, which is measured by the distance measuring means, and the distance $L_{n+1}'$ to the target in the direction of depth at time $T_{n+1}$, two-dimensional pattern data input at time $T_{n+1}$ is set as registration pattern data, registration Fourier two-dimensional pattern data is generated by performing two-dimensional discrete Fourier transform for the registration pattern data, the collation Fourier two-dimensional pattern data and the registration Fourier two-dimensional pattern data are synthesized, either two-dimensional discrete Fourier transform or two-dimensional discrete inverse Fourier transform is performed for the resultant synthesized Fourier two-dimensional pattern data, a correlation peak in a range excluding a portion near a reference position in a correlation component area appearing in synthesized Fourier two-dimensional pattern data having undergone Fourier transform is obtained, a distance from a position of the correlation peak to the reference position in the correlation component area is obtained as a moving distance of the object on a plane perpendicular to the direction of depth, a moving vector of the target is obtained from the moving distance of the target in the direction of depth and the moving distance of the target in the plane perpendicular to the direction of depth, and a position of the two-dimensional pattern data input means is moved on the basis of the moving vector of the target.

According to the 18th aspect of the present invention (according to claim 18), in the 16th and 17th aspects, after amplitude suppression processing such as log processing or root processing is performed for the synthesized Fourier two-dimensional pattern data, either two-dimensional discrete Fourier transform or two-dimensional discrete inverse Fourier transform is performed for the data.

According to the 19th aspect of the present invention (according to claim 19), in the 16th aspect, the two-dimensional pattern data input at time $T_n$ is set as registration pattern data, and the registration Fourier two-dimensional pattern data is generated by performing amplitude suppression processing such as log processing or root processing for the registration pattern data after performing two-dimensional discrete Fourier transform for the data. The two-dimensional pattern data input at time $T_{n+1}$ and having undergone enlargement/reduction processing is set as collation pattern data, and the collation Fourier two-dimensional pattern data is generated by performing amplitude suppression processing such as log processing or root processing for the collation pattern data after performing two-dimensional discrete Fourier transform for the data.

According to the 20th aspect of the present invention (according to claim 20), in the 17th aspect, the two-dimensional pattern data input at time $T_n$ is set as collation pattern data, and the collation Fourier two-dimensional pattern data is generated by performing amplitude suppression processing such as log processing or root processing for the collation pattern data after performing two-dimensional discrete Fourier transform for the data. The two-dimensional pattern data input at time $T_{n+1}$ and having undergone enlargement/reduction processing is set as registration pattern data, and the registration Fourier two-dimensional pattern data is generated by performing amplitude suppression processing such as log processing or root processing for the registration pattern data after performing two-dimensional discrete Fourier transform for the data.

According to the 21st aspect of the present invention (according to claim 21), in the 16th to 20th aspects, a moving direction θ of the target at time $T_{n+1}$, with time $T_n$ serving as a starting point, and a straight distance $L_{n+1}''$ to the target at time $T_{n+1}$ are obtained on the basis of the obtained moving vector of the target, the center of the visual field of the two-dimensional pattern data input means is directed in the obtained moving direction θ, the difference between the obtained straight distance $L_{n+1}''$ and a distance $L_n$ to the target at time $T_n$ is obtained, and the two-dimensional pattern data input means is moved in the moving direction θ by the distance difference.

According to the 22nd aspect of the present invention (according to claim 22), in the 16th to 20th aspects, the position of the two-dimensional pattern data input means is moved, on the basis of the obtained moving vector of the target, by using the same vector as the moving vector.

According to the 23rd aspect of the present invention (according to claim 23), in the 16th to 22nd aspects, first and second cameras are arranged, one of the cameras is used with the two-dimensional pattern data input means, image data picked up by the first camera is set as registration pattern data, registration Fourier two-dimensional pattern data is generated by performing two-dimensional discrete Fourier transform for the registration pattern data, image data picked up by the second camera is set as collation pattern data, collation Fourier two-dimensional pattern data is generated by performing two-dimensional discrete Fourier transform for the collation pattern data, the collation Fourier two-dimensional pattern data and the registration Fourier two-dimensional pattern data are synthesized, either two-dimensional discrete Fourier transform or two-dimensional discrete inverse Fourier transform is performed for the resultant synthesized Fourier two-dimensional pattern data, a correlation peak in a range excluding a portion near a reference position in a correlation component area appearing in the synthesized Fourier two-dimensional pattern data having undergone Fourier transform is obtained, and a distance to the target in the direction of depth is measured on the basis of a distance between a position of the correlation peak and the reference position in the correlation component area.

BRIEF DESCRIPTION OF THE DRAWINGS

FIGS. 1A to 1H are views for explaining a tracking process (Embodiment 1A) in the tracking apparatus shown in FIG. 2;

FIG. 2 is a block diagram showing the arrangement of the tracking apparatus having a moving direction measuring device according to the first to eighth aspects of the present invention;

FIGS. 5A to 5H are views for explaining a tracking process (Embodiment 1B) in the tracking apparatus shown in FIG. 2;

FIG. 6 is a flow chart for explaining a tracking operation (Embodiment 1B) in the tracking apparatus;

FIG. 11 is a view for explaining the movement (Embodiment 2A) of a CCD camera in a case wherein a target M1 moves parallel to a rail;

FIG. 12 is a view for explaining a computation process (Embodiment 2A) for predicting the position of the target M1 at time $T_3$ from the position of the target M1 at time $T_2$ in the tracking apparatus;

FIG. 17 is a block diagram showing a tracking apparatus according to still another embodiment of the present invention;

FIG. 20 is a view for explaining a computation process (Embodiment 2E) for predicting the position of the target M1 at time $T_3$ from the position of the target M1 at time $T_2$ in the tracking apparatus;

FIG. 21 is a view for explaining the movement (Embodiment 2F) of a CCD camera in the visual field direction in a case wherein a target M1 moves along a circumference having a radius l and centered on the image pickup position of the CCD camera;

FIG. 25 is a view for explaining the movement (Embodiment 3A) of a CCD camera in a case wherein a target M1 moves to back and forth and to right and left;

DESCRIPTION OF THE PREFERRED EMBODIMENTS

Figure 3:
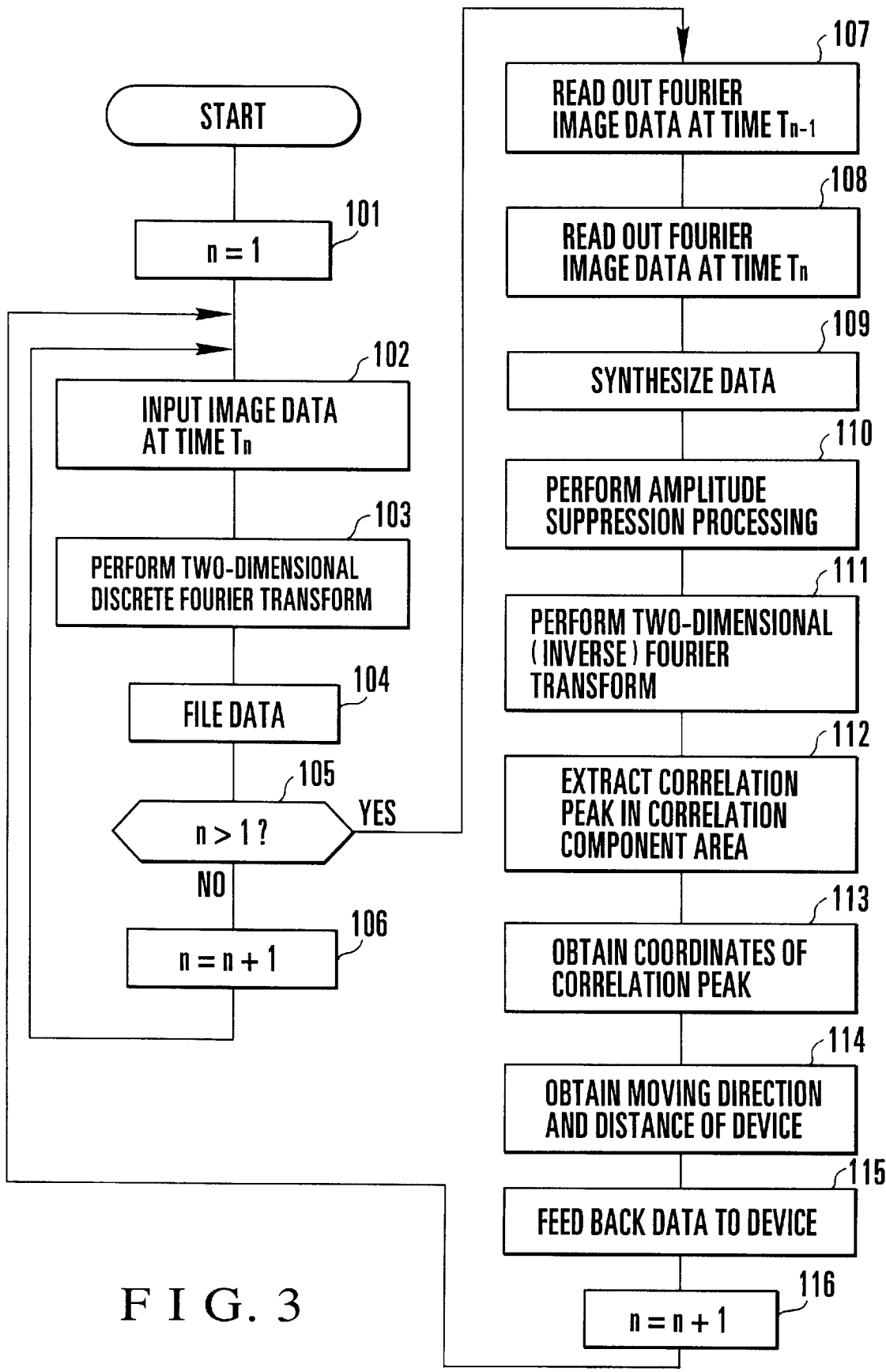
FIG. 3 is a flow chart for explaining a tracking operation (Embodiment 1A) in the tracking apparatus.

The embodiments of the present invention will be described in detail below.

[First to Eighth Aspects: Moving Direction Measuring Device]

FIG. 2 shows the arrangement of a tracking apparatus having a moving direction measuring device according to the first to eighth aspects of the present invention. Referring to FIG. 2, reference numeral 10 denotes a CCD camera; and 20, a control unit including a control section 20-1 having a CPU, a ROM 20-2, a RAM 20-3, a hard disk (HD) 20-4, a frame memory (FM) 20-5, an external connection section (I/F) 20-6, and a Fourier transform section (FFT) 20-7. A tracking program (see FIG. 3) is stored in the ROM 20-2.

[Embodiment 1A: First to Sixth Aspects]

Assume that in this tracking apparatus, the image picked up by a CCD camera 10 moves in the manner shown in FIG. 1A, i.e., the CCD camera 10 is mounted on a vehicle, and the image (background) picked up by the CCD camera 10 changes like images G1, G2, and G3 as the vehicle moves, as shown in FIG. 1A. In this case, tracking (unmanned driving in a designated direction) for the vehicle is performed as follows.

A control section 20-1 sets n=1 (step 101 in FIG. 3) to load the image data G1 from the CCD camera 10 at time $T_n$, i.e., time $T_1$, through a frame memory 20-5 (step 102). The loaded image data G1 is set as collation image data (FIG. 1B). This collation image data is sent to a Fourier transform section 20-7 to perform two-dimensional discrete Fourier transform (DFT) for the collation image data (step 103). With this operation, the collation image data shown in FIG. 1B becomes Fourier image data (collation Fourier image data). The control section 20-1 files this collation Fourier image data (step 104).

For example, two-dimensional discrete Fourier transform is described in "Introduction to Computer Image Processing", edited by Japan Industrial Technology Center, published by Souken Shuppan, pp. 44–45 (reference 1) and the like.

The control section 20-1 checks whether n>1 (step 105). If n≦1, the flow advances to step 106. If n>1, the flow advances to step 107. In this case, since n=1, the flow advances to step 106 to set n=n+1, and then returns to step 102. With this operation, the control section 20-1 loads the image data G2 from the CCD camera 10 at time $T_n$, i.e., time $T_2$ after a lapse of a predetermined time t from time $T_1$, through the frame memory 20-5 (step 102).

The loaded image data G2 is set as registration image data (FIG. 1C). This registration image data is sent to the Fourier transform section 20-7. The Fourier transform section 20-7 performs two-dimensional discrete Fourier transform (DFT) for the registration image data (step 103). With this operation, the registration image data shown in FIG. 1C becomes Fourier image data (registration Fourier image data). The control section 20-1 files this registration Fourier image data (step 104).

The control section 20-1 checks whether n>1 (step 105). If n≦1, the flow advances to step 106. If n>1, the flow advances to step 107. In this case, since n =2, the flow advances to step 107. In step 107, the control section 20-1 reads out the Fourier image data (collation Fourier image data) at tim $T_{n-1}$, i.e., time $T_1$. In step 108, the control section 20-1 reads out the Fourier image data (registration Fourier image data) at time $T_n$, i.e., $T_2$.

The control section 20-1 synthesizes the collation Fourier image data read out in step 107 with the registration Fourier image data read out in step 108 (step 109) to obtain synthesized Fourier image data.

Letting $A \cdot e^{j\theta}$ be the collation Fourier image data, and $B \cdot e^{j\phi}$ be the registration Fourier image data, this synthesized image data is represented by $A \cdot B \cdot e^{j(\theta-\phi)}$. Note that A, B, $\theta$, and $\phi$ are the functions of a frequency (Fourier) space (u, v) $A \cdot B \cdot e^{j(\theta-\phi)}$ is rewritten as $$A \cdot B \cdot e^{j(\theta-\phi)} = A \cdot B \cdot \cos(\theta-\phi) + j \cdot A \cdot B \cdot \sin(\theta-\phi) \quad (1)$$

If $A \cdot e^{j\theta} = \alpha_1 + j\beta_1$ and $B \cdot e^{j\phi} = \alpha_2 + j\beta_2$, then $A = (\alpha_1^2 + \beta_1^2)^{1/2}$, $B = (\alpha_2^2 + \beta_2^2)^{1/2}$, $\theta = \tan^{-1}(\beta_1/\alpha_1)$, and $\phi = \tan^{-1}(\beta_2/\alpha_2)$. By calculating equation (1), synthesized Fourier image data is obtained.

Note that synthesized Fourier image data may be obtained according to $A \cdot B \cdot e^{j(\theta-\phi)} = A \cdot B \cdot e^{j\theta} \cdot e^{j\phi} = A \cdot e^{j\theta} \cdot e^{j\phi} = (\alpha_1 + j\beta_1) \cdot (\alpha_2 - j\beta_2) = (\alpha_1 \cdot \alpha_2 + \beta_1 \cdot \beta_2) + j(\alpha_2 \cdot \beta_1 - \alpha_1 \cdot \beta_2)$.

After the synthesized Fourier image data is obtained in this manner, the control section 20-1 performs amplitude suppression processing for the image data (step 110). In this embodiment, log processing is performed as amplitude suppression processing. More specifically, the log of $A \cdot B \cdot e^{j(\theta-\phi)}$, which is the mathematical expression of the above synthesized Fourier image data, is calculated as $\log(A \cdot B) \cdot e^{j(\theta-\phi)}$, thereby suppressing $A \cdot B$ representing the amplitude to $\log(A \cdot B)$ ($A \cdot B > \log(A \cdot B)$).

The synthesized Fourier image data having undergone amplitude suppression processing is less susceptible to the illuminance difference between the case in which the registration data is obtained and the case in which the collation data is obtained. That is, by performing amplitude suppression processing, the spectrum intensity of each pixel is suppressed to cut extreme values. As a result, more information is made effective.

In this embodiment, log processing is performed as amplitude suppression processing. However, root processing may be performed. In addition, any type of processing, other than log processing and root processing, may be performed as long as amplitudes can be suppressed. If, for example, all amplitudes are set to 1 in amplitude suppression processing, i.e., only phase data are to be processed, both the computation amount and the amount of data processed can be reduced as compared with log processing, root processing, and the like.

Upon performing amplitude suppression processing in step 110, the control section 20-1 sends the synthesized Fourier image data having undergone the amplitude suppression processing to the Fourier transform section 20-7 to perform second two-dimensional discrete Fourier transform (DFT) (step 111).

The control section 20-1 loads the synthesized Fourier image data obtained in step 111, and scans the intensities (amplitudes) of the correlation components of the respective pixels in a predetermined correlation component area (the entire area in this embodiment) from this synthesized Fourier image data to obtain the histogram of the intensities of the correlation components of the respective pixels. The control section 20-1 then extracts a pixel (correlation peak) having the highest intensity among the correlation components in the correlation component area from this histogram (step 112), and obtains the coordinates of the extracted correlation peak (step 113).

FIG. 1E shows the coordinate position of the correlation peak at this time. Referring to FIG. 1E, reference symbol $P_{a1}$ denotes the position of the correlation peak (background peak); and $P_0$, the center of the correlation component area. In this case, the correlation peak $P_{a1}$ indicates the distal end of the movement vector of the vehicle. The direction from the center $P_0$ of the correlation component area to the position $P_{a1}$ of the correlation peak indicates the moving direction of the vehicle. The distance from the center $P_0$ of the correlation component area to the position $P_{a1}$ of the correlation peak indicates the moving distance of the vehicle.

The control section 20-1 obtains the moving direction and distance of the vehicle in the interval between time $T_1$ and time $T_2$ from the coordinate position of the correlation peak $P_{a1}$ (step 114), and feeds back the obtained moving direction and distance to a driving controller 21 (step 115). The control section 20-1 sets n=n+1, i.e., n=3, (step 116). The flow then returns to step 102.

With this operation, the control section 20-1 loads the image data G3 at time $T_3$ from the CCD camera 10 (step 102), and sets the loaded image data G3 as registration image data (FIG. 1D). Two-dimensional discrete Fourier transform is performed for this registration image data (step 103), and is filed as registration Fourier image data (step 104).

If YES in step 105, the flow advances to step 107 to read out the Fourier image data at time $T_{n-1}$, i.e., $T_2$, as collation Fourier image data. In step 108, the Fourier image data (registration Fourier image data) at time $T_n$, i.e., $T_3$, is readout.

The control section 20-1 synthesizes the collation Fourier image data read out in step 107 with the registration Fourier image data read out in step 108 (step 109), and performs two-dimensional discrete Fourier transform for the synthesized Fourier image data (step 111). The control section 20-1 extracts the correlation peak in the correlation component area (step 112), and obtains the coordinates of the extracted correlation peak (step 113).

FIG. 1F shows the coordinate position of the correlation peak at this time. Referring to FIG. 1F, reference symbol $P_{a2}$ denotes the position of a correlation peak. The control section 20-1 obtains the moving direction and distance of the vehicle in the interval between time $T_2$ and time $T_3$ from the coordinate position of the correlation peak $P_{a2}$ (step 114), and feeds back the obtained moving direction and distance of the vehicle to the driving controller 21 (step 115). The control section 20-1 sets n=n+1, n=4, (step 116). The flow then returns to step 102.

As described above, according to the tracking apparatus of this embodiment, the image data input at time $T_n$ is collated with the image data input at time $T_{n+1}$ on the basis of the spatial frequency characteristics, and the moving direction and distance of the vehicle are obtained as the collation results. The apparatus therefore becomes resistant to noise, and can accurately detect the moving direction and distance of the vehicle, resulting in high reliability. In addition, since a large-scale system like a GPS is not required, the operation cost can be reduced.

In this embodiment, two-dimensional discrete Fourier transform is performed in the Fourier transform section 20-7. However, this processing may be performed in the control section 20-1. In addition, in the embodiment, two-dimensional discrete Fourier transform is performed in step 111 in FIG. 3. However, two-dimensional discrete inverse Fourier transform may be performed instead of two-dimensional discrete Fourier transform. That is, instead of two-dimensional discrete Fourier transform, two-dimensional discrete inverse Fourier transform may be performed for synthesized Fourier image data having undergone amplitude suppression processing. Quantitatively, no change in collation precision occurs whether two-dimensional discrete Fourier transform or two-dimensional discrete inverse Fourier transform is performed. Processing based on two-dimensional discrete inverse Fourier transform is disclosed in reference 1.

In this embodiment, amplitude suppression processing is performed first for synthesized Fourier image data, and two-dimensional discrete Fourier transform is then performed (steps 110 and 111). However, amplitude suppression processing may be performed for the registration and collation Fourier image data before synthesis, and the resultant data may be synthesized. More specifically, step 110 in FIG. 3 may be omitted, and step 117 of performing amplitude suppression processing may be set between steps 103 and 104, as shown in FIG. 4A. Alternatively, as shown in FIG. 4B, step 110 in FIG. 3 may be omitted, and step 117 of performing amplitude suppression processing may be set between steps 108 and 109.

In this case, registration Fourier image data and collation Fourier image data having undergone amplitude suppression processing are obtained by amplitude suppression processing in step 117. Synthesized Fourier image data is obtained by synthesizing these Fourier image data.

Figure 4:
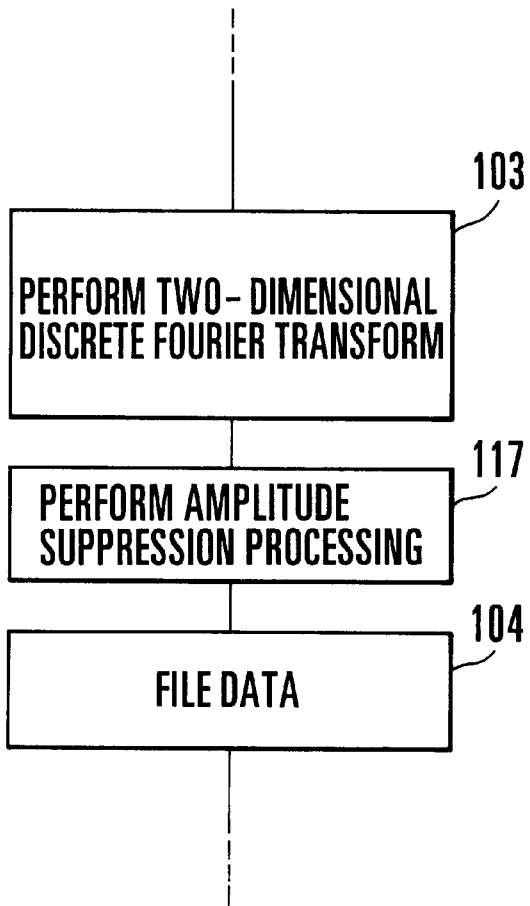
FIGS. 4A–4B is a flow chart for explaining another tracking operation in the tracking apparatus.
Figure 4:
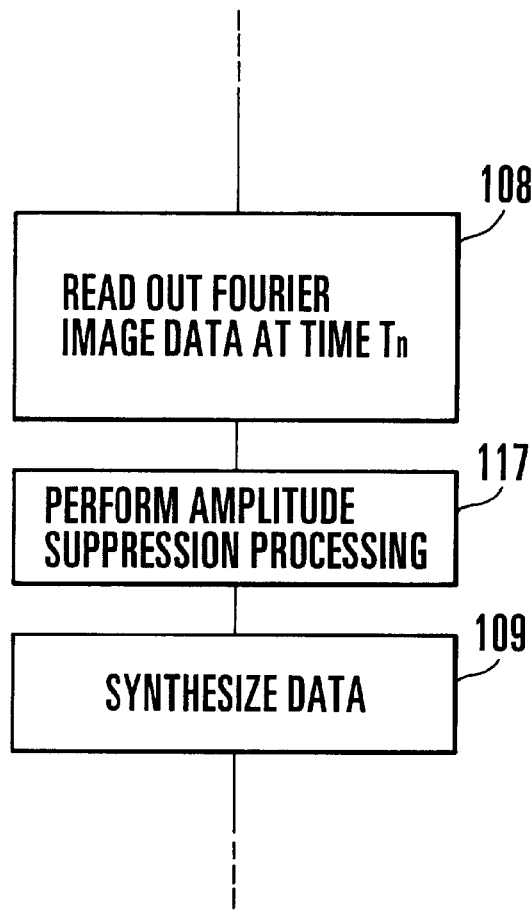
Figure 7:
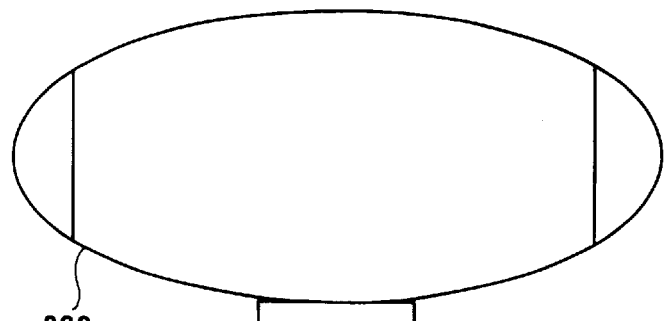
FIG. 7 is a view showing an airship having the tracking device.

In this case, the suppression ratio of the amplitude of the synthesized Fourier image data is low as compared with the case in which amplitude suppression processing is performed after synthesized Fourier image data is generated (FIG. 3). Therefore, the method of performing amplitude suppression processing after synthesized Fourier image data is generated (FIG. 3) is superior in collation precision to the method of generating synthesized Fourier image data after performing amplitude suppression processing (FIG. 4). In the case in which synthesized Fourier image data is generated after amplitude suppression processing is performed (FIG. 4), two-dimensional discrete inverse Fourier transform may be performed for the synthesized Fourier image data instead of two-dimensional discrete Fourier transform.

In this embodiment, the image data picked up at time $T_n$ is set as collation image data, and the image data picked up at time $T_{n+1}$ is set as registration image data. These data are collated with each other on the basis of the spatial frequency characteristics. With this operation, the direction from the center of the correlation component area to the position of the correlation peak is obtained as the moving direction of the vehicle, and the distance from the center of the correlation component area to the position of the correlation peak is obtained as the moving distance of the vehicle. Even if, however, the image data picked up at time $T_n$ is set as registration image data, and the image data picked up at time $T_{n+1}$ is set as collation image data, the moving direction and distance of the vehicle can be obtained in the same manner.

In this case, the data in FIG. 1G is obtained with respect to the data in FIG. 1E, and the data in FIG. 1H is obtained with respect to the data in FIG. 1F. That is, correlation peaks $P_{a1}'$ and $P_{a2}'$ appear at the opposite positions to the correlation peaks $P_{a1}$ and $P_{a2}$ in FIGS. 1E and 1H with respect to the center $P_0$ of the correlation area. In this case, therefore, the direction from the position of the correlation peak $P_{a1}'$ ($P_{a2}'$) to the center $P_0$ of the correlation component area is obtained as the moving direction of the vehicle, and the distance from the position of the correlation peak $P_{a1}'$ ($P_{a2}'$) to the center $P_0$ of the correlation component area is obtained as the moving distance of the vehicle.

[Embodiment 1B: Seventh and Eighth Aspects]

Embodiment 1A is based on the assumption that no moving object is present in the image G picked up by the CCD camera 10. In practice, however, the image picked up by the CCD camera 10 includes moving objects such as other vehicles and birds. Embodiment 1B therefore aims at performing tracking control without any problems even if the image picked up by a CCD camera 10 includes moving objects.

Assume that the image (background) picked up by the CCD camera 10 changes like images G1, G2, and G3 as the vehicle moves. When another vehicle is present as a moving object in the images G2 and G3 (no moving object is still absent in the image G1), tracking for the vehicle is performed as follows.

A control section 20-1 sets n=1 (step 201 in FIG. 6) to load the image data G1 from the CCD camera 10 at time $T_n$, i.e., time $T_1$, through a frame memory 20-5 (step 202). The loaded image data G1 is set as collation image data (FIG. 5B). This collation image data is sent to a Fourier transform section 20-7 to perform two-dimensional discrete Fourier transform (DFT) for the collation image data (step 203). With this operation, the collation image data shown in FIG. 5B becomes Fourier image data (collation Fourier image data). The control section 20-1 files this collation Fourier image data (step 204).

The control section 20-1 checks whether n>1 (step 205). If n≦1, the flow advances to step 206. If n>1, the flow advances to step 207. In this case, since n=1, the flow advances to step 206 to set n=n+1, and then returns to step 202. With this operation, the control section 20-1 loads the image data G2 (the image data G2 including a vehicle 100 (see FIG. 5C)) from the CCD camera 10 at time $T_n$, i.e., time $T_2$ after a lapse of a predetermined time t from time $T_1$, through the frame memory 20-5 (step 202).

The loaded image data G2 is set as registration image data (FIG. 5C). This registration image data is sent to the Fourier transform section 20-7. The Fourier transform section 20-7 performs two-dimensional discrete Fourier transform (DFT) for the registration image data (step 203). With this operation, the registration image data shown in FIG. 5C becomes Fourier image data (registration Fourier image data). The control section 20-1 files this registration Fourier image data (step 204).

The control section 20-1 checks whether n>1 (step 205). If n≦1, the flow advances to step 206. If n>1, the flow advances to step 207. In this case, since n=2, the flow advances to step 207. In step 207, the control section 20-1 reads out the Fourier image data (collation Fourier image data) at tim $T_{n-1}$, i.e., time $T_1$. In step 208, the control section 20-1 reads out the Fourier image data (registration Fourier image data) at time $T_n$, i.e., $T_2$.

The control section 20-1 synthesizes the collation Fourier image data read out in step 207 with the registration Fourier image data read out in step 208 (step 209) to obtain synthesized Fourier image data in the same manner as in Embodiment 1A.

Upon obtaining the synthesized Fourier image data in this manner, the control section 20-1 performs amplitude suppression processing in the same manner as in Embodiment 1A (step 210). The control section 20-1 then sends the synthesized Fourier image data having undergone amplitude suppression processing to the Fourier transform section 20-7 to perform second two-dimensional discrete Fourier transform (DFT) for the image data (step 211).

The control section 20-1 loads the synthesized Fourier image data obtained in step 211, and scans the intensities (amplitudes) of the correlation components of the respective pixels in a predetermined correlation component area (the entire area in this embodiment) from this synthesized Fourier image data to obtain the histogram of the intensities of the correlation components of the respective pixels. The control section 20-1 then obtains pixels whose intensities are equal to or higher than a predetermined level as correlation peaks. If two or more correlation peaks are obtained, one of the correlation peaks which is located nearest to the position of the previously stored correlation peak (to be described later) is extracted as the correlation peak in the current correlation component area (step 212). The coordinates of this extracted correlation peak are obtained (step 213). In this case, since the moving vehicle 100 is not present in the image data at time $T_1$, only a correlation peak indicating the background peak appears in the correlation component area.

FIG. 5E shows the coordinate position of the correlation peak at this time. Referring to FIG. 5E, reference symbol $P_{a1}$ denotes the position of the correlation peak (background peak); and $P_0$, the center of the correlation component area. In this case, the correlation peak $P_{a1}$ indicates the distal end of the movement vector of the vehicle. The direction from the center $P_0$ of the correlation component area to the position $P_{a1}$ of the correlation peak indicates the moving direction of the vehicle. The distance from the center $P_0$ of the correlation component area to the position $P_{a1}$ of the correlation peak indicates the moving distance of the vehicle.

The control section 20-1 obtains the moving direction and distance of the vehicle in the interval between time $T_1$ and time $T_2$ from the coordinate position of the correlation peak $P_{a1}$, and stores the coordinate position of this correlation peak $P_{a1}$ as the position of the current correlation peak (step 214). The control section 20-1 feeds back the obtained moving direction and distance to a driving controller 21 (step 215). The control section 20-1 sets n=n+1, i.e., n=3, (step 216). The flow then returns to step 202.

With this operation, the control section 20-1 loads the image data G3 (the image data G3 including the moving vehicle 100 (see FIG. 5D)) at time $T_3$ from the CCD camera 10 (step 202), and sets the loaded image data G3 as registration image data (FIG. 5D). Two-dimensional discrete Fourier transform is performed for this registration image data (step 203), and is filed as registration Fourier image data (step 204).

If YES in step 205, the flow advances to step 207 to read out the Fourier image data at time $T_{n-1}$, i.e., $T_2$, as collation Fourier image data. In step 208, the Fourier image data (registration Fourier image data) at time $T_n$, i.e., $T_3$, is readout.

The control section 20-1 synthesizes the collation Fourier image data read out in step 207 with the registration Fourier image data read out in step 208 (step 209), and performs two-dimensional discrete Fourier transform for the synthesized Fourier image data (step 211). The control section 20-1 then obtains pixels whose intensities are equal to or higher than a predetermined level as correlation peaks. If two or more correlation peaks are obtained, one of the correlation peaks which is located nearest to the position of the previously stored correlation peak (to be described later) is extracted as the correlation peak in the current correlation component area (step 212). The coordinates of this extracted correlation peak are obtained (step 213). In this case, since the moving vehicle 100 is present in both the image data at time $T_2$ and the image data at time $T_3$, and the moving vehicle 100 is moving between these image data, both a correlation peak indicating the background peak and a correlation peak indicating a vehicle peak appear in the correlation component area.

FIG. 5F shows the coordinate positions of the correlation peaks in this case. Referring to FIG. 5F, reference symbol $P_{a2}$ denotes the position of the correlation peak indicating the background peak; and $P_{b1}$, the position of the correlation peak indicating the vehicle peak. The moving vector of the moving vehicle 100 which is obtained with the position of the correlation peak $P_{b1}$ being considered as the leading end becomes an inverse vector with respect to a center $P_0$ on the correlation component area. In this case, the control section 20-1 extracts the correlation peak $P_{a2}$ nearest to the position of the previously stored correlation peak, i.e., the correlation peak $P_{a1}$ stored in step 214, as the current correlation peak, and obtains the coordinate position of the extracted correlation peak $P_{a2}$.

The control section 20-1 obtains the moving direction and distance of the vehicle in the interval between time $T_2$ and time $T_3$ from the coordinate position of the obtained correlation peak $P_{a2}$, and stores the coordinate position of the correlation peak $P_{a2}$ as the position of the current correlation peak (step 214). The control section 20-1 feeds back the obtained moving direction and distance of the vehicle to the driving controller 21 (step 215), and sets n=n+1 (step 216), i.e., n=4. The flow then returns to step 202.

In this embodiment, two-dimensional discrete Fourier transform is performed in the Fourier transform section 20-7. However, this processing may be performed in the control section 20-1. In addition, in the embodiment, two-dimensional discrete Fourier transform is performed in step 211 in FIG. 6. However, two-dimensional discrete inverse Fourier transform may be performed instead of two-dimensional discrete Fourier transform. That is, instead of two-dimensional discrete Fourier transform, two-dimensional discrete inverse Fourier transform may be performed for synthesized Fourier image data having undergone amplitude suppression processing.

In this embodiment, amplitude suppression processing is performed first for synthesized Fourier image data, and two-dimensional discrete Fourier transform is then performed (steps 210 and 211). However, amplitude suppression processing may be performed for the registration and collation Fourier image data before synthesis, and the resultant data may be synthesized. More specifically, step 210 in FIG. 6 may be omitted, and the step of performing amplitude suppression processing may be set between steps 203 and 204. Alternatively, step 210 in FIG. 6 may be omitted, and the step of performing amplitude suppression processing may be set between steps 208 and 209.

In this embodiment, the image data picked up at time $T_n$ is set as collation image data, and the image data picked up at time $T_{n+1}$ is set as registration image data. These data are collated with each other on the basis of the spatial frequency characteristics. With this operation, the direction from the center of the correlation component area to the position of the correlation peak is obtained as the moving direction of the vehicle, and the distance from the center of the correlation component area to the position of the correlation peak is obtained as the moving distance of the vehicle. Even if, however, the image data picked up at time $T_n$ is set as registration image data, and the image data picked up at time $T_{n+1}$ is set as collation image data, the moving direction and distance of the vehicle can be obtained in the same manner.

In this case, the data in FIG. 5G is obtained with respect to the data in FIG. 5E, and the data in FIG. 5H is obtained with respect to the data in FIG. 5F. That is, correlation peaks $P_{a1}'$, $P_{a2}'$, and $P_{b1}'$ appear at the opposite positions to the correlation peaks $P_{a1}$, $P_{a2}$, and $P_{b1}$ in FIGS. 5E and 5F. In this case, therefore, the direction from the position of the correlation peak $P_{a1}'$ ($P_{a2}'$) to the center $P_0$ of the correlation component area is obtained as the moving direction of the vehicle, and the distance from the position of the correlation peak $P_{a1}'$ ($P_{a2}'$) to the center $P_0$ of the correlation component area is obtained as the moving distance of the vehicle.

Embodiments 1A and 1B have been described above by taking the vehicle as an example. However, these embodiments can be applied to a flying object such as an airship. If, for example, the embodiments are applied to an airship, the CCD camera 10 is mounted on the bottom portion of an airship 200 to pick up a scene below.

In Embodiments 1A and 1B, amplitude suppression processing is performed, but need not always be performed.

The present invention can be applied to not only a tracking apparatus but also image blur correction for, e.g., a VTR camera. That is, since the moving direction and distance of the VTR camera can be obtained from the images picked up at time $T_n$ and time $T_{n+1}$ by using the technique of the present invention, image blur correction for the VTR camera can be performed by feeding back the obtained data to the image processing section.

In the above embodiment, referring to FIGS. 1E and 1F, the entire area of the synthesized Fourier image data is set as a correlation component area, but a partial area may be set as a correlation component area. In this case, a correlation peak indicating the background appears at different positions depending on how a correlation component area is set. In this case, the position at which a correlation peak indicating the background is likely to appear is set as a reference position, and a correlation peak is extracted within a range excluding a portion near the reference position.

[Tracking Apparatus: Ninth to 15th Aspects]

Figure 8:
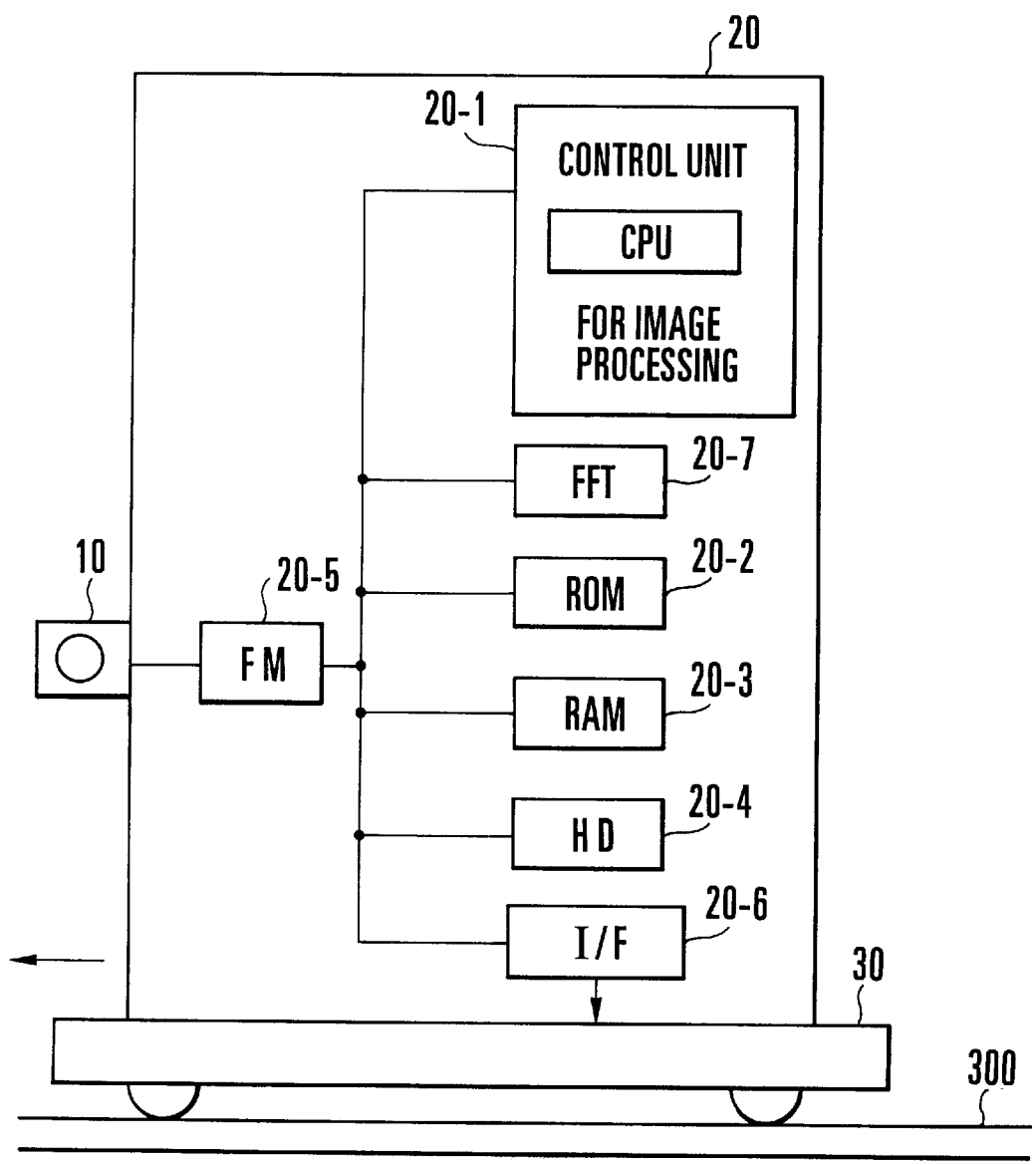
FIG. 8 is a block diagram showing the arrangement of a tracking apparatus according to the ninth to 15th aspects of the present invention.
Figure 15:
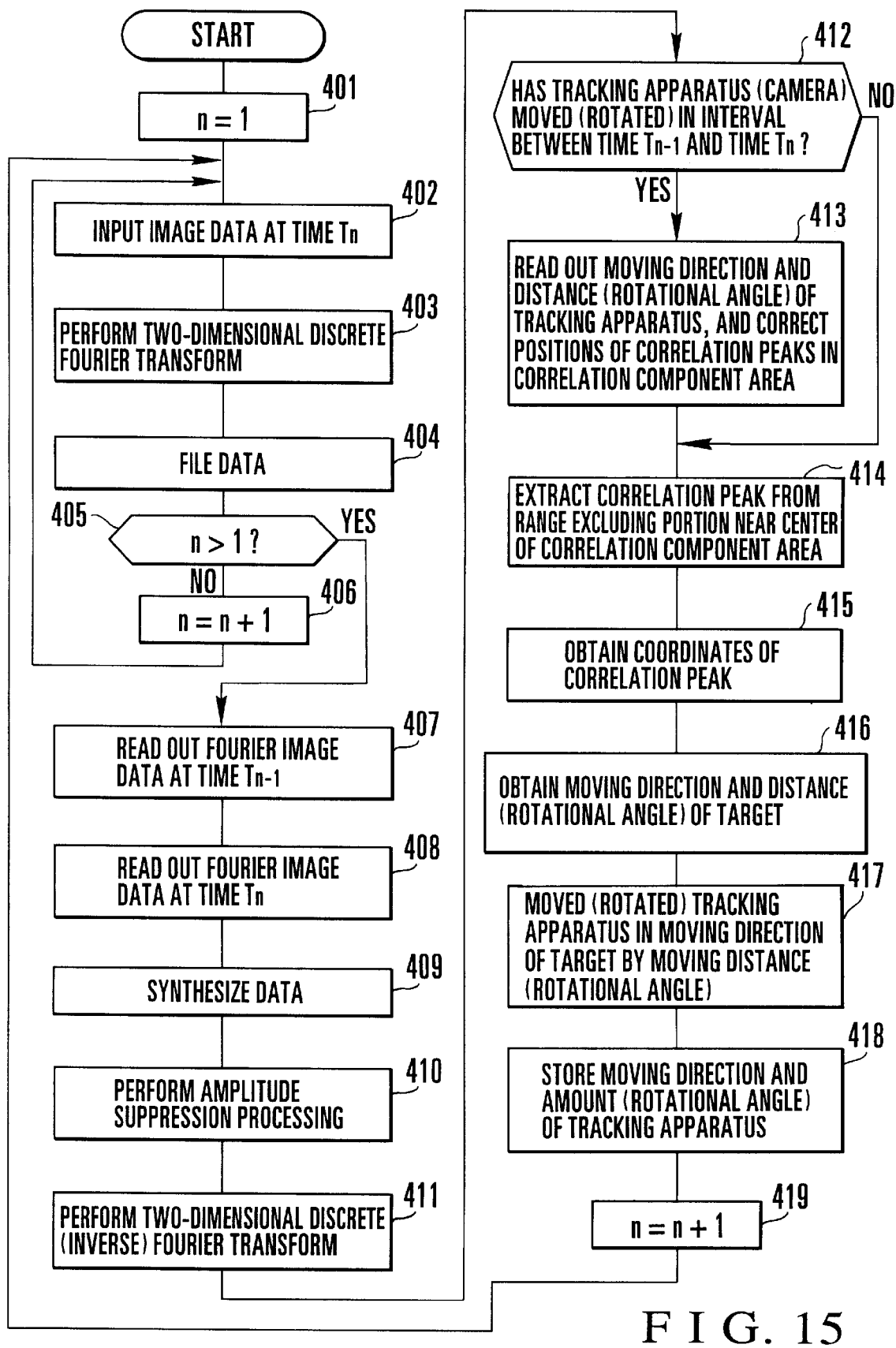
FIG. 15 is a flow chart for explaining a tracking operation (Embodiment 2C) in the tracking apparatus shown in FIG. 8.

FIG. 8 shows the arrangement of a tracking apparatus according to the ninth to 15th aspects of the present invention. The same reference numerals in FIG. 8 denote the same parts as in FIG. 2, and a description thereof will be omitted. In this embodiment, a tracking program (see FIGS. 10 and 15) is stored in a ROM 20-2. A CCD camera 10 and a control unit 20 are mounted on a movable table 30. The movable table 30 moves on a rail 300 upon reception of a command from the control unit 20. In this embodiment, as shown in FIG. 11, a target (object) M1 moves parallel to the rail 300. That is, the CCD camera 10 and the target M1 move while always keeping a distance l therebetween.

[Embodiment 2A: Ninth, 13th, and 14th Aspects]

In this tracking apparatus, when an object M1 moves parallel to a rail 300, as shown in FIG. 11, tracking is performed as follows.

Figures 9A, 9B, 9C, 9D:
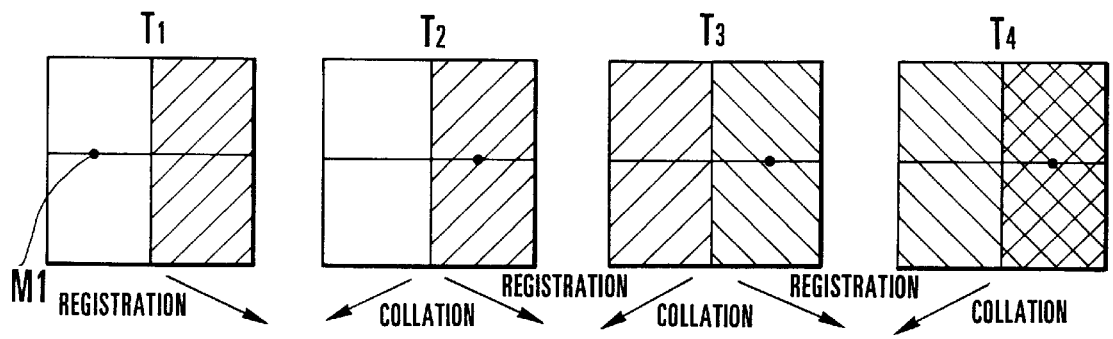
FIGS. 9A to 9L are views for explaining a tracking process (Embodiment 2A) in the tracking apparatus shown in FIG. 8.

A control section 20-1 sets n=1 (step 301 in FIG. 10) to load the image data of the target M1 picked up at time $T_n$, i.e., time $T_1$, and input from the CCD camera 10 through a frame memory 20-5 (step 302). The loaded image data is set as registration image data (FIG. 9A). This registration image data is sent to a Fourier transform section 20-7 to perform two-dimensional discrete Fourier transform (DFT) for the registration image data (step 303). With this operation, the registration image data shown in FIG. 9A becomes Fourier image data (registration Fourier image data). The control section 20-1 files this registration Fourier image data (step 304).

The control section 20-1 checks whether n>1 (step 305). If n≦1, the flow advances to step 306. If n>1, the flow advances to step 307. In this case, since n=1, the flow advances to step 306 to set n=n+1, and then returns to step 302. With this operation, the control section 20-1 loads the image data of the target M1 picked up at time $T_n$, i.e., time $T_2$ after a lapse of a predetermined time t from time $T_1$, and input from the CCD camera 10 through the frame memory 20-5 (step 302).

The loaded image data is set as collation image data (FIG. 9B). This collation image data is sent to the Fourier transform section 20-7. The Fourier transform section 20-7 performs two-dimensional discrete Fourier transform (DFT) for the collation image data (step 303). With this operation, the collation image data shown in FIG. 9B becomes Fourier image data (collation Fourier image data). The control section 20-1 files this collation Fourier image data (step 304).

The control section 20-1 checks whether n>1 (step 305). If n≦1, the flow advances to step 306. If n>1, the flow advances to step 307. In this case, since n=2, the flow advances to step 307. In step 307, the control section 20-1 reads out the Fourier image data (registration Fourier image data) at time $T_{n-1}$, i.e., time $T_1$. In step 308, the control section 20-1 reads out the Fourier image data (collation Fourier image data) at time $T_n$, i.e., $T_2$.

The control section 20-1 synthesizes the registration Fourier image data read out in step 307 with the collation Fourier image data read out in step 308 (step 309) to obtain synthesized Fourier image data.

Letting $A \cdot e^{j\Theta}$ be the collation Fourier image data, and $B \cdot e^{j\Phi}$ be the registration Fourier image data, this synthesized image data is represented by $A \cdot B \cdot e^{j(\Theta-\Phi)}$. The control section 20-1 then performs amplitude suppression processing for this synthesized Fourier image data (step 310). In this embodiment, log processing is performed as amplitude suppression processing. More specifically, the log of $A \cdot B \cdot e^{j(\Theta-\Phi)}$, which is the mathematical expression of the above synthesized Fourier image data, is calculated as $\log(A \cdot B) \cdot e^{j(\Theta-\Phi)}$, thereby suppressing $A \cdot B$ representing the amplitude to $\log(A \cdot B)$ ($A \cdot B > \log(A \cdot B)$).

The synthesized Fourier image data having undergone amplitude suppression processing is less susceptible to the illuminance difference between the case in which the registration data is obtained and the case in which the collation data is obtained. That is, by performing amplitude suppression processing, the spectrum intensity of each pixel is suppressed to cut extreme values. As a result, more information is made effective.

In this embodiment, log processing is performed as amplitude suppression processing. However, root processing may be performed. In addition, any type of processing, other than log processing and root processing, may be performed as long as amplitudes can be suppressed. If, for example, all amplitudes are set to 1 in amplitude suppression processing, i.e., only phase data are to be processed, both the computation amount and the amount of data processed can be reduced as compared with log processing, root processing, and the like.

Upon performing amplitude suppression processing in step 310, the control section 20-1 sends the synthesized Fourier image data having undergone amplitude suppression processing to the Fourier transform section 20-7 to perform second two-dimensional discrete Fourier transform (DFT) for the image data (step 311).

The control section 20-1 checks whether the tracking apparatus, i.e., the CCD camera 10, has moved in the interval between time $T_1$ and time $T_2$ (step 312). If it is determined that the CCD camera 10 has moved, the flow advances to step 313. If it is determined the that CCD camera 10 has not moved, the flow advances to step 314. In this case, since the CCD camera 10 has not moved, the flow advances step 314.

The control section 20-1 loads the synthesized Fourier image data obtained in step 311, and scans the intensities (amplitudes) of the correlation components of the respective pixels in a predetermined correlation component area (the entire area in this embodiment) from this synthesized Fourier image data to obtain the histogram of the intensities of the correlation components of the respective pixels. The control section 20-1 then extracts a pixel (correlation peak) having the highest intensity among the correlation components in a range excluding a portion near the center of the correlation component area from this histogram (step 314), and obtains the coordinates of the extracted correlation peak (step 315).

Figures 9E, 9F, 9G:
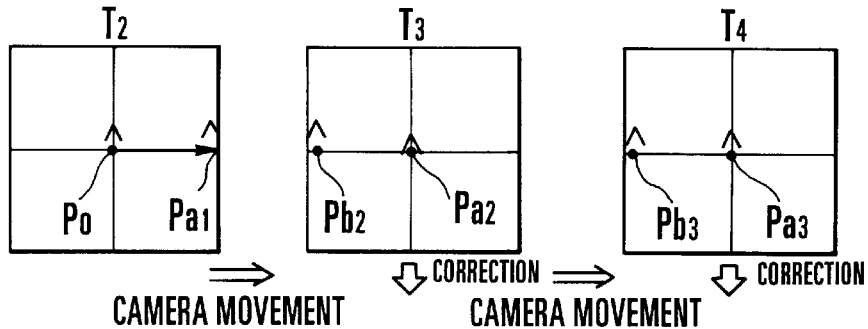

FIG. 9E shows the coordinate position of the correlation peak at this time. Referring to FIG. 9E, reference symbol $P_{a1}$ denotes the position of the correlation peak (background peak); and $P_0$, the center of the correlation component area. In this case, the correlation peak $P_{a1}$ indicates the target M1. The direction from the center $P_0$ of the correlation component area to the position $P_{a1}$ of the correlation peak indicates the moving direction of the target M1. The distance from the center $P_0$ of the correlation component area to the position $P_{a1}$ of the correlation peak indicates the moving distance of the target M1. Note that a correlation peak indicating the background appears near the center $P_0$ of the correlation component area.

The control section 20-1 obtains the moving direction and distance of the target M1 in the interval between time $T_1$ and time $T_2$ from the coordinate position of the correlation peak $P_{a1}$ (step 316), and predicts the position of the target M1 at time $T_3$ from the position of the target M1 at time $T_2$ (step 317). In this case, the control section 20-1 obtains the position of the target M1 at time $T_2$ by computation processing, and predicts the position of the target M1 at time $T_3$ from the obtained position of the target M1.

More specifically, as shown in FIG. 12, the control section 20-1 obtains the position of the target M1 at time $T_2$ from the center of a field angle θ of the CCD camera 10 as an angle α by computation processing, and obtains the position of the target M1 at time $T_2$ as +l tan α from this angle α with the intersection as a zero starting point between the center of the field angle θ of the CCD camera 10 and the locus of the target M1. The control section 20-1 then adds the predicted moving distance in the interval between time $T_2$ and time $T_3$ to +l tan α to predict the position of the target M1 at time $T_3$.

The control section 20-1 checks whether the predicted position of the target M1 at time $T_3$ falls within the field angle θ of the CCD camera 10, i.e., the position of the target M1 deviates from ±l tan θ/2 (step 318). If the position does not deviate from ±l tan θ/2, the position of the CCD camera 10 is kept unchanged (step 319). If the position deviates from ±l tan θ/2, the CCD camera 10 is moved in the moving direction of the target M1 by the moving distance (step 320).

In this case, since the predicted position of the target M1 at time $T_3$ exceeds +l tan θ/2, i.e., it is predicted that the target M1 will fall outside the data area of image data that is likely to be input at time $T_3$, the flow advances to step 320 to move the CCD camera 10 in the moving direction of the target M1 by the moving distance obtained in step 316.

The control section 20-1 stores the moving direction and distance of the CCD camera 10 (step 321), and sets n=n+1 (step 322), i.e., n=3. The flow then returns to step 302.

With this operation, the control section 20-1 loads the image data of the target M1 at time $T_3$ (step 302), and sets the loaded image data of the target M1 as collation image data (FIG. 9C). Two-dimensional discrete Fourier transform is performed for this collation image data (step 303), and is filed as collation Fourier image data (step 304).

If YES in step 305, the flow advances to step 307 to read out the Fourier image data at time $T_{n-1}$, i.e., $T_2$, as registration Fourier image data. In step 308, the Fourier image data (collation Fourier image data) at time $T_n$, i.e., $T_3$, is readout.

The control section 20-1 synthesizes the registration Fourier image data read out in step 307 with the collation fourier image data read out in step 308 (step 309), and performs two-dimensional discrete Fourier transform for the synthesized Fourier image data (step 311).

Subsequently, the control section 20-1 checks whether the CCD camera 10 has moved in the interval between time $T_2$ and time $T_3$ (step 312). If the CCD camera 10 has moved, the flow advances to step 313. If the CCD camera 10 has not moved, the flow advances to step 314. In this case, since the CCD camera 10 is moved in step 320, the flow advances to step 313.

Figures 9H, 9I:
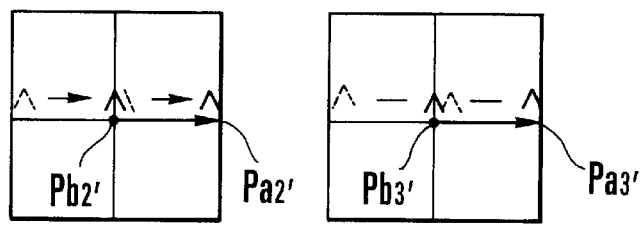

With this operation, the control section 20-1 reads out the moving direction and distance of the CCD camera 10 which are stored in step 321, and corrects the positions of the correlation peaks in the correlation component area which appear in the synthesized Fourier image data obtained in step 311 on the basis of the moving direction and distance. In the synthesized Fourier image data obtained in step 311, as shown in FIG. 9F, a correlation peak $P_{b2}$ indicating the background peak and a correlation peak $P_{a2}$ indicating the peak of the target M1 appear in the correlation component area. The positions of the correlation peaks $P_{b2}$ and $P_{a2}$ are set as position information including information indicating the movement of the CCD camera 10 because the CCD camera 10 has moved in the interval between time $T_2$ and time $T_3$. The positions of the correlation peaks $P_{b2}$ and $P_{a2}$ are shifted by the moving distance of the CCD camera 10 to obtain correlation peaks $P_{b2}'$ and $P_{a2}'$ (FIG. 9H).

The control section 20-1 extracts a correlation peak within a range excluding a portion near the center of the corrected correlation component area (step 314), and obtains the coordinates of this extracted correlation peak $P_{a2}'$ (step 315). The control section 20-1 obtains the moving direction and distance of the target M1 in the interval between time $T_2$ and time $T_3$ from the coordinate position of the correlation peak $P_{a2}'$ (step 316), and predicts the position of the target M1 at time $T_4$ from the position of the target M1 at time $T_3$ (step 317). The control section 20-1 repeats the processing in step 318 and the subsequent steps.

As described above, according to the tracking apparatus of this embodiment, the image data input at time $T_n$ is collated with the image data input at time $T_{n+1}$ on the basis of the spatial frequency characteristics, and the moving direction and distance of the target M1 are obtained as the collation results. The apparatus therefore becomes resistant to noise. In addition, even if the target M1 is large, the moving direction and distance of the target can be obtained without requiring feature amount extraction, resulting in simple processing.

In this embodiment, two-dimensional discrete Fourier transform is performed in the Fourier transform section 20-7. However, this processing may be performed in the control section 20-1. In addition, in the embodiment, two-dimensional discrete Fourier transform is performed in step 311 in FIG. 10. However, two-dimensional discrete inverse Fourier transform may be performed instead of two-dimensional discrete Fourier transform. That is, instead of two-dimensional discrete Fourier transform, two-dimensional discrete inverse Fourier transform may be performed for synthesized Fourier image data having undergone amplitude suppression processing. Quantitatively, no change in collation precision occurs whether two-dimensional discrete Fourier transform or two-dimensional discrete inverse Fourier transform is performed. Processing based on two-dimensional discrete inverse Fourier transform is disclosed in reference 1.

In this embodiment, amplitude suppression processing is performed first for synthesized Fourier image data, and two-dimensional discrete Fourier transform is then performed (steps 310 and 311). However, amplitude suppression processing may be performed for the registration and collation Fourier image data before synthesis, and the resultant data may be synthesized. More specifically, step 310 in FIG. 10 may be omitted, and step 323 of performing amplitude suppression processing may be set between steps 303 and 304, as shown in FIG. 13A. Alternatively, as shown in FIG. 13B, step 310 in FIG. 10 may be omitted, and step 323 of performing amplitude suppression processing may be set between steps 308 and 309.

In this case, registration Fourier image data and collation Fourier image data having undergone amplitude suppression processing are obtained by amplitude suppression processing in step 323. Synthesized Fourier image data is obtained by synthesizing these Fourier image data.

Figure 10:
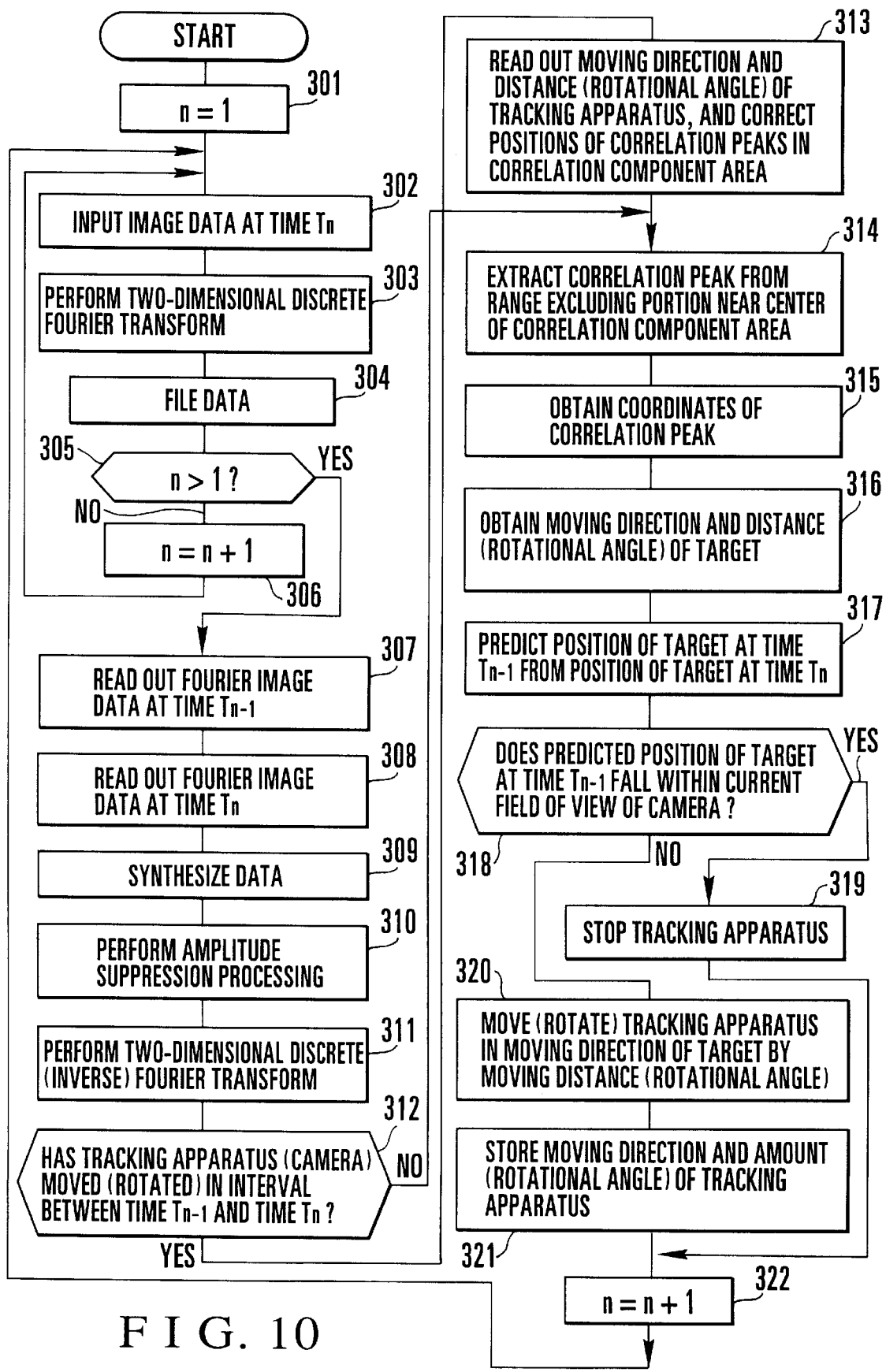
FIG. 10 is a flow chart for explaining a tracking operation (Embodiment 2A) in the tracking apparatus.
Figure 13:
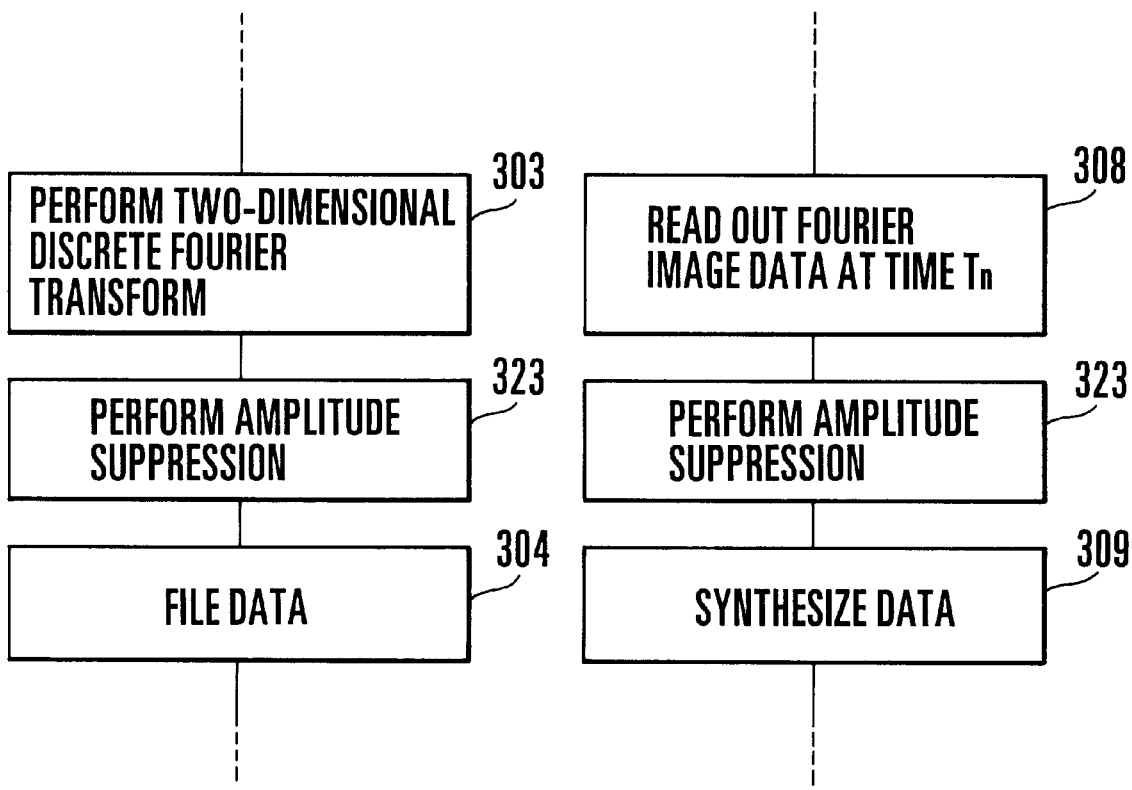
FIGS. 13A and 13B are flow charts showing other examples of the tracking operation in the tracking apparatus.

In this case, the suppression ratio of the amplitude of the synthesized Fourier image data is low as compared with the case in which amplitude suppression processing is performed after synthesized Fourier image data is generated (FIG. 10). Therefore, the method of performing amplitude suppression processing after synthesized Fourier image data is generated (FIG. 10) is superior in collation precision to the method of generating synthesized Fourier image data after performing amplitude suppression processing (FIG. 13). In the case in which synthesized Fourier image data is generated after amplitude suppression processing is performed (FIG. 13), two-dimensional discrete inverse Fourier transform may be performed for the synthesized Fourier image data instead of two-dimensional discrete Fourier transform.

In this embodiment, amplitude suppression processing is performed, but need not always be performed.

In this embodiment, in step 320, the CCD camera 10 is moved in the moving direction of the target M1 by the moving distance obtained in step 316. However, the moving speed of the CCD camera 10 may be determined (the CCD camera 10 is moved in the same direction as that of the target M1 at a speed higher than that of the target M1) such that the target M1 is picked up in the center of the field angle θ of the CCD camera 10 at the next time point ($T_3$).

Alternatively, the moving distance of the CCD camera 10 may be determined such that the target M1 is picked up in the center of the field angle θ of the CCD camera 10 at the current time point ($T_2$). With this operation, in the case shown in FIG. 12, the angle α need not be obtained from the next time point ($T_3$), resulting in simple computation processing. That is, the position of the target M1 at time $T_2$ coincides with the center of the field angle θ of the CCD camera 10 at time $T_3$, and hence the angle α need not be obtained from the next time point $T_3$.

[Embodiment 2B: 11th, 13th, and 15th Aspects]

In Embodiment 2A, the image data picked up at time $T_n$ is set as registration image data, and the image data picked up at time $T_{n+1}$ is set as collation image data. These data are collated with each other on the basis of the spatial frequency characteristics to obtain the direction from the center of the correlation component area to the position of the correlation peak as the moving direction of the target M1 and the distance from the center of the correlation component area to the position of the correlation peak as the moving distance of the target M1. In contrast to this, in Embodiment 2B, the image data picked up at time $T_n$ is set as collation image data, and the image data picked up at time $T_{n+1}$ is set as registration image data. With this operation, the moving direction and distance of a target M1 can be obtained in the same manner as in Embodiment 2A.

Figures 9J, 9K, 9L:
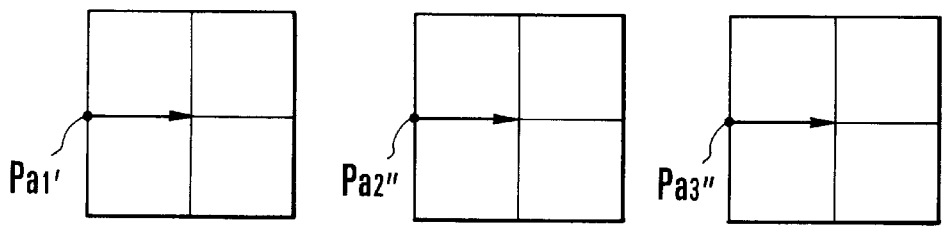

In this case, the data in FIG. 9J is obtained with respect to the data in FIG. 9E, the data in FIG. 9K is obtained with respect to the data in FIG. 9H, and the data in FIG. 9L is obtained with respect to the data in FIG. 9I. That is, correlation peaks $P_{a1}''$, $P_{a2}''$, and $P_{a3}''$ appear at the opposite positions to correlation peaks $P_{a1}'$, $P_{a2}'$, and $P_{a3}'$ in FIGS. 9E, 9H, and 9I with respect to a center $P_0$ of the correlation area. In this case, therefore, the direction from the position of the correlation peak $P_{a1}'$ ($P_{a2}''$, $P_{a3}''$), as the starting point, to the center $P_0$ of the correlation component area is obtained as the moving direction of the target M1, and the distance from the position of the correlation peak $P_{a1}'$ ($P_{a2}''$, $P_{a3}''$) to the center $P_0$ of the correlation component area is obtained as the moving distance of the target M1.

[Embodiment 2C: 10th, 13th, and 14th Aspects]

Figure 14:
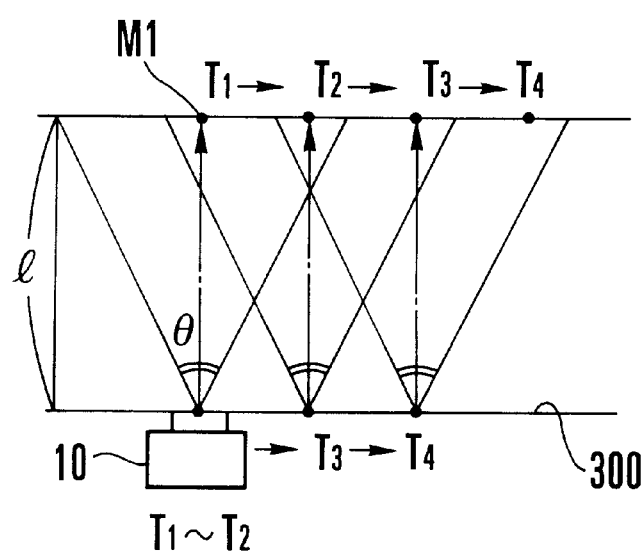
FIG. 14 is a view for explaining the movement (Embodiment 2C) of a CCD camera in a case wherein a target M1 moves parallel to a rail.

This embodiment is an improvement on Embodiment 2A. As shown in FIG. 14, the center of a field angle θ of a CCD camera 10 is matched with a target M1 at time $T_1$ (the first photographing operation). That is, the target M1 is picked up in the center of the field angle range of the CCD camera 10. In this embodiment, when the target M1 moves parallel to a rail 300 as shown in FIG. 14, tracking is performed as follows.

Figures 16A, 16B, 16C, 16D:
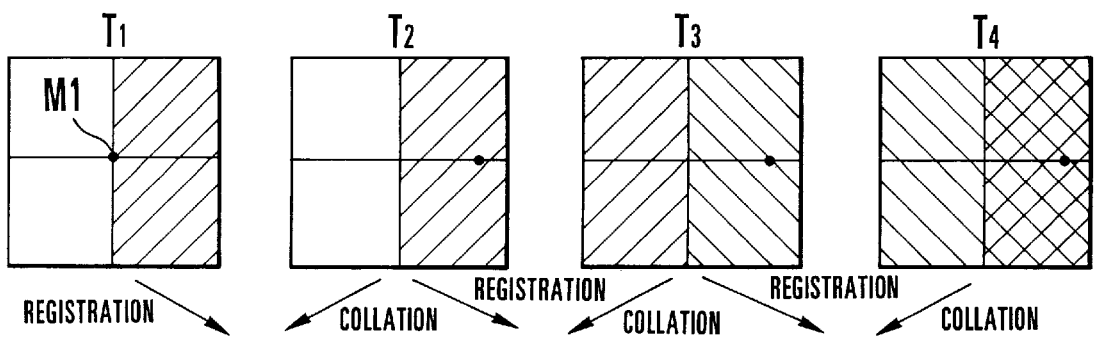
FIGS. 16A to 16L are views for explaining a tracking process (Embodiment 2C) in the tracking apparatus.

A control section 20-1 sets n=1 (step 401 in FIG. 15) to load the image data of the target M1 picked up at time $T_n$, i.e., time $T_1$, and input from the CCD camera 10 through a frame memory 20-5 (step 402). The loaded image data is set as registration image data (FIG. 16A). This registration image data is sent to a Fourier transform section 20-7 to perform two-dimensional discrete Fourier transform (DFT) for the registration image data (step 403). With this operation, the registration image data shown in FIG. 16A becomes Fourier image data (registration Fourier image data). The control section 20-1 files this registration Fourier image data (step 404).

The control section 20-1 checks whether n>1 (step 405). If n≦1, the flow advances to step 406. If n>1, the flow advances to step 407. In this case, since n=1, the flow advances to step 406 to set n=n+1, and then returns to step 402. With this operation, the control section 20-1 loads the image data of the target M1 picked up at time $T_n$, i.e., time $T_2$ after a lapse of a predetermined time t from time $T_1$, and input from the CCD camera 10 through the frame memory 20-5 (step 402).

The loaded image data is set as collation image data (FIG. 16B). This collation image data is sent to the Fourier transform section 20-7. The Fourier transform section 20-7 performs two-dimensional discrete Fourier transform (DFT) for the collation image data (step 403). With this operation, the collation image data shown in FIG. 16B becomes Fourier image data (collation Fourier image data). The control section 20-1 files this collation Fourier image data (step 404).

The control section 20-1 checks whether n>1 (step 405). If n≦1, the flow advances to step 406. If n>1, the flow advances to step 407. In this case, since n=2, the flow advances to step 407. In step 407, the control section 20-1 reads out the Fourier image data (registration Fourier image data) at tim $T_{n-1}$, i.e., time $T_1$. In step 408, the control section 20-1 reads out the Fourier image data (collation Fourier image data) at time $T_n$, i.e., $T_2$.

The control section 20-1 synthesizes the registration Fourier image data read out in step 407 with the collation Fourier image data read out in step 408 (step 409) to obtain synthesized Fourier image data.

Upon obtaining the synthesized Fourier image data in this manner, the control section 20-1 performs amplitude suppression processing (step 410) and sends the synthesized Fourier image data having undergone amplitude suppression processing to the Fourier transform section 20-7 to perform second two-dimensional discrete Fourier transform (DFT) for the image data (step 411).

The control section 20-1 checks whether the tracking apparatus, i.e., the CCD camera 10, has moved in the interval between time $T_1$ and time $T_2$ (step 412). If it is determined that the CCD camera 10 has moved, the flow advances to step 413. If it is determined the that CCD camera 10 has not moved, the flow advances to step 414. In this case, since the CCD camera 10 has not moved, the flow advances step 414.

The control section 20-1 loads the synthesized Fourier image data obtained in step 411, and scans the intensities (amplitudes) of the correlation components of the respective pixels in a predetermined correlation component area (the entire area in this embodiment) from this synthesized Fourier image data to obtain the histogram of the intensities of the correlation components of the respective pixels. The control section 20-1 then extracts a pixel (correlation peak) having the highest intensity among the correlation components in a range excluding a portion near the center of the correlation component area from this histogram (step 414), and obtains the coordinates of the extracted correlation peak (step 415).

Figures 16E, 16F, 16G:
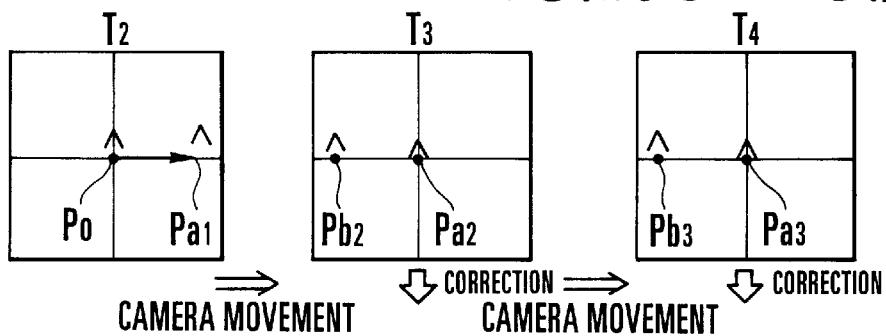

FIG. 16E shows the coordinate position of the correlation peak at this time. Referring to FIG. 16E, reference symbol $P_{a1}$ denotes the position of the correlation peak (background peak); and $P_0$, the center of the correlation component area. In this case, the correlation peak $P_{a1}$ indicates the target M1. The direction from the center $P_0$ of the correlation component area to the position $P_{a1}$ of the correlation peak indicates the moving direction of the target M1. The distance from the center $P_0$ of the correlation component area to the position $P_{a1}$ of the correlation peak indicates the moving distance of the target M1. Note that a correlation peak indicating the background appears near the center $P_0$ of the correlation component area.

The control section 20-1 obtains the moving direction and distance of the target M1 in the interval between time $T_1$ and time $T_2$ from the coordinate position of the correlation peak $P_{a1}$ (step 416), and quickly moves the CCD camera 10 in the moving direction of the target M1 by the moving distance obtained in step 416 (step 417). With this operation, the center of the field angle θ of the CCD camera 10 is matched with a position near the position of the target M1 at time $T_2$ before time $T_3$.

The control section 20-1 stores the moving direction and distance of the CCD camera 10 (step 418), and sets n=n+1 (step 419), i.e., n=3. The flow then returns to step 402.

With this operation, the control section 20-1 loads the image data of the target M1 at time $T_3$ (step 402), and sets the loaded image data of the target M1 as collation image data (FIG. 16C). Two-dimensional discrete Fourier transform is performed for this collation image data (step 403), and is filed as collation Fourier image data (step 404).

If YES instep 405, the flow advances to step 407 to read out the Fourier image data at time $T_{n-1}$, i.e., $T_2$, as registration Fourier image data. In step 408, the Fourier image data (collation Fourier image data) at time $T_n$, i.e., $T_3$, is readout.

The control section 20-1 synthesizes the registration Fourier image data read out in step 407 with the collation fourier image data read out in step 408 (step 409), and performs two-dimensional discrete Fourier transform for the synthesized Fourier image data (step 411).

Subsequently, the control section 20-1 checks whether the CCD camera 10 has moved in the interval between time $T_2$ and time $T_3$ (step 412). If the CCD camera 10 has moved, the flow advances to step 413. If the CCD camera 10 has not moved, the flow advances to step 414. In this case, since the CCD camera 10 is moved in step 420, the flow advances to step 413.

Figures 16H, 16I:
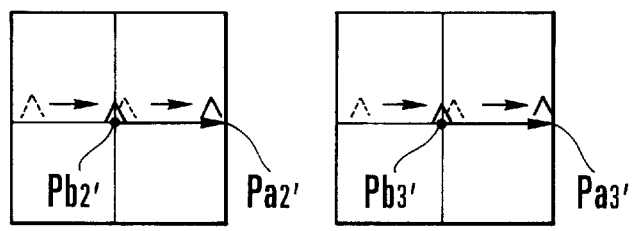

With this operation, the control section 20-1 reads out the moving direction and distance of the CCD camera 10 which are stored in step 418, and corrects the positions of the correlation peaks in the correlation component area which appear in the synthesized Fourier image data obtained in step 411 on the basis of the moving direction and distance. In the synthesized Fourier image data obtained in step 411, as shown in FIG. 16F, a correlation peak $P_{b2}$ indicating the background peak and a correlation peak $P_{a2}$ indicating the peak of the target M1 appear in the correlation component area. The positions of the correlation peaks $P_{b2}$ and $P_{a2}$ are set as position information including information indicating the movement of the CCD camera 10 because the CCD camera 10 has moved in the interval between time $T_2$ and time $T_3$. The positions of the correlation peaks $P_{b2}$ and $P_{a2}$ are shifted by the moving distance of the CCD camera 10 to obtain correlation peaks $P_{b2}'$ and $P_n'$ (FIG. 16H).

The control section 20-1 extracts a correlation peak within a range excluding a portion near the center of the corrected correlation component area (step 414), and obtains the coordinates of this extracted correlation peak $P_{a2}'$ (step 415). The control section 20-1 obtains the moving direction and distance of the target M1 in the interval between time $T_2$ and time $T_3$ from the coordinate position of the correlation peak $P_{a2}'$ (step 416), and predicts the position of the target M1 at time $T_4$ from the position of the target M1 at time $T_3$ (step 417). The control section 20-1 repeats the processing in step 417 and the subsequent steps.

According to Embodiment 2C, since the target M1 is always picked up near the front of the CCD camera 10, there is no need to determine whether to move the CCD camera 10 by predicting the position of the target M1 at time $T_{n+1}$ from the position of the target at time $T_n$. The computation processing can therefore be simplified.

In this embodiment, the center of the field angle θ of the CCD camera 10 is matched with the target M1 at time $T_1$ (the first photographing operation). However, the target M1 need not always be matched with the center of the field angle θ. If, for example, movement of the target M1 to the right is known in advance in the case shown in FIG. 14, the target M1 may be matched with the left region of the field angle θ of the CCD camera 10. With this operation, the target M1 is always picked up at the region on the left side of the center of the field angle θ of the CCD camera 10, thereby properly coping with large clockwise movement of the target M1.

As in Embodiment 2A, in Embodiment 2C, various types of processing can be freely modified.

[Embodiment 2D: 12th, 13th, and 15th Aspects]

In Embodiment 2C, the image data picked up at time $T_n$ is set as registration image data, and the image data picked up at time $T_{n+1}$ is set as collation image data. These data are collated with each other on the basis of the spatial frequency characteristics to obtain the direction from the center of the correlation component area to the position of the correlation peak as the moving direction of the target M1 and the distance from the center of the correlation component area to the position of the correlation peak as the moving distance of the target M1. In contrast to this, in Embodiment 2D, the image data picked up at time $T_n$ is set as collation image data, and the image data picked up at time $T_{n+1}$ is set as registration image data. With this operation, the moving direction and distance of a target M1 can be obtained in the same manner as in Embodiment 2C.

Figures 16J, 16K, 16L:
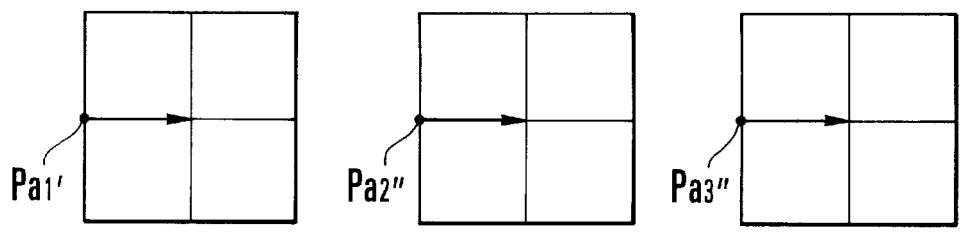

In this case, the data in FIG. 16J is obtained with respect to the data in FIG. 16E, the data in FIG. 16K is obtained with respect to the data in FIG. 16H, and the data in FIG. 16L is obtained with respect to the data in FIG. 16I. That is, correlation peaks $P_{a1}'$, $P_{a2}"$, and $P_{a3}"$ appear at the opposite positions to correlation peaks $P_{a1}$, $P_{a2}'$, and $P_{a3}'$ in FIGS. 16E, 16H, and 16I with respect to a center $P_0$ of the correlation area. In this case, therefore, the direction from the position of the correlation peak $P_{a1}'$ ($P_{a2}"$, $P_{a3}"$), as the starting point, to the center $P_0$ of the correlation component area is obtained as the moving direction of the target M1, and the distance from the position of the correlation peak $P_{a1}'$ ($P_{a2}"$, $P_{a3}"$) to the center $P_0$ of the correlation component area is obtained as the moving distance of the target M1.

Figure 18:
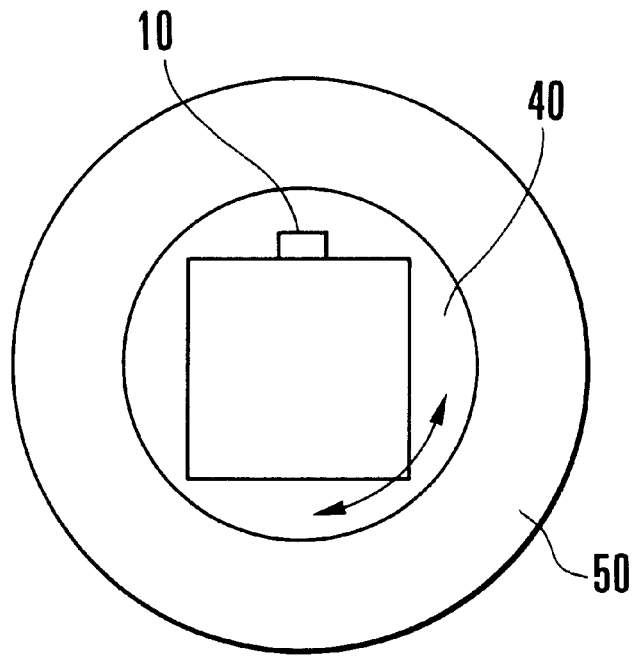
FIG. 18 is a plan view of the tracking apparatus.

FIG. 17 shows the arrangement of a tracking apparatus according to still another embodiment of the present invention. The same reference numerals in FIG. 17 denote the same parts as in FIG. 8, and a description thereof will be omitted. In this embodiment, a CCD camera 10 and a control unit 20 are mounted on a turntable 40. The turntable 40 rotates on the upper surface of a stationary base 50 upon reception of a command from the control unit 20 (see FIG. 18). In this embodiment, as shown in FIG. 19, a target (object) M1 moves along a circumference having a radius l and centered on the image pickup position of the CCD camera 10.

[Embodiment 2E: Ninth, 13th, and 14th Aspects]

Figure 19:
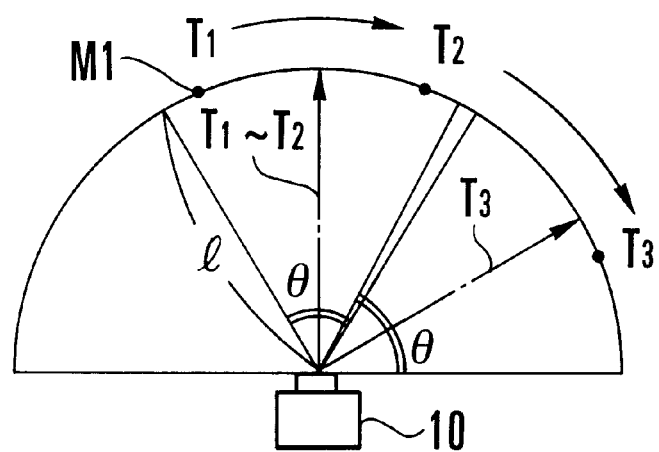
FIG. 19 is a view for explaining the movement (Embodiment 2E) of a CCD camera in the visual field direction in a case wherein a target M1 moves along a circumference having a radius l and centered on the image pickup position of the CCD camera.

In this tracking apparatus, when a target M1 moves along a circumference having a radius l and centered on the image pickup position of a CCD camera 10, as shown in FIG. 19, tracking is performed in the same manner as in Embodiment 2A. That is, the target M1 is tracked in accordance with the tracking program shown in FIG. 10.

In step 312, it is checked whether the tracking apparatus, i.e., the visual field direction of the CCD camera 10, has moved in the interval between time $T_{n-1}$ and time $T_n$. In step 316, the moving direction and angle (rotational angle) of the target M1 are obtained. In step 320, the visual field direction of the CCD camera 10 is moved in the moving direction of the target M1 by the moving angle obtained in step 316. In step 321, the moving direction and angle of the CCD camera 10 are stored. In step 313, the moving direction and angle of the CCD camera 10 which are stored in step 321 are read out, and the position of the correlation component peak in the correlation component area is corrected on the basis of the readout data.

In this embodiment, in step 317, the position of the target M1 at time $T_n$ is obtained by computation processing, and the position of the target M1 at time $T_{n+1}$ is predicted from the obtained position of the target M1. In step 318, it is checked whether the predicted position of the target M1 falls within the current field of view of the CCD camera 10.

More specifically, as shown in FIG. 20, the position of the target M1 at time $T_n$ is obtained as an angle $\alpha$ from the center of a field angle $\theta$ of the CCD camera 10 by computation processing. The position of the target M1 at time $T_n$ is obtained as $+l\alpha$ from this angle $\alpha$ with the intersection as a zero starting point between the center of the field angle $\theta$ of the CCD camera 10 and the locus of the target M1. The predicted moving distance in the interval between time $T_n$ and time $T_{n+1}$ is added to $+l\alpha$ to predict the position of the target M1 at time $T_{n+1}$.

It is checked whether the predicted position of the target M1 at time $T_{n+1}$ falls within the field angle $\theta$ of the CCD camera 10, i.e., the position of the target M1 deviates from $\pm l\theta/2$. If the position does not deviate from $\pm l\theta/2$, the direction of the field of view of the CCD camera 10 is kept unchanged. If the position deviates from $\pm l\theta/2$, the direction of the field of view of the CCD camera 10 is moved in the moving direction of the target M1 by the moving angle.

In this embodiment, in step 320, the CCD camera 10 is moved in the moving direction of the target M1 by the moving angle obtained in step 316. However, the moving speed of the CCD camera 10 may be determined (the CCD camera 10 is moved in the same direction as that of the target M1 at a speed higher than that of the target M1) such that the target M1 at the next time point ($_{n+1}$) is picked up in the center of the field angle $\theta$ of the CCD camera 10.

Alternatively, the moving angle of the CCD camera 10 in the direction of the field of view may be determined such that the target M1 at the current time point ($T_2$) is picked up in the center of the field angle $\theta$ of the CCD camera 10. With this operation, in the case shown in FIG. 20, the angle $\alpha$ need not be obtained from the next time point ($T_3$), and hence the computation processing can be simplified. That is, the position of the target M1 at time $T_2$ coincides with the center of the field angle $\theta$ of the CCD camera 10 at time $T_3$, and hence the angle $\alpha$ need not be obtained from time $T_3$.

[Embodiment 2F: 10th, 13th, and 14th Aspects]

This embodiment is an improvement on Embodiment 2E. As shown in FIG. 21, the center of a field angle $\theta$ of a CCD camera 10 is matched with a target M1 at time $T_1$ (the first photographing operation). More specifically, the target M1 is picked up in the center of the range of the field of view of the CCD camera 10. In this embodiment, when the target M1 moves along a circumference having a radius l and centered on the image pickup position of the CCD camera 10, as shown in FIG. 21, tracking is performed in the same manner as in Embodiment 2C. That is, the target M1 is tracked in accordance with the tracking program shown in FIG. 15.

In this case, In step 412, it is checked whether the tracking apparatus, i.e., the visual field direction of the CCD camera 10, has moved in the interval between time $T_{n-1}$ and time $T_n$. In step 416, the moving direction and angle of the target M1 are obtained. In step 417, the visual field direction of the CCD camera 10 is moved in the moving direction of the target M1 by the moving angle obtained in step 416. In step 418, the moving direction and angle of the CCD camera 10 are stored. In step 413, the moving direction and angle of the CCD camera 10, stored in step 418, are read out, and the position of the correlation component peak in the correlation component area is corrected on the basis of the readout data.

According to Embodiment 2F, since the target M1 is always picked up near the front of the CCD camera 10, there is no need to determine whether to move the CCD camera 10 by predicting the position of the target M1 at time $T_{n+1}$ from the position of the target at time $T_n$. The computation processing can therefore be simplified.

In this embodiment, the center of the field angle $\theta$ of the CCD camera 10 is matched with the target M1 at time $T_1$ (the first photographing operation). However, the target M1 need not always be matched with the center of the field angle $\theta$. If, for example, movement of the target M1 in the clockwise direction is known in advance in the case shown in FIG. 19, the target M1 may be matched with the left region of the field angle $\theta$ of the CCD camera 10. With this operation, the target M1 is always picked up at the region on the left side of the center of the field angle $\theta$ of the CCD camera 10, thereby properly coping with large clockwise movement of the target M1.

In the above embodiment, tracking of a two-dimensional pattern has been described. However, tracking of a three-dimensional pattern can also be performed in the same manner. Tracking of multi-dimensional patterns including two- and three-dimensional patterns can be performed in the same manner.

In the above embodiment, referring to FIGS. 9E, 9F, and 9G, the entire area of the synthesized Fourier image data is set as the correlation component area, but part of the area may be set as a correlation component area. In this case, a correlation peak indicating the background appears at different positions depending on how a correlation component area is set. In this case, the position at which a correlation peak indicating the background is likely to appear is set as a reference position, and a correlation peak is extracted within a range excluding a portion near the reference position.

[Tracking Apparatus: 16th to 23rd Aspects]

Figure 22:
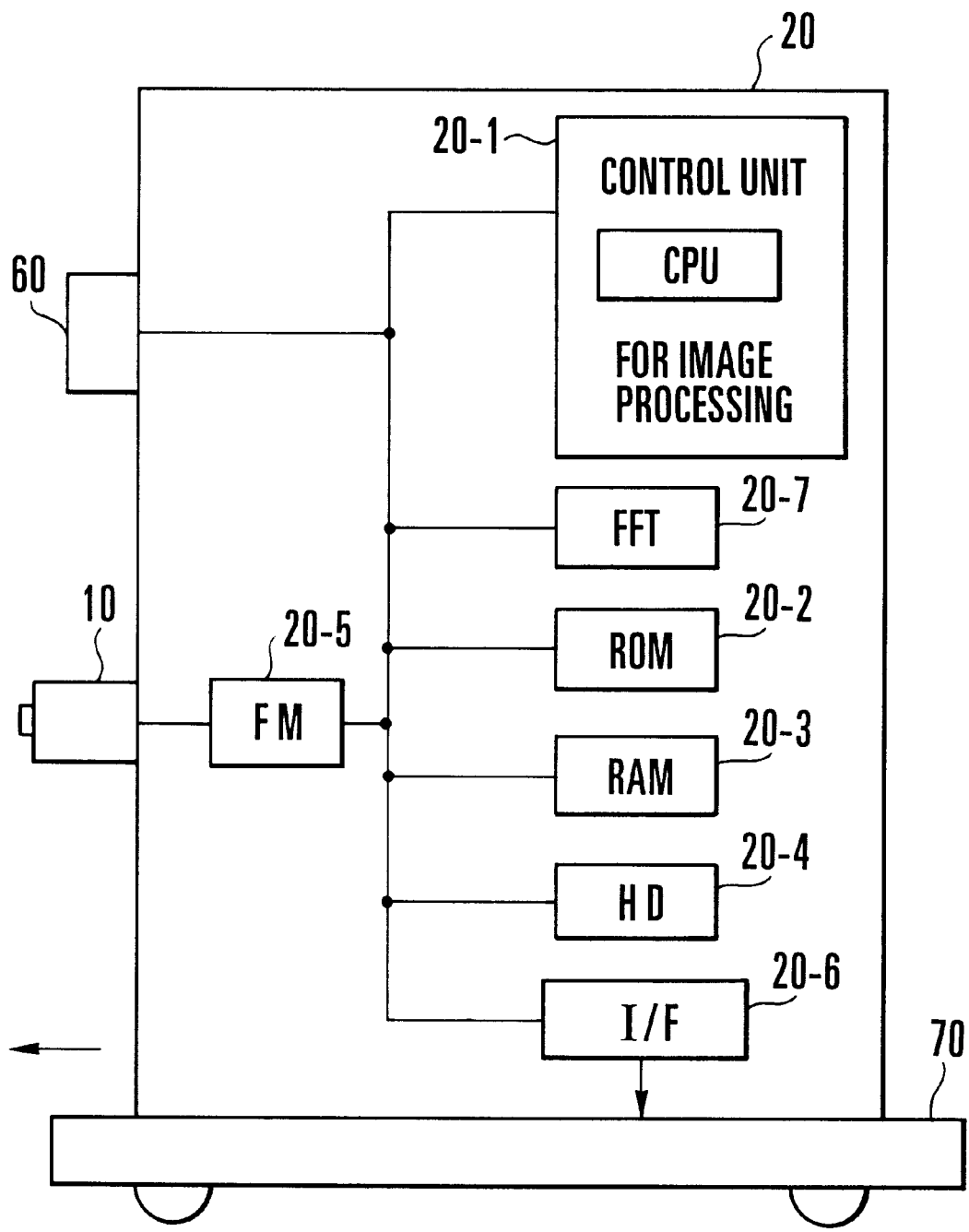
FIG. 22 is a block diagram showing the arrangement of a tracking apparatus according to the 16th to 23rd aspects of the present invention.

FIG. 22 shows the arrangement of a tracking apparatus according to the 16th to 23rd aspects of the present invention. The same reference numerals in FIG. 22 denote the same parts as in FIG. 2, and a description thereof will be omitted. In this embodiment, a tracking program (FIG. 24) is stored in a ROM 20-2. This apparatus includes a distance measuring unit 60. A CCD camera 10, a control unit 20, and the distance measuring unit 60 are mounted on a movable table 70. The movable table 70 moves in an arbitrary direction upon reception of an instruction from the control unit 20.

[Embodiment 3A: 16th, 18th, 19th, and 21st Aspects]

In this tracking apparatus, when an object M1 moves to back and forth and to right and left, as shown in FIG. 25, tracking is performed as follows.

A control section 20-1 sets n=1 (step 501 in FIG. 24), and measures a distance $L_n$ ($L_1$) to the target M1 in the direction of depth (back-and-forth direction) at time $T_n$, i.e., time $T_1$ (step 502). The control section 20-1 also loads image data $O_1$ of the target M1 picked up at time $T_1$ and input from the CCD camera 10 through a frame memory 20-5 (step 503). The control section 20-1 then checks whether n=1 (step 504). If n=1, the flow advances to step 505. If n≠1, the flow advances to step 508. In this case, since n=1, the flow advances to step 505.

Figure 23A:
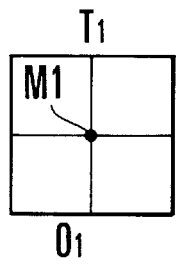
FIGS. 23A to 23J are views for explaining a tracking process in the tracking apparatus shown in FIG. 22.

In step 505, the image data $O_1$ loaded in step 503 is set as registration image data (step 23A). This registration image data is sent to a Fourier transform section 20-7 to perform two-dimensional discrete Fourier transform (DFT) for the registration image data. With this processing, the registration image data $O_1$ shown in FIG. 23A becomes Fourier image data (registration Fourier image data) $F_1$.

Figure 23B:
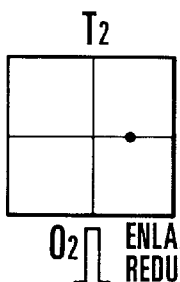

The control section 20-1 files this registration Fourier image data $F_1$ (step 506), and sets n=n+1 (step 507). The flow then returns to step 502. With this operation, the control section 20-1 measures a distance $L_2'$ to the target M1 in the direction of depth at time $T_n$, i.e., time $T_2$ after a lapse of a predetermined time t from time $T_1$. The control section 20-1 loads image data $O_2$ (FIG. 23B) of the target M1 picked up at time $T_2$ and input from the CCD camera 10 through the frame memory 20-5 (step 503).

Subsequently, the control section 20-1 checks whether n=1 (step 504). If n=1, the flow advances to step 505. If n≠1, the flow advances to step 508. In this case, since n=2, the flow advances to step 508. In step 508, the control section 20-1 obtains the difference (absolute value) between the distance $L_1$ to the target M1 in the direction of depth at time $T_{n-1}$ i.e., time $T_1$ and the distance $L_2'$ to the target M1 in the direction of depth at time $T_n$, i.e., time $T_2$ as the moving distance of the target M1 in the direction of depth. In step 509, the control section 20-1 obtains image data $A_2$ by performing enlargement/reduction processing (enlargement processing in this case) of $L_2'/L_1$ for the image data $O_2$ at time $T_2$.

Figure 23C:
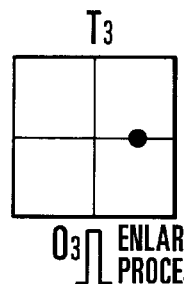
Figures 23D, 23E:
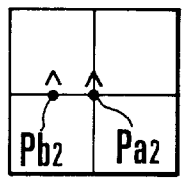

The control section 20-1 sends this image data $A_2$ as collation image data (FIG. 23D) to the Fourier transform section 20-7 to perform two-dimensional discrete Fourier transform (DFT) for this collation image data (step 510). With this processing, the collation image data shown in FIG. 23D becomes Fourier image data (collation Fourier image data) $F^2$. The control section 20-1 files this collation Fourier image data (step 511).

The control section 20-1 reads out the Fourier image data (registration Fourier image data) $F_1$ at time $T_1$ which is filed in step 506 (step 512), and reads out the Fourier image data (collation Fourier image data) $F_2$ at time $T_2$ which is filed in step 511. The control section 20-1 then synthesizes these image data $F_1$ and $F_2$ (step 514) to obtain synthesized Fourier image data.

Letting $A \cdot e^{j\Theta}$ be the collation Fourier image data, and $B \cdot e^{j\Phi}$ be the registration Fourier image data, this synthesized image data is represented by $A \cdot B \cdot e^{j(\Theta-\Phi)}$. The control section 20-1 then performs amplitude suppression processing for this synthesized Fourier image data (step 506). In this embodiment, log processing is performed as amplitude suppression processing. More specifically, the log of $A \cdot B \cdot e^{j(\Theta-\Phi)}$, which is the mathematical expression of the above synthesized Fourier image data, is calculated as $\log(A \cdot B) \cdot e^{j(\Theta-\Phi)}$ thereby suppressing $A \cdot B$ representing the amplitude to $\log(A \cdot B)$ ($A \cdot B > \log(A \cdot B)$).

The synthesized Fourier image data having undergone amplitude suppression processing is less susceptible to the illuminance difference between the case in which the registration data is obtained and the case in which the collation data is obtained. That is, by performing amplitude suppression processing, the spectrum intensity of each pixel is suppressed to cut extreme values. As a result, more information is made effective.

In this embodiment, log processing is performed as amplitude suppression processing. However, root processing may be performed. In addition, any type of processing, other than log processing and root processing, may be performed as long as amplitudes can be suppressed. If, for example, all amplitudes are set to 1 in amplitude suppression processing, i.e., only phase data are to be processed, both the computation amount and the amount of data processed can be reduced as compared with log processing, root processing, and the like.

Upon performing amplitude suppression processing in step 515, the control section 20-1 sends the synthesized Fourier image data having undergone amplitude suppression processing to the Fourier transform section 20-7 to perform second two-dimensional discrete Fourier transform (DFT) for the image data (step 516).

The control section 20-1 checks whether the tracking apparatus has changed its direction, i.e., the visual field direction of the CCD camera 10, in the interval between time $T_1$ and time $T_2$ (step 517). If the visual field direction of the CCD camera 10 has been changed, the flow advances to step 518. If the visual field direction has not been changed, the flow advances to step 520. In this case, since the visual field direction of the CCD camera 10 has not been changed, the flow advances to step 519.

With this operation, the control section 20-1 loads the synthesized Fourier image data obtained in step 516, and scans the intensities (amplitudes) of the correlation components of the respective pixels in a predetermined correlation component area (the entire area in this embodiment) from this synthesized Fourier image data to obtain the histogram of the intensities of the correlation components of the respective pixels. The control section 20-1 then extracts a pixel (correlation peak) having the highest intensity among the correlation components in a range excluding a portion near the center of the correlation component area from this histogram (step 519), and obtains the coordinates of the extracted correlation peak (step 521).

Figure 23F:
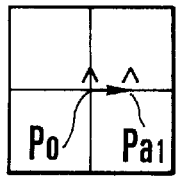

FIG. 23F shows the coordinate position of the correlation peak at this time. Referring to FIG. 23F, reference symbol $P_{a1}$ denotes the position of the correlation peak (background peak); and $P_0$, the center of the correlation component area. In this case, the correlation peak $P_{a1}$ indicates the target M1. The direction from the center $P_0$ of the correlation component area to the position $P_{a1}$ of the correlation peak indicates the moving direction of the target M1 in the horizontal direction. The distance from the center $P_0$ of the correlation component area to the position $P_{a1}$ of the correlation peak indicates the moving distance of the target M1 in the horizontal direction. Note that a correlation peak indicating the background appears near the center $P_0$ of the correlation component area.

The control section 20-1 obtains the moving direction and distance of the target M1 in the interval between time $T_1$ and time $T_2$ from the coordinate position of the correlation peak $P_{a1}$ (step 522), and obtains a moving vector $B_1$ of the target M1 from the moving distance of the target M1 in the horizontal direction and the moving distance of the target M1 in the direction of depth which has been obtained in step 508 (step 523).

A moving direction $\theta$ of the target M1 at time $T_2$ and a straight distance $L_2''$ to the target M1 at time $T_2$, using time $T_1$ as a starting point, on the basis of the obtained moving vector $B_1$ of the target M1 (step 524). The direction of the tracking apparatus is then changed to direct the center of the field angle of the CCD camera 10 to the obtained moving direction $\theta$ (step 525). At the same time, the control section 20-1 obtains the difference (absolute value) between the straight distance $L_2''$ to the target M1 at time $T_2$ and a distance $L_n$ to the target M1 at time $T_1$, and moves the tracking apparatus, i.e., the CCD camera 10, in the moving direction $\theta$ of the target M1 by the distance difference (step 526). With this operation, at time $T_2$, a straight distance $L_2$ to the target M1 becomes equal to a straight distance $L_1$ at time $T_1$ ($L_1=L_2=L$).

Subsequently, the control section 20-1 stores the moving direction (moving angle) $\theta$ of the CCD camera 10 (step 527), and sets n=n+1 (step 528), i.e., n=3. The flow returns to step 502.

With this operation, the control section 20-1 measures a distance $L_3$ to the target M1 in the direction of depth at time $T_3$ (step 502), and loads image data $O_3$ (FIG. 23C) of the target M1 at time $T_3$ (step 503). If NO in step 504, the flow advances to step 508 to obtain the difference between the distance $L_2$ to the target M1 in the direction of depth at time $T_2$ and a distance $L_3'$ to the target M1 in the direction of depth at time $T_3$ as a moving distance to the target M1 in the direction of depth.

The control section 20-1 obtains image data $A_3$ by performing enlargement/reduction processing (reduction processing in this case) of $L_3'/L_2$ for the image data $O_3$ at time $T_3$ (step 509). The control section 20-1 sets this image data $A_3$ as collation image data (FIG. 23E), and performs two-dimensional discrete Fourier transform for this collation image data $A_3$ (step 510). The control section 20-1 files this data as Fourier image data (step 511).

The control section 20-1 reads out the Fourier image data at time $T_2$, which has previously been filed in step 512, as registration Fourier image data (step 512), and also reads out the Fourier image data at time $T_3$, which has currently been filed in step 512, as collation Fourier image data (step 513). The control section 20-1 then synthesizes these registration and collation Fourier image data (step 514). The control section 20-1 then performs amplitude suppression processing for the resultant synthesized Fourier image data (step 515), and also performs two-dimensional discrete Fourier transform for the data (step 516).

The control section 20-1 checks whether the visual field direction of the CCD camera 10 has been changed in the interval between time $T_2$ and time $T_3$ (step 517). If the visual field direction of the CCD camera 10 has been changed, the flow advances to step 518. If the visual field direction has not been changed, the flow advances to step 520. In this case, since the visual field direction of the CCD camera 10 has been changed in step 526, the flow advances to step 518.

Figure 23G:
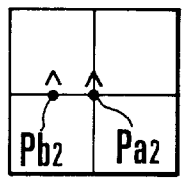
Figure 23H:
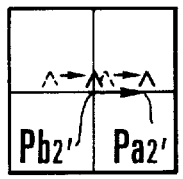

With this operation, the control section 20-1 reads out the moving direction (moving angle) $\theta$ and distance of the CCD camera 10 which are stored in step 527, and corrects the positions of the correlation peaks in the correlation component area which appear in the synthesized Fourier image data obtained in step 516 on the basis of the moving direction and distance. In the synthesized Fourier image data obtained in step 516, as shown in FIG. 23G, a correlation peak $P_{b2}$ indicating the background peak and a correlation peak $P_{a2}$ indicating the peak of the target M1 appear in the correlation component area. The positions of the correlation peaks $P_{b2}$ and $P_{a2}$ are set as position information including information indicating the movement of the visual field direction of the CCD camera 10 because the visual field direction of the CCD camera 10 has moved in the interval between time $T_2$ and time $T_3$. The positions of the correlation peaks $P_{b2}$ and $P_{a2}$ are shifted by the angle $\theta$ by which the visual field direction of the CCD camera 10 has moved to obtain correlation peaks $P_{b2}'$ and $P_{a2}'$ (FIG. 23H).

The control section 20-1 extracts a correlation peak within a range excluding a portion near the center of the corrected correlation component area (step 519), and obtains the coordinates of this extracted correlation peak $P_{a2}'$ (step 521). The control section 20-1 obtains the moving distance of the target M1 in the horizontal direction in the interval between time $T_2$ and time $T_3$ from the coordinate position of the correlation peak $P_{a2}'$ (step 522), repeats the processing in step 523 and the subsequent steps.

As described above, according to the tracking apparatus of this embodiment, the image data input at time $T_n$ is collated with the image data input at time $T_{n+1}$ on the basis of the spatial frequency characteristics, and the moving direction and distance of the target M1 are obtained as the collation results. The apparatus therefore becomes resistant to noise. In addition, even if the target M1 is large, the moving direction and distance of the target can be obtained without requiring feature amount extraction, resulting in simple processing.

In this embodiment, two-dimensional discrete Fourier transform is performed in the Fourier transform section 20-7. However, this processing may be performed in the control section 20-1. In addition, in the embodiment, two-dimensional discrete Fourier transform is performed in step 516 in FIG. 24. However, two-dimensional discrete inverse Fourier transform may be performed instead of two-dimensional discrete Fourier transform. That is, instead of two-dimensional discrete Fourier transform, two-dimensional discrete inverse Fourier transform may be performed for synthesized Fourier image data having undergone amplitude suppression processing. Quantitatively, no change in collation precision occurs whether two-dimensional discrete Fourier transform or two-dimensional discrete inverse Fourier transform is performed. Processing based on two-dimensional discrete inverse Fourier transform is disclosed in reference 1.

Figures 26A, 26B, 26C:
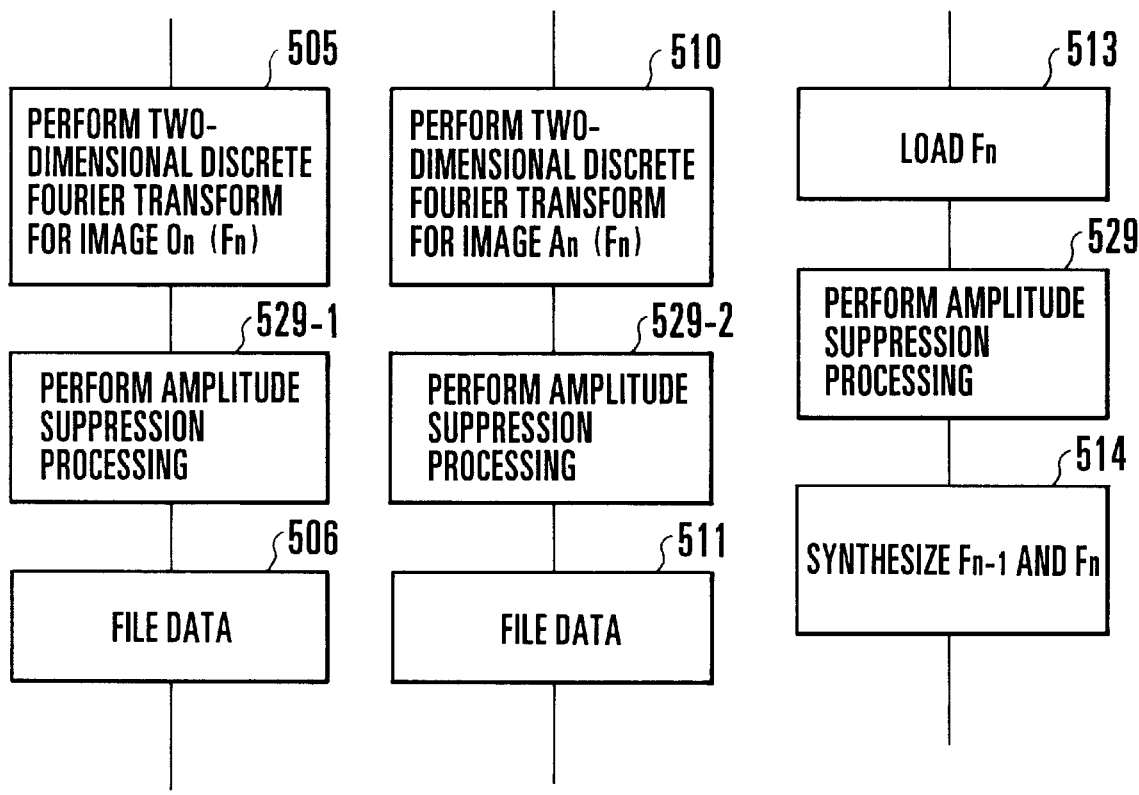
FIGS. 26A to 26C are flow charts for explaining other examples of the tracking operation in the tracking apparatus.

In this embodiment, amplitude suppression processing is performed first for synthesized Fourier image data, and two-dimensional discrete Fourier transform is then performed (steps 514 and 515). However, amplitude suppression processing may be performed for the registration and collation Fourier image data before synthesis, and the resultant data may be synthesized. More specifically, step 515 in FIG. 24 may be omitted, and steps 529-1 and 529-2 of performing amplitude suppression processing may be set between steps 510 and 511, as shown in FIGS. 26A and 26B. Alternatively, as shown in FIG. 26C, step 515 in FIG. 24 may be omitted, and step 529 of performing amplitude suppression processing may be set between steps 513 and 514.

In this case, registration Fourier image data and collation Fourier image data having undergone amplitude suppression processing are obtained by amplitude suppression processing in step 529. Synthesized Fourier image data is obtained by synthesizing these Fourier image data.

Figure 24:
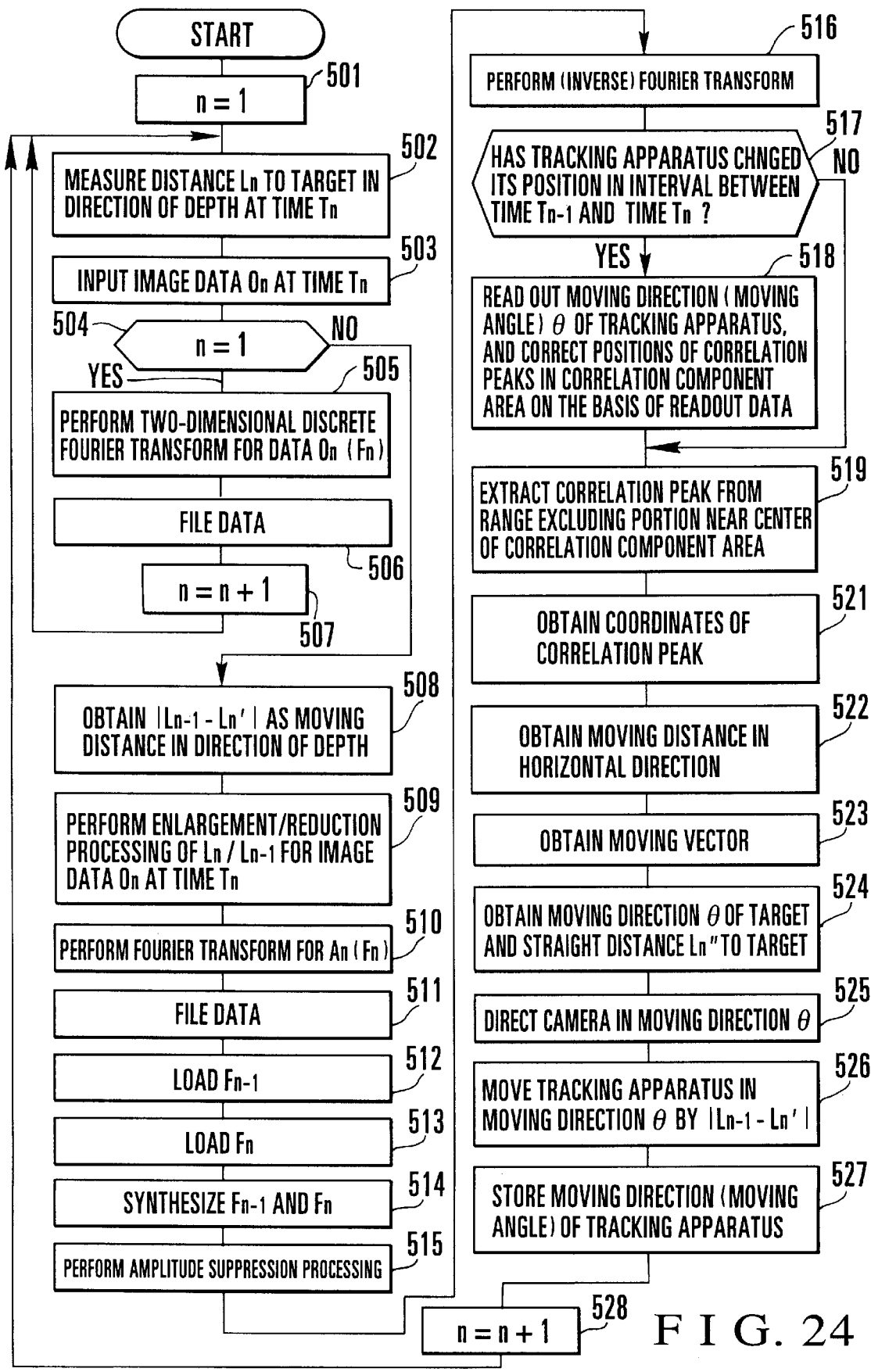
FIG. 24 is a flow chart for explaining a tracking operation (Embodiment 3A) in the tracking apparatus.

In this case, the suppression ratio of the amplitude of the synthesized Fourier image data is low as compared with the case in which amplitude suppression processing is performed after synthesized Fourier image data is generated (FIG. 24). Therefore, the method of performing amplitude suppression processing after synthesized Fourier image data is generated (FIG. 24) is superior in collation precision to the method of generating synthesized Fourier image data after performing amplitude suppression processing (FIG. 26). In the case in which synthesized Fourier image data is generated after amplitude suppression processing is performed (FIG. 26), two-dimensional discrete inverse Fourier transform may be performed for the synthesized Fourier image data instead of two-dimensional discrete Fourier transform.

In this embodiment, amplitude suppression processing is performed, but need not always be performed.

[Embodiment 3B: 17th, 18th, 20th, and 21st Aspects]

In Embodiment 3A, the image data picked up at time $T_n$ is set as registration image data, and the image data picked up at time $T_{n+1}$ is set as collation image data. These data are collated with each other on the basis of the spatial frequency characteristics to obtain the distance from the center of the correlation component area to the position of the correlation peak as the moving distance of the target M1 in the horizontal direction. In contrast to this, in Embodiment 3B, the image data picked up at time $T_n$ is set as collation image data, and the image data picked up at time $T_{n+1}$ is set as registration image data. With this operation, the moving distance of a target M1 in the horizontal direction can be obtained in the same manner as in Embodiment 3A.

Figure 23I:
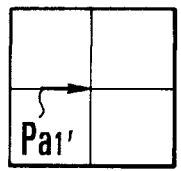
Figure 23J:
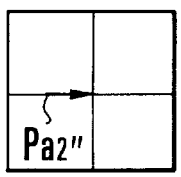

In this case, the data in FIG. 23I is obtained with respect to the data in FIG. 23F, and the data in FIG. 23J is obtained with respect to the data in FIG. 23H. That is, correlation peaks $P_{a1}$ and $P_{a2}$ appear at the opposite positions to correlation peaks $P_{a1}'$ and $P_{a2}''$ in FIGS. 23F and 23H with respect to a center $P_0$ of the correlation area. In this case, therefore, the distance from the position of the correlation peak $P_{a1}'$ ($P_{a2}''$) to the center $P_0$ of the correlation component area is obtained as the moving distance of the target M1.

[Embodiment 3C: 22nd Aspect]

In Embodiments 3A and 3B, the moving vector $B_n$ of the target M1 is obtained, and the moving direction θ of the target M1 at time $T_{n+1}$ and the straight distance $L_{n+1}''$ to the target M1 at time $T_{n+1}$ are obtained using time $T_n$ as a starting point, on the basis of the moving vector $B_n$ of the target M1. The center of the field angle of the CCD camera 10 is directed in the obtained moving direction θ. In addition, the difference (absolute value) between the straight distance $L_{n+1}''$ to the target M1 at time $T_{n+1}$ and the distance $L_n$ to the target M1 at time $T_n$ is obtained. The tracking apparatus is moved in the moving direction θ of the target M1 by the distance difference. However, the tracking apparatus may be moved according to the same vector as the moving vector $B_n$ of the target M1 without changing the direction of the CCD camera 10.

Figure 27:
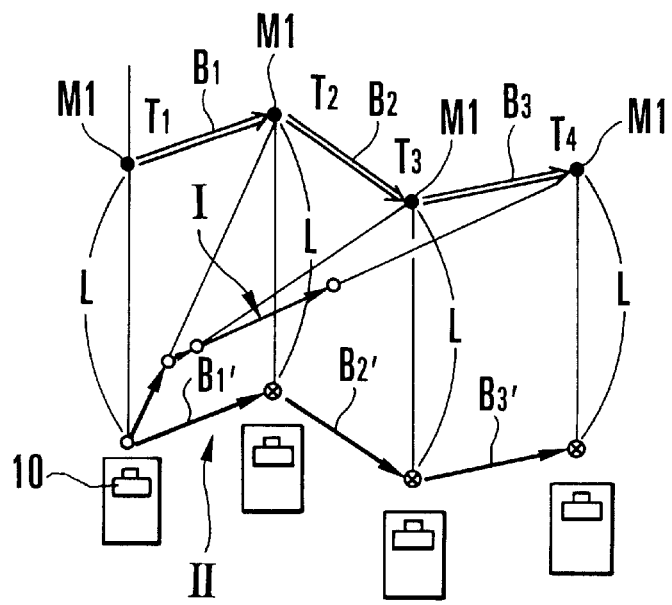
FIG. 27 is a view for explaining the movement (Embodiment 3C) of a CCD camera in a case wherein a target M1 moves to back and forth and to right and left.
Figure 28:
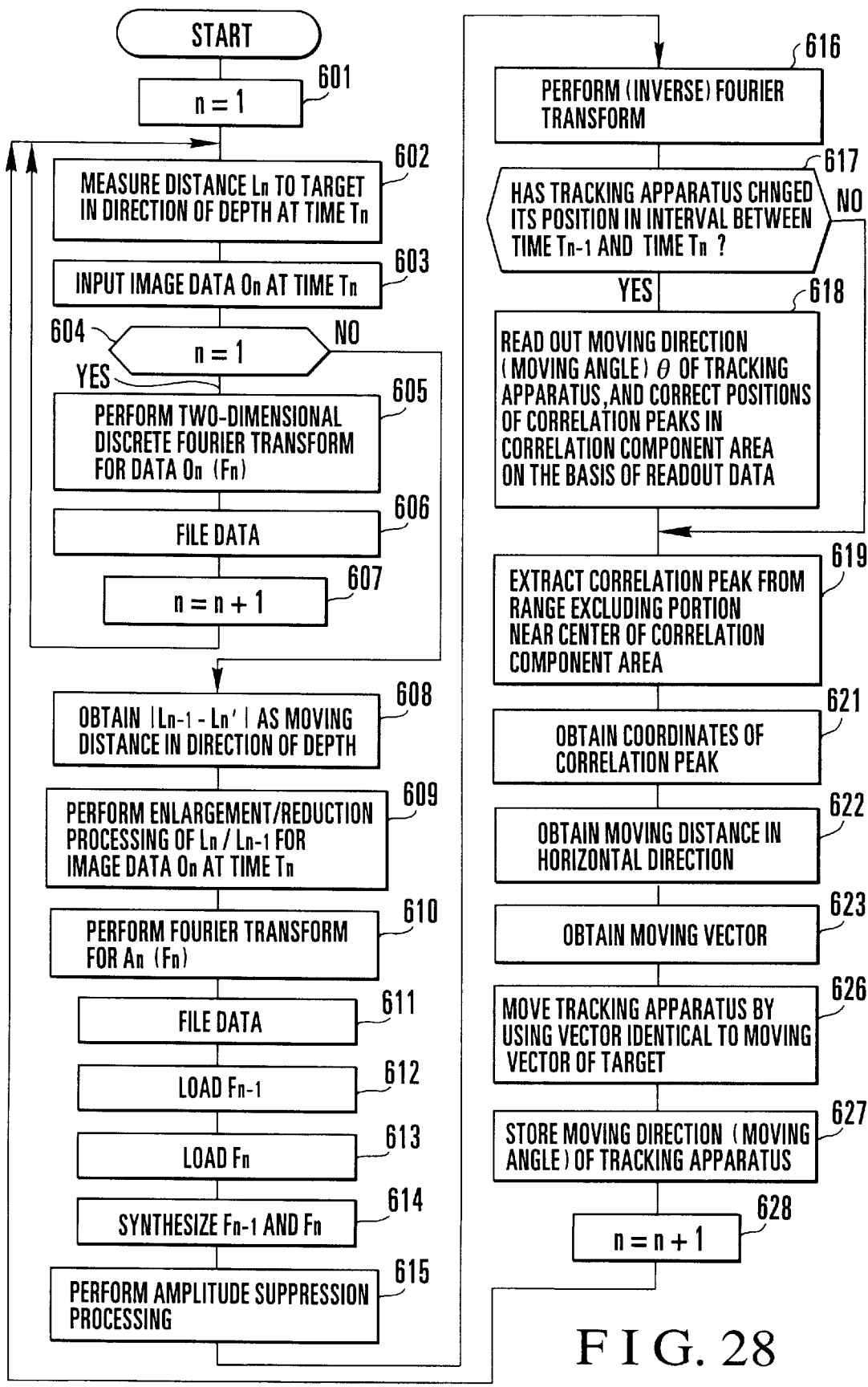
FIG. 28 is a flow chart for explaining a tracking process (Embodiment 3C) in the tracking apparatus.

More specifically, as indicated by a tracking locus II in FIG. 27, even if the tracking apparatus is moved according to a moving vector $B_n'$ identical to a moving vector $B_n$ of a target M1 without changing the direction of a CCD camera 10, tracking can be continued while the straight distance to the target M1 is kept to a distance L. In this case, since the direction of the CCD camera 10, i.e., the direction of the tracking apparatus, need not be changed, quick tracking can be performed. In addition, the processing performed by a control section 20-1 is simplified because steps corresponding to steps 524 and 525 in FIG. 24 are not required, as indicated by the flow chart of FIG. 28. The tracking distance in the tracking method of Embodiment 3C is undesirably longer than that in the tracking method (tracking locus I) in Embodiment 3A.

[Embodiment 3D: 23rd Aspect]

Figure 29:
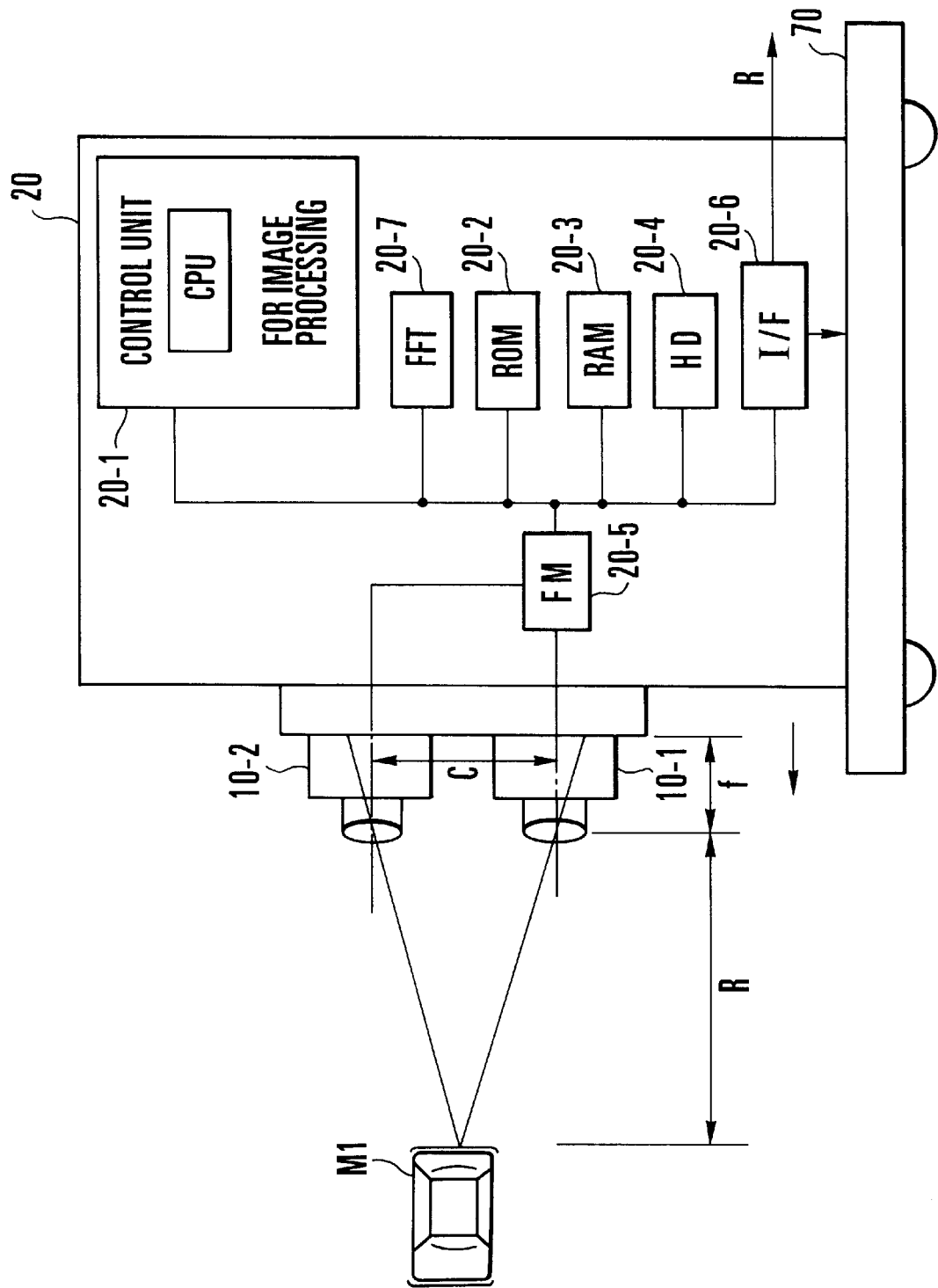
FIG. 29 is a block diagram showing the arrangement of a tracking apparatus according to still another embodiment (Embodiment 3D) of the present invention.
Figures 30A, 30B, 30C:
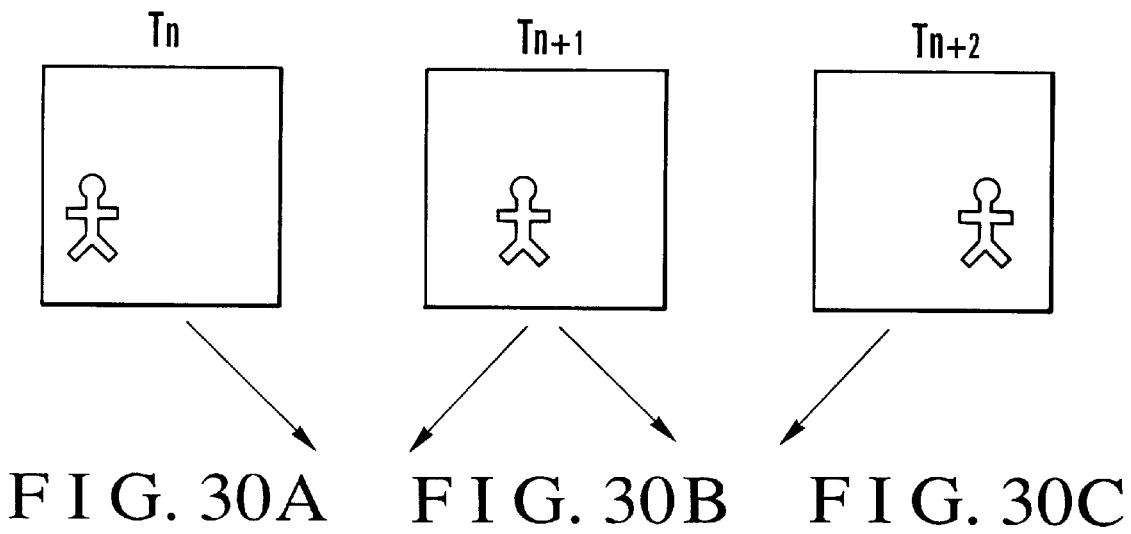
FIGS. 30A to 30F are views for explaining a tracking process in a conventional tracking apparatus.
Figures 30D, 30E:
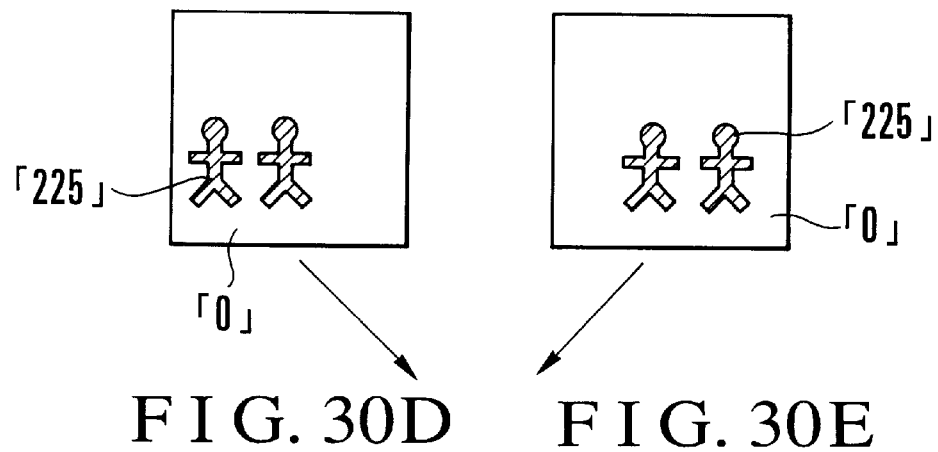
Figure 30F:
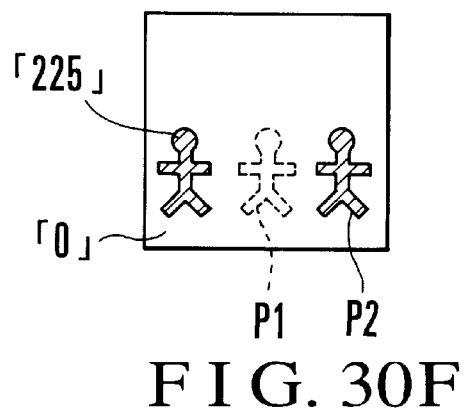

In Embodiments 3A to 3C, the distance to the target M1 is measured by the distance measuring unit 60. As shown in FIG. 29, however, a tracking apparatus may include CCD cameras 10-1 and 10-2 to measure the distance to a target M1 from input images from the CCD cameras 10-1 and 10-2. That is, the moving distance of the target M1 in the horizontal direction may be obtained from an input image from the CCD camera 10-1, and at the same time, the moving distance of the target M1 in the direction of depth may be obtained from input images from the CCD cameras 10-1 and 10-2.

In this case, the image data picked up by the CCD camera 10-2 is set as registration pattern data, and two-dimensional discrete Fourier transform is performed for this registration pattern data to generate registration Fourier two-dimensional pattern data. At the same time, the image data picked up by the CCD camera 10-2 is set as collation pattern data, and two-dimensional discrete Fourier transform is performed for this collation pattern data to generate registration Fourier two-dimensional pattern data. These registration and collation Fourier two-dimensional pattern data are synthesized with each other. Amplitude suppression processing is then performed for the resultant synthesized Fourier two-dimensional pattern data. Thereafter, two-dimensional discrete Fourier transform is performed for the resultant data. A correlation peak is obtained in a range excluding a portion near the center of a correlation component area appearing in the synthesized Fourier two-dimensional pattern data having undergone Fourier transform. A distance $L_n$ ($L_{n+1}'$) to the target M1 in the direction of depth is then measured on the basis of the distance from the position of the correlation peak to the center of the correlation component area according to equation (1) given below:

$$L_n(L_{n+1}')=f \cdot C/A \qquad (1)$$

where f is the focal length of each lens, C is the distance between the lenses, and A is the distance from the position of the correlation peak to the center of the correlation component area.

In this embodiment, the moving distance of the target M1 in the direction of depth may be obtained by performing two-dimensional discrete inverse Fourier transform for synthesized Fourier two-dimensional pattern data after performing amplitude suppression processing therefor instead of performing two-dimensional discrete Fourier transform for synthesized Fourier two-dimensional pattern data after performing amplitude suppression processing therefor. In addition, this apparatus may generate registration Fourier two-dimensional pattern data by performing two-dimensional discrete Fourier transform for registration pattern data and then performing amplitude suppression processing for the resultant data, and may also generate collation Fourier two-dimensional pattern data by performing two-dimensional discrete Fourier transform for collation pattern data and then performing amplitude suppression processing for the resultant data, instead of performing amplitude suppression processing for synthesized Fourier two-dimensional pattern data. Furthermore, amplitude suppression processing need not always be performed. The positions of the CCD cameras 10-1 and 10-2 are not limited to the upper and lower positions. These cameras may be arranged in arbitrary directions, e.g., a horizontal direction and an oblique direction.

In the above embodiment, the horizontal direction, the vertical direction (perpendicular to the drawing surface), and the direction of depth in FIG. 25 are respectively defined as the X, Y, and Z directions, and the target M1 is assumed to move only in the X direction for the sake of descriptive convenience. If, however, the target M1 is an airship, the target M1 moves in the Y direction as well as in the X and Z directions. In this case as well, the moving distance of the target M1 on the X-Y plane can be obtained from the position of the correlation peak in the same manner as in the case wherein the moving distance in the horizontal direction is obtained. The moving vector of the target M1 can therefore be obtained from the moving distance on the X-Y plane and the moving distance in the direction of depth.

In the above embodiment, referring to FIGS. 23F and 23G, the entire area of the synthesized Fourier image data is set as the correlation component area, but part of the area may be set as a correlation component area. In this case, a correlation peak indicating the background appears at different positions depending on how a correlation component area is set. In this case, therefore, the position at which a correlation peak indicating the background is likely to appear is set as a reference position, and a correlation peak is extracted within a range excluding a portion near the reference position.

As is obvious from the above description, according to the moving direction measuring device of the present invention (first to eight aspects), the two-dimensional pattern data input at time $T_n$ and the two-dimensional pattern data input at time $T_{n+1}$ are collated with each other on the basis of the spatial frequency characteristics, and the moving direction of the device itself can be accurately obtained on the basis of this collation result without making the device become a large-scale system.

According to the tracking apparatus of the present invention (ninth to 23rd aspects), the two-dimensional pattern data input at time $T_n$ and the two-dimensional pattern data input at time $T_{n+1}$ are collated with each other on the basis of the spatial frequency characteristics, and the moving direction and distance of a target can be obtained on the basis of this collation result. The apparatus is resistant to noise. In addition, even if a target is large, the moving direction and amount of the target can be obtained without requiring feature amount extraction, resulting in simple processing.

What is claimed is:
1. A moving direction measuring device comprising:
collation Fourier pattern data generating means for setting two-dimensional pattern data input at time $T_n$ as collation pattern data, and generating collation Fourier two-dimensional pattern data by performing two-dimensional discrete Fourier transform for the collation pattern data;
registration Fourier pattern data generating means for setting two-dimensional pattern data input at time $T_{n+1}$ as registration pattern data, and generating registration Fourier two-dimensional pattern data by performing two-dimensional discrete Fourier transform for the registration pattern data;
pattern processing means for synthesizing the collation Fourier two-dimensional pattern data and the registration Fourier two-dimensional pattern data, and performing either two-dimensional discrete Fourier transform or two-dimensional discrete inverse Fourier transform for the resultant synthesized Fourier two-dimensional pattern data after performing amplitude suppression processing therefor; and
moving direction measuring means for obtaining a correlation peak in a correlation component area appearing in the synthesized Fourier two-dimensional pattern data having undergone Fourier transform performed by said pattern processing means, and obtaining a direction from a reference position in the correlation component area to a position of the correlation peak as a moving direction of said device.

2. A moving direction measuring device comprising:
collation Fourier pattern data generating means for setting two-dimensional pattern data input at time $T_n$ as collation pattern data, and generating collation Fourier two-dimensional pattern data by performing amplitude suppression processing for the collation pattern data after performing two-dimensional discrete Fourier transform therefor;
registration Fourier pattern data generating means for setting two-dimensional pattern data input at time $T_{n+1}$ as registration pattern data, and generating registration Fourier two-dimensional pattern data by performing amplitude suppression processing for the registration pattern data after performing two-dimensional discrete Fourier transform therefor;
pattern processing means for synthesizing the collation Fourier two-dimensional pattern data and the registration Fourier two-dimensional pattern data, and performing either two-dimensional discrete Fourier transform or two-dimensional discrete inverse Fourier transform for the resultant synthesized Fourier two-dimensional pattern data; and
moving direction measuring means for obtaining a correlation peak in a correlation component area appearing in the synthesized Fourier two-dimensional pattern data having undergone Fourier transform performed by said pattern processing means, and obtaining a direction from a reference position in the correlation component area to a position of the correlation peak as a moving direction of said device.

3. A moving direction measuring device comprising:
registration Fourier pattern data generating means for setting two-dimensional pattern data input at time $T_n$ as registration pattern data, and generating registration Fourier two-dimensional pattern data by performing two-dimensional discrete Fourier transform for the registration pattern data;

collation Fourier pattern data generating means for setting two-dimensional pattern data input at time $T_{n+1}$ as collation pattern data, and generating collation Fourier two-dimensional pattern data by performing two-dimensional discrete Fourier transform for the collation pattern data;

pattern processing means for synthesizing the registration Fourier two-dimensional pattern data and the collation Fourier two-dimensional pattern data, and performing either two-dimensional discrete Fourier transform or two-dimensional discrete inverse Fourier transform for the resultant synthesized Fourier two-dimensional pattern data after performing amplitude suppression processing therefor; and moving direction measuring means for obtaining a correlation peak in a correlation component area appearing in the synthesized Fourier two-dimensional pattern data having undergone Fourier transform performed by said pattern processing means, and obtaining a direction from a position of the correlation peak as a starting point to a reference position in the correlation component area as a moving direction of said device.

4. A moving direction measuring device comprising:

registration Fourier pattern data generating means for setting two-dimensional pattern data input at time $T_n$ as registration pattern data, and generating registration Fourier two-dimensional pattern data by performing amplitude suppression processing for the registration pattern data after performing two-dimensional discrete Fourier transform therefor;

collation Fourier pattern data generating means for setting two-dimensional pattern data input at time $T_{n+1}$ as collation pattern data, and generating collation Fourier two-dimensional pattern data by performing amplitude suppression processing for the collation pattern data after performing two-dimensional discrete Fourier transform therefor;

pattern processing means for synthesizing the registration Fourier two-dimensional pattern data and the collation Fourier two-dimensional pattern data, and performing either two-dimensional discrete Fourier transform or two-dimensional discrete inverse Fourier transform for the resultant synthesized Fourier two-dimensional pattern data after performing amplitude suppression processing therefor; and moving direction measuring means for obtaining a correlation peak in a correlation component area appearing in the synthesized Fourier two-dimensional pattern data having undergone Fourier transform performed by said pattern processing means, and obtaining a direction from a position of the correlation peak as a starting point to a reference position in the correlation component area as a moving direction of said device.

5. A device according to any one of claims 1 or 2, wherein said moving direction measuring means obtains a correlation peak in a correlation component area appearing in synthesized Fourier two-dimensional pattern data, sets, when not less than two correlation peaks are obtained, a position of one of the correlation peaks which is nearest to a position of a previous correlation peak used to obtain the moving direction of said device as a position of a current correlation peak, and obtains a direction from a reference position in the correlation component area t o th e position of the correlation peak as the current moving direction of said device.

6. A device according to any one of claims 1 or 2, wherein said moving direction measuring means obtains a correlation peak in a correlation component area appearing in synthesized Fourier two-dimensional pattern data, sets, when not less than two correlation peaks are obtained, a position of one of the correlation peaks which is nearest to a position of a previous correlation peak used to obtain the moving direction of said device as a position of a current correlation peak, and obtains a direction from the position of the correlation peak as a starting point to a reference position in the correlation component area as the current moving direction of said device.

7. A tracking apparatus comprising:

two-dimensional pattern data input means for inputting data in a predetermined visual field as two-dimensional pattern data;

registration Fourier pattern data generating means for setting two-dimensional pattern data input at time $T_n$ as registration pattern data, and generating registration Fourier two-dimensional pattern data by performing two-dimensional discrete Fourier transform for the registration pattern data;

collation Fourier pattern data generating means for setting two-dimensional pattern data input at time $T_{n+1}$ as collation pattern data, and generating collation Fourier two-dimensional pattern data by performing two-dimensional discrete Fourier transform for the collation pattern data;

pattern processing means for synthesizing the collation Fourier two-dimensional pattern data and the registration Fourier two-dimensional pattern data, and performing either two-dimensional discrete Fourier transform or two-dimensional discrete inverse Fourier transform for the resultant synthesized Fourier two-dimensional pattern data;

moving vector obtaining means for obtaining a correlation peak in a range excluding a portion near a reference position in a correlation component area appearing in the synthesized Fourier two-dimensional pattern data having undergone Fourier transform performed by said pattern processing means, and obtaining a direction from the reference position in the correlation component area to a position of the correlation peak as a moving direction of a target, and a distance from the reference position in the correlation component area to the position of the correlation peak as a moving amount of the target;

predicting means for predicting, on the basis of the moving direction and amount obtained by said moving vector obtaining means, whether the target falls outside a data area of two-dimensional pattern data which is likely to be input at time $T_{n+2}$;

moving means for, when said predicting means predicts that the target will fall outside the data area of the two-dimensional pattern data which is likely to be input at time $T_{n+2}$, moving the visual field of said two-dimensional pattern data input means such that the target falls within the data area of the two-dimensional pattern data input at time $T_{n+2}$; and correction means for, if the visual field of said two-dimensional pattern data input means is moved by said moving means, and when said moving vector obtaining means obtains the moving direction and amount of the target by using the two-dimensional pattern data at time $T_{n+1}$ and time $T_{n+2}$ correcting positions of correlation peaks in a correlation component area appearing in synthesized Fourier two-dimensional pattern data obtained by synthesizing two-dimensional pattern data at time $T_{n+1}$ and time $T_{n+2}$, on the basis of a moving direction and amount of the visual field of said two-dimensional pattern data input means.

8. A tracking apparatus comprising:

two-dimensional pattern data input means for inputting data in a predetermined visual field as two-dimensional pattern data;

registration Fourier pattern data generating means for setting two-dimensional pattern data input at time $T_n$ as registration pattern data, and generating registration Fourier two-dimensional pattern data by performing two-dimensional discrete Fourier transform for the registration pattern data;

collation Fourier pattern data generating means for setting two-dimensional pattern data input at time $T_{n+1}$ as collation pattern data, and generating collation Fourier two-dimensional pattern data by performing two-dimensional discrete Fourier transform for the collation pattern data;

pattern processing means for synthesizing the collation Fourier two-dimensional pattern data and the registration Fourier two-dimensional pattern data, and performing either two-dimensional discrete Fourier transform or two-dimensional discrete inverse Fourier transform for the resultant synthesized Fourier two-dimensional pattern data;

moving vector obtaining means for obtaining a correlation peak in a range excluding a portion near a reference position in a correlation component area appearing in the synthesized Fourier two-dimensional pattern data having undergone Fourier transform performed by said pattern processing means, and obtaining a direction from the reference position in the correlation component area to a position of the correlation peak as a moving direction of a target, and a distance from the reference position in the correlation component area to the position of the correlation peak as a moving amount of the target;

moving means for moving a visual field of said two-dimensional pattern data input means on the basis of the moving direction and amount obtained by said moving vector obtaining means such that the target is located in a data area of two-dimensional pattern data input at next time $T_{n+2}$; and correction means for correcting positions of correlation peaks in a correlation component area appearing in synthesized Fourier two-dimensional pattern data obtained by synthesizing two-dimensional pattern data at time $T_{n+1}$ and time $T_{n+2}$, on the basis of a moving direction and amount of the visual field of said two-dimensional pattern data input means which is moved by said moving means, when said moving vector obtaining means obtains the moving direction and amount of the target by using the two-dimensional pattern data at time $T_{n+1}$ and time $T_{n+2}$.

9. A tracking apparatus comprising:

two-dimensional pattern data input means for inputting data in a predetermined visual field as two-dimensional pattern data;

collation Fourier pattern data generating means for setting two-dimensional pattern data input at time $T_n$ as collation pattern data, and generating collation Fourier two-dimensional pattern data by performing two-dimensional discrete Fourier transform for the collation pattern data;

registration Fourier pattern data generating means for setting two-dimensional pattern data input at time $T_{n+1}$ as registration pattern data, and generating registration Fourier two-dimensional pattern data by performing two-dimensional discrete Fourier transform for the registration pattern data;

pattern processing means for synthesizing the registration Fourier two-dimensional pattern data and the collation Fourier two-dimensional pattern data, and performing either two-dimensional discrete Fourier transform or two-dimensional discrete inverse Fourier transform for the resultant synthesized Fourier two-dimensional pattern data;

moving vector obtaining means for obtaining a correlation peak in a range excluding a portion near a reference position in a correlation component area appearing in the synthesized Fourier two-dimensional pattern data having undergone Fourier transform performed by said pattern processing means, and obtaining a direction from a position of the correlation peak as a starting point to a reference position in the correlation component area as a moving direction of a target, and a distance from the position of the correlation peak to the reference position in the correlation component area as a moving amount of the target;

predicting means for predicting, on the basis of the moving direction and amount obtained by said moving vector obtaining means, whether the target falls outside a data area of two-dimensional pattern data which is likely to be input at time $T_{n+2}$;

moving means for, when said predicting means predicts that the target will fall outside the data area of the two-dimensional pattern data which is likely to be input at time $T_{n+2}$, moving the visual field of said two-dimensional pattern data input means such that the target falls within the data area of the two-dimensional pattern data input at time $T_{n+2}$; and correction means for, if the visual field of said two-dimensional pattern data input means is moved by said moving means, and when said moving vector obtaining means obtains the moving direction and amount of the target by using the two-dimensional pattern data at time $T_{n+1}$ and time $T_{n+2}$ correcting positions of correlation peaks in a correlation component area appearing in synthesized Fourier two-dimensional pattern data obtained by synthesizing two-dimensional pattern data at time $T_{n+1}$ and time $T_{n+2}$, on the basis of a moving direction and amount of the visual field of said two-dimensional pattern data input means.

10. A tracking apparatus comprising:

two-dimensional pattern data input means for inputting data in a predetermined visual field as two-dimensional pattern data;

collation Fourier pattern data generating means for setting two-dimensional pattern data input at time $T_n$ as collation pattern data, and generating collation Fourier two-dimensional pattern data by performing two-dimensional discrete Fourier transform for the collation pattern data;

registration Fourier pattern data generating means for setting two-dimensional pattern data input at time $T_{n+1}$ as registration pattern data, and generating registration Fourier two-dimensional pattern data by performing two-dimensional discrete Fourier transform for the registration pattern data;

pattern processing means for synthesizing the collation Fourier two-dimensional pattern data and the registration Fourier two-dimensional pattern data, and performing either two-dimensional discrete Fourier transform or two-dimensional discrete inverse Fourier transform for the resultant synthesized Fourier two-dimensional pattern data;

moving vector obtaining means for obtaining a correlation peak in a range excluding a portion near a reference position in a correlation component area appearing in the synthesized Fourier two-dimensional pattern data having undergone Fourier transform performed by said pattern processing means, and obtaining a direction from a position of the correlation peak as a starting point to a reference position in the correlation component area as a moving direction of a target, and a distance from the position of the correlation peak to the reference position in the correlation component area as a moving amount of the target;

moving means for moving a visual field of said two-dimensional pattern data input means on the basis of the moving direction and amount obtained by said moving vector obtaining means such that the target is located in a data area of two-dimensional pattern data input at next time $T_{n+2}$; and correction means for correcting positions of correlation peaks in a correlation component area appearing in synthesized Fourier two-dimensional pattern data obtained by synthesizing two-dimensional pattern data at time $T_{n+1}$ and time $T_{n+2}$, on the basis of a moving direction and amount of the visual field of said two-dimensional pattern data input means which is moved by said moving means, when said moving vector obtaining means obtains the moving direction and amount of the target by using the two-dimensional pattern data at time $T_{n+1}$ and time $T_{n+2}$.

11. An apparatus according to any one of claims 7 to 10, wherein said pattern processing means synthesizes the collation Fourier two-dimensional pattern data and the registration Fourier two-dimensional pattern data, and performs either two-dimensional discrete Fourier transform or two-dimensional discrete inverse Fourier transform for the resultant synthesized Fourier two-dimensional pattern data after performing amplitude suppression processing therefor.

12. An apparatus according to claim 7 or 8, wherein said registration Fourier pattern data generating means sets two-dimensional pattern data input at time $T_n$ as registration pattern data, and generates registration Fourier two-dimensional pattern data by performing amplitude suppression processing for the registration pattern data after performing two-dimensional discrete Fourier transform therefor, and said collation Fourier pattern data generating means sets two-dimensional pattern data input at time $T_{n+1}$ as collation pattern data, and generates collation Fourier two-dimensional pattern data by performing amplitude suppression processing for the collation pattern data after performing two-dimensional discrete Fourier transform therefor.

13. An apparatus according to claim 9 or 10, wherein said collation Fourier pattern data generating means sets two-dimensional pattern data input at time $T_n$ as collation pattern data, and generates collation Fourier two-dimensional pattern data by performing amplitude suppression processing for the collation pattern data after performing two-dimensional discrete Fourier transform therefor, and said registration Fourier pattern data generating means sets two-dimensional pattern data input at time $T_{n+1}$ as registration pattern data, and generates registration Fourier two-dimensional pattern data by performing amplitude suppression processing for the registration pattern data after performing two-dimensional discrete Fourier transform therefor.

14. A tracking apparatus comprising:

two-dimensional pattern data input means for inputting data in a predetermined visual field as two-dimensional pattern data;

distance measuring means for measuring a distance to a target located in a visual field of said two-dimensional pattern data input means in a direction of depth;

direction-of-depth distance obtaining means for obtaining a difference between a distance $L_n$ to the target in the direction of depth at time $T_n$, which is measured by said distance measuring means, and a distance $L_{n+1}'$ to the target in the direction of depth at time $T_{n+1}$ as a moving distance of the target in the direction of depth;

registration Fourier pattern data generating means for setting two-dimensional pattern data input at time $T_n$ as registration pattern data, and generating registration Fourier two-dimensional pattern data by performing two-dimensional discrete Fourier transform for the registration pattern data;

enlargement/reduction processing means for performing enlargement/reduction processing for two-dimensional pattern data input at time $T_{n+1}$ in accordance with a ratio between the distance $L_n$ to the target in the direction of depth at time $T_n$, which is measured by said distance measuring means, and the distance $L_{n+1}'$ to the target in the direction of depth at time $T_{n+1}$;

collation Fourier pattern data generating means for setting two-dimensional pattern data input at time $T_{n+1}$ as collation pattern data, and generating collation Fourier two-dimensional pattern data by performing two-dimensional discrete Fourier transform for the collation pattern data;

pattern processing means for synthesizing the registration Fourier two-dimensional pattern data and the collation Fourier two-dimensional pattern data, and performing either two-dimensional discrete Fourier transform or two-dimensional discrete inverse Fourier transform for the resultant synthesized Fourier two-dimensional pattern data;

moving distance obtaining means for obtaining a correlation peak in a range excluding a portion near a reference position in a correlation component area appearing in synthesized Fourier two-dimensional pattern data having undergone Fourier transform performed by said pattern processing means, and obtaining a distance from the reference position in the correlation component area to a position of the correlation peak as a moving distance of the object on a plane perpendicular to the direction of depth;

moving vector obtaining means for obtaining a moving vector of the target from the moving distance of the target in the direction of depth and the moving distance of the target in the plane perpendicular to the direction of depth which are obtained by said direction-of-depth distance obtaining means and said moving distance obtaining means; and moving means for moving a position of said two-dimensional pattern data input means on the basis of the moving vector of the target which is obtained by said moving vector obtaining means.

15. A tracking apparatus comprising:

two-dimensional pattern data input means for inputting data in a predetermined visual field as two-dimensional pattern data;

distance measuring means for measuring a distance to a target located in a visual field of said two-dimensional pattern data input means in a direction of depth;

direction-of-depth distance obtaining means for obtaining a difference between a distance $L_n$ to the target in the direction of depth at time $T_n$, which is measured by said distance measuring means, and a distance $L_{n+1}'$ to the target in the direction of depth at time $T_{n+1}$ as a moving distance of the target in the direction of depth;

collation Fourier pattern data generating means for setting two-dimensional pattern data input at time $T_n$ as collation pattern data, and generating collation Fourier two-dimensional pattern data by performing two-dimensional discrete Fourier transform for the collation pattern data;

enlargement/reduction processing means for performing enlargement/reduction processing for two-dimensional pattern data input at time $T_{n+1}$ in accordance with a ratio between the distance $L_n$ to the target in the direction of depth at time $T_n$, which is measured by said distance measuring means, and the distance $L_{n+1}'$ to the target in the direction of depth at time $T_{n+1}$;

registration Fourier pattern data generating means for setting two-dimensional pattern data input at time $T_{n+1}$ as registration pattern data, and generating registration Fourier two-dimensional pattern data by performing two-dimensional discrete Fourier transform for the registration pattern data;

pattern processing means for synthesizing the collation Fourier two-dimensional pattern data and the registration Fourier two-dimensional pattern data, and performing either two-dimensional discrete Fourier transform or two-dimensional discrete inverse Fourier transform for the resultant synthesized Fourier two-dimensional pattern data;

moving distance obtaining means for obtaining a correlation peak in a range excluding a portion near a reference position in a correlation component area appearing in synthesized Fourier two-dimensional pattern data having undergone Fourier transform performed by said pattern processing means, and obtaining a distance from a position of the correlation peak to the reference position in the correlation component area as a moving distance of the object on a plane perpendicular to the direction of depth;

moving vector obtaining means for obtaining a moving vector of the target from the moving distance of the target in the direction of depth and the moving distance of the target in the plane perpendicular to the direction of depth which are obtained by said direction-of-depth distance obtaining means and said moving distance obtaining means; and moving means for moving a position of said two-dimensional pattern data input means on the basis of the moving vector of the target which is obtained by said moving vector obtaining means.

16. An apparatus according to claim 14, wherein said pattern processing means synthesizes the collation Fourier two-dimensional pattern data and the registration Fourier two-dimensional pattern data, and performs either two-dimensional discrete Fourier transform or two-dimensional discrete inverse Fourier transform for the resultant synthesized Fourier two-dimensional pattern data after performing amplitude suppression processing therefor.

17. An apparatus according to claim 14, wherein said registration Fourier pattern data generating means sets two-dimensional pattern data input at time $T_n$ as registration pattern data, and generates registration Fourier two-dimensional pattern data by performing amplitude suppression processing for the registration pattern data after performing two-dimensional discrete Fourier transform therefor, and said collation Fourier pattern data generating means sets two-dimensional pattern data input at time $T_{n+1}$ and having undergone enlargement/reduction processing as collation pattern data, and generates collation Fourier two-dimensional pattern data by performing amplitude suppression processing for the collation pattern data after performing two-dimensional discrete Fourier transform therefor.

18. An apparatus according to claim 15, wherein said collation Fourier pattern data generating means sets two-dimensional pattern data input at time $T_n$ as collation pattern data, and generates collation Fourier two-dimensional pattern data by performing amplitude suppression processing for the collation pattern data after performing two-dimensional discrete Fourier transform therefor, and said registration Fourier pattern data generating means sets two-dimensional pattern data input at time $T_{n+1}$ and having undergone enlargement/reduction processing as registration pattern data, and generates registration Fourier two-dimensional pattern data by performing amplitude suppression processing for the registration pattern data after performing two-dimensional discrete Fourier transform therefor.

19. An apparatus according to claim 15, wherein said pattern processing means synthesizes the collation Fourier two-dimensional pattern data and the registration Fourier two-dimensional pattern data, and performs either two-dimensional discrete Fourier transform or two-dimensional discrete inverse Fourier transform for the resultant synthesized Fourier two-dimensional pattern data after performing amplitude suppression processing therefor.

20. An apparatus according to claims 14, 15, 16, 17, 18, 19, wherein said moving means obtains a moving direction θ of a target at time Tn+1, with time Tn serving as a starting point, and a straight distance Ln+1" to the target at time Tn+1 on the basis of a moving vector of the target which is obtained by said moving vector obtaining means, directs a center of a visual field of said two-dimensional pattern data input means in the obtained moving direction θ, obtains a difference between the obtained straight distance Ln+1" and a distance Ln to the target at time Tn, and moves said two-dimensional pattern data input means in the moving direction θ by the distance difference.

21. An apparatus according to claim 20 wherein said distance measuring means includes first and second cameras, uses one of said cameras with said two-dimensional pattern data input means, sets image data picked up by said first camera as registration pattern data, generates registration Fourier two-dimensional pattern data by performing two-dimensional discrete Fourier transform for the registration pattern data, sets image data picked up by said second camera as collation pattern data, generates collation Fourier two-dimensional pattern data by performing two-dimensional discrete Fourier transform for the collation pattern data, synthesizes the collation Fourier two-dimensional pattern data an the registration Fourier two-dimensional pattern data, performs either two-dimensional discrete Fourier transform or two-dimensional discrete inverse Fourier transform for the resultant synthesized Fourier two-dimensional pattern data, obtains a correlation peak in a range excluding a portion near a reference position in a correlation component area appearing in the synthesized Fourier two-dimensional pattern data having undergone Fourier transform, and measures a distance to the target in the direction of depth on the basis of a distance between a position of the correlation peak and the reference position in the correlation component area.

22. An apparatus according to claims 14, 15, 16, 17, 18, 19, wherein said moving means moves a position of said two-dimensional pattern data input means, on the basis of the moving vector of the target which is obtained by said moving vector obtaining means, by using the same vector as the moving vector.

23. An apparatus according to claim 22 wherein said distance measuring means includes first and second cameras, uses one of said cameras with said two-dimensional pattern data input means, sets image data picked up by said first camera as registration pattern data, generates registration Fourier two-dimensional pattern data by performing two-dimensional discrete Fourier transform for the registration pattern data, sets image data picked up by said second camera as collation pattern data, generates collation Fourier two-dimensional pattern data by performing two-dimensional discrete Fourier transform for the collation pattern data, synthesizes the collation Fourier two-dimensional pattern data an the registration Fourier two-dimensional pattern data, performs either two-dimensional discrete Fourier transform or two-dimensional discrete inverse Fourier transform for the resultant synthesized Fourier two-dimensional pattern data, obtains a correlation peak in a range excluding a portion near a reference position in a correlation component area appearing in the synthesized Fourier two-dimensional pattern data having undergone Fourier transform, and measures a distance to the target in the direction of depth on the basis of a distance between a position of the correlation peak and the reference position in the correlation component area.

24. An apparatus according to claims 14, 15, 16, 17, 18, 19, wherein said distance measuring means includes first and second cameras, uses one of said cameras with said two-dimensional pattern data input means, sets image data picked up by said first camera as registration pattern data, generates registration Fourier two-dimensional pattern data by performing two-dimensional discrete Fourier transform for the registration pattern data, sets image data picked up by said second camera as collation pattern data, generates collation Fourier two-dimensional pattern data by performing two-dimensional discrete Fourier transform for the collation pattern data, synthesizes the collation Fourier two-dimensional pattern data an the registration Fourier two-dimensional pattern data, performs either two-dimensional discrete Fourier transform or two-dimensional discrete inverse Fourier transform for the resultant synthesized Fourier two-dimensional pattern data, obtains a correlation peak in a range excluding a portion near a reference position in a correlation component area appearing in the synthesized Fourier two-dimensional pattern data having undergone Fourier transform, and measures a distance to the target in the direction of depth on the basis of a distance between a position of the correlation peak and the reference position in the correlation component area.

* * * * *

UNITED STATES PATENT AND TRADEMARK OFFICE
CERTIFICATE OF CORRECTION

PATENT NO.   : 6,067,367
DATED        : May 23, 2000
INVENTOR(S)  : Nakajima et al.

Page 1 of 2

It is certified that error appears in the above-identified patent and that said Letters Patent is hereby corrected as shown below:

In [56],
Line 7, delete "Lee et al," and insert -- Lee et al. --.

Column 11,
Line 30, delete "radius 1 and" and insert -- radius $\ell$ and --.
Line 39, delete "radius 1 and" and insert -- radius $\ell$ and --.

Column 19,
Line 33, delete "a distance 1 therebetween" and insert -- a distance $\ell$ therebetween --.

Column 27,
Line 21, delete "having a radius 1" and insert -- having a radius $\ell$ --.
Line 26, delete "having a radius 1" and insert -- having a radius $\ell$ --.

Column 28,
Line 26, delete "having a radius 1" and insert -- having a radius $\ell$ --.

Column 37,
Line 63, delete "area t o th e position" and insert -- area to the position --.

Column 44,
Line 45, delete "Tn+1, with time Tn" and insert -- $T_{n+1}$, with time $T_n$ --.
Line 46, delete "distance Ln+1" to" and insert -- distance $L_{n+1}$" to --.

UNITED STATES PATENT AND TRADEMARK OFFICE
CERTIFICATE OF CORRECTION

PATENT NO.   : 6,067,367
DATED        : May 23, 2000
INVENTOR(S)  : Nakajima et al.

It is certified that error appears in the above-identified patent and that said Letters Patent is hereby corrected as shown below:

Column 44, (continued)
Line 47, delete "Tn+1 on the basis" and insert -- $T_{n+1}$ on the basis --.
Line 51, delete "Ln+1" and" and insert -- $L_{n+1}$" and --.
Line 52, delete "Ln to the target at time Tn," and insert --$L_n$ to the target at time $T_n$, --.

Column 46,
Line 20, delete "pattern data an the" and insert -- pattern data and the --.

Signed and Sealed this

Fourteenth Day of August, 2001

*Attest:*

*Attesting Officer*

NICHOLAS P. GODICI
*Acting Director of the United States Patent and Trademark Office*